(12) United States Patent
Viator et al.

(10) Patent No.: US 11,945,175 B1
(45) Date of Patent: Apr. 2, 2024

(54) HEAT SEAL BAR SENSORLESS TEMPERATURE SENSING AND CONTROL

(71) Applicant: AMERIGLOBE, LLC, Lafayette, LA (US)

(72) Inventors: Brody Alan Viator, Lafayette, LA (US); Clifford Dunlap, Baton Rouge, LA (US)

(73) Assignee: AMERIGLOBE, LLC, Lafayette, LA (US)

( * ) Notice: Subject to any disclaimer, the term of this patent is extended or adjusted under 35 U.S.C. 154(b) by 0 days.

(21) Appl. No.: 18/311,783

(22) Filed: May 3, 2023

Related U.S. Application Data

(63) Continuation of application No. 17/330,668, filed on May 26, 2021, now Pat. No. 11,673,348.

(60) Provisional application No. 63/154,780, filed on Feb. 28, 2021, provisional application No. 63/030,227, filed on May 26, 2020.

(51) Int. Cl.
| | |
|---|---|
| *B29C 65/20* | (2006.01) |
| *B29C 65/00* | (2006.01) |
| *B65D 88/16* | (2006.01) |
| *B65D 88/54* | (2006.01) |
| *G01K 7/02* | (2021.01) |
| *G01K 15/00* | (2006.01) |
| *B29L 31/00* | (2006.01) |

(52) U.S. Cl.
CPC ........ *B29C 66/91421* (2013.01); *B29C 65/20* (2013.01); *B65D 88/1681* (2013.01); *B65D 88/54* (2013.01); *G01K 7/02* (2013.01); *G01K 15/005* (2013.01); *B29L 2031/7128* (2013.01)

(58) Field of Classification Search
CPC .... B29C 66/91421; B29C 65/20; G01K 7/02; G01K 15/005
See application file for complete search history.

(56) References Cited

U.S. PATENT DOCUMENTS

| | | | |
|---|---|---|---|
| 4,705,937 A * | 11/1987 | Marek .............. | B29C 66/91231 219/535 |
| 10,112,739 B2 | 10/2018 | Dunlap et al. | |
| 10,479,599 B2 | 11/2019 | Dunlap et al. | |
| 10,618,225 B2 | 4/2020 | Dunlap | |
| 10,745,192 B2 | 8/2020 | Dunlap et al. | |

(Continued)

FOREIGN PATENT DOCUMENTS

| | | | | |
|---|---|---|---|---|
| ES | 2850373 | | 8/2021 | |
| ES | 2850373 T3 * | | 8/2021 | ........... B29C 65/224 |

(Continued)

*Primary Examiner* — Daniel McNally
(74) *Attorney, Agent, or Firm* — Garvey, Smith & Nehrbass, Patent Attorneys, L.L.C.; Julia M. FitzPatrick; Gregory C. Smith

(57) ABSTRACT

A sensorless temperature sensing and control system and method uses electrical voltage and current feedback signals to monitor and control the temperature of heating elements used in a heat sealing process wherein sensors are not physically connected to a heat seal bar during the heat sealing process. After calibration of a heat seal bar using a sensor, voltage and current feedback signals are processed by a programmable logic controller (PLC) to calculate the real-time electrical resistance of each heating element. Data and electrical resistance is used to calculate real-time temperature of the heat seal bar during heating.

20 Claims, 44 Drawing Sheets

(56) References Cited

U.S. PATENT DOCUMENTS

| | | | |
|---|---|---|---|
| 11,673,348 | B1 | 6/2023 | Viator et al. |
| 2014/0363106 | A1 | 12/2014 | Schnaars, Sr. et al. |
| 2018/0050863 | A1 | 2/2018 | Dunlap et al. |
| 2018/0118451 | A1 | 5/2018 | Dunlap et al. |
| 2018/0126661 | A1 | 5/2018 | Dunlap et al. |
| 2019/0185212 | A1 | 6/2019 | Dunlap et al. |

FOREIGN PATENT DOCUMENTS

| | | |
|---|---|---|
| WO | 2014197728 | 12/2014 |
| WO | 2018085843 | 5/2018 |
| WO | 2018089504 | 5/2018 |
| WO | 2018118975 | 6/2018 |

\* cited by examiner

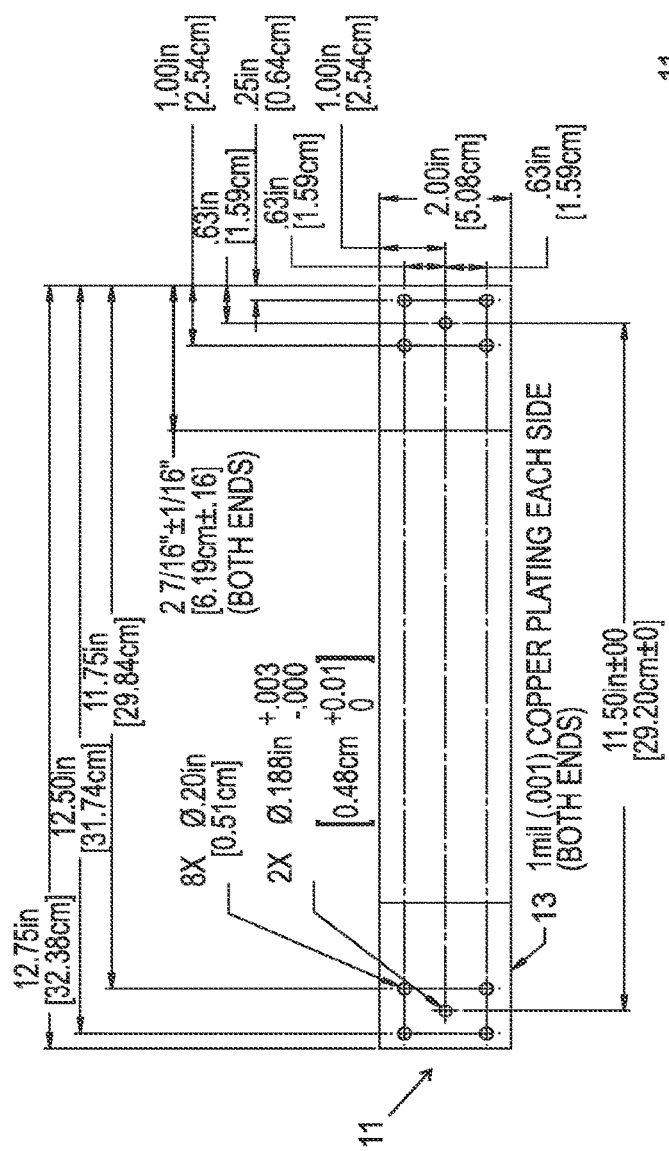
FIG. 4 TOP VIEW
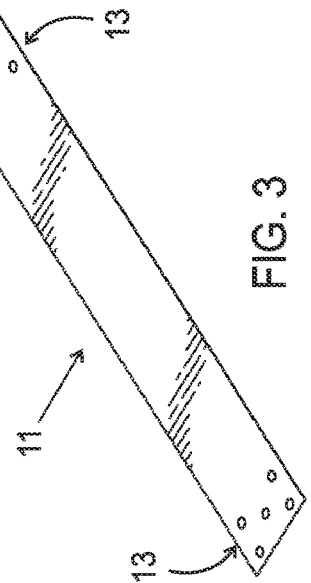
FIG. 3
FIG. 5 FRONT VIEW

FUSION AMERIGLOBE
Lowering Cost Through Unique Solutions

9:44:48 AM

CALIBRATION MODE: OFF

Cycle Time: 196 (sec)

Back

Temperature Calibration

| | LOOP #1 | | LOOP #2 | | DIAPER | |
|---|---|---|---|---|---|---|
| | Setpoint | Real-Time | Setpoint | Real-Time | Setpoint | Real-Time |
| Calibration Sensor | 290.0 | 152.2 | 290.0 | 154.9 | | 88.3 |
| Top Bar Temp °F | | 152.5 | | 156.9 | | 92.9 |
| Bot Bar Temp °F | | 152.4 | | 156.1 | | 93.1 |
| Seal Time (sec) | 75 | 0 | | 0 | | 0 |
| Cool Down Temp | 165.0 | 152.5 | | 156.5 | | 93.0 |

FIG. 16

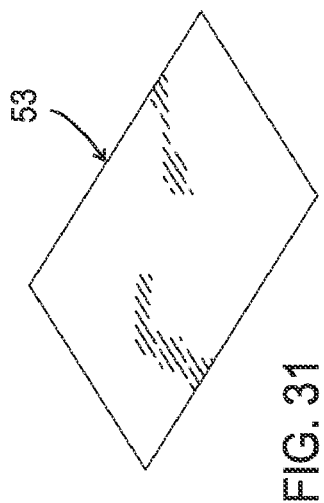
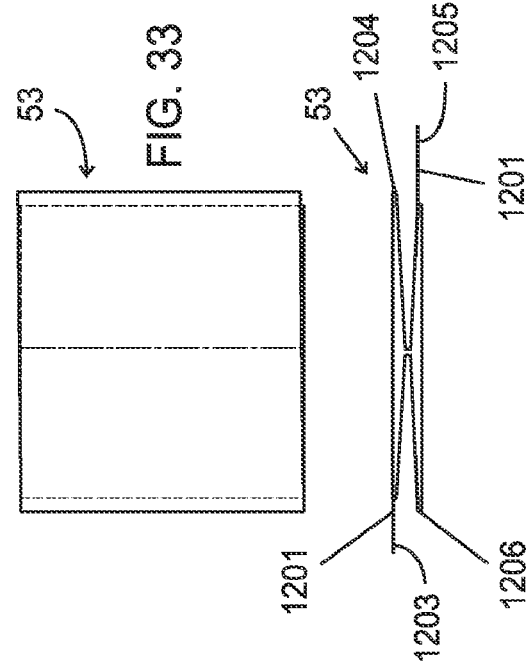
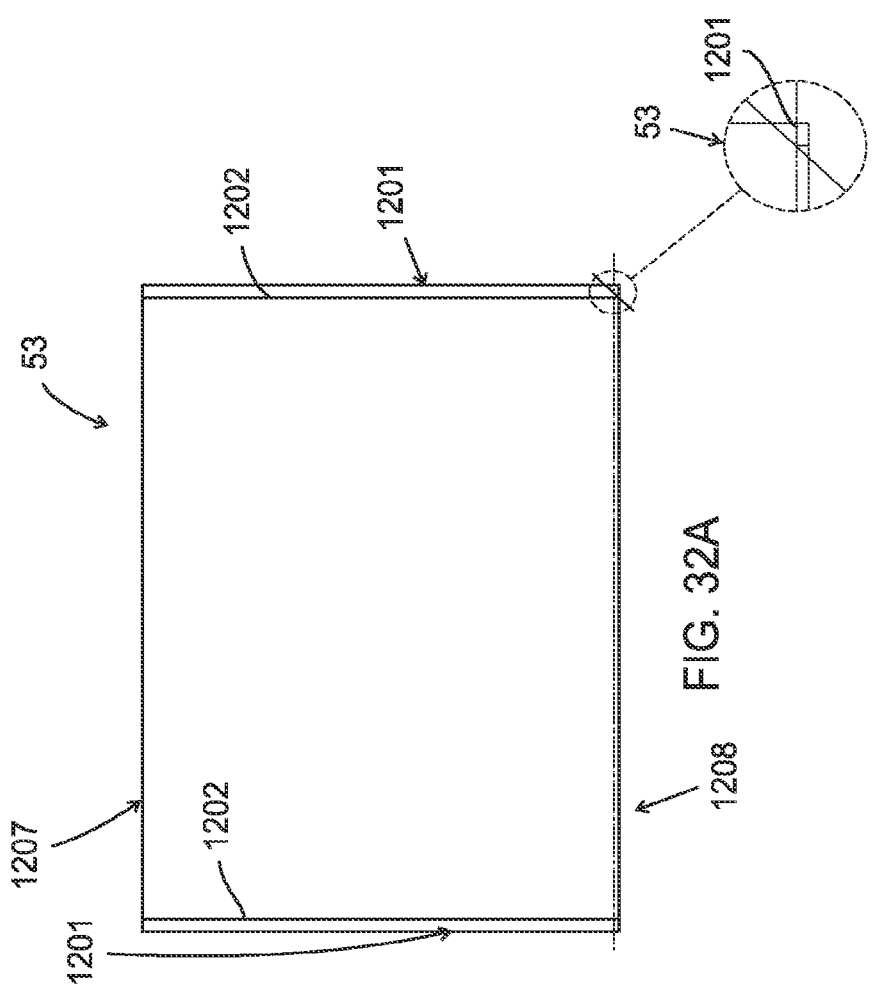

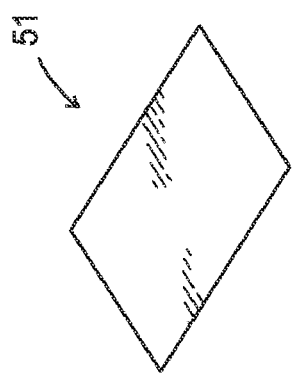
FIG. 39
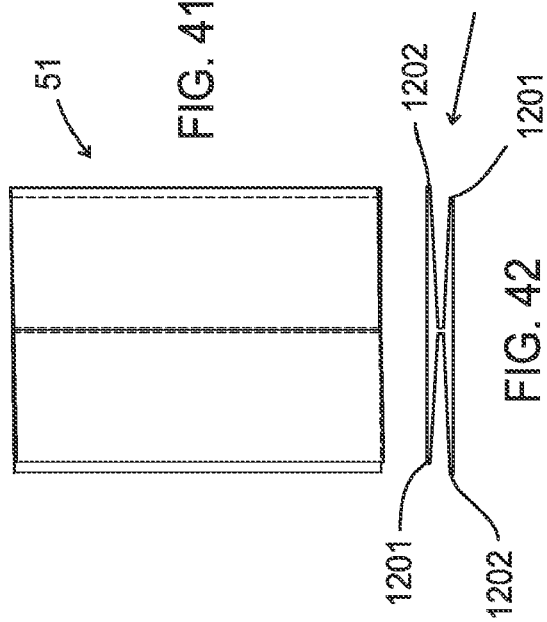
FIG. 41
FIG. 42
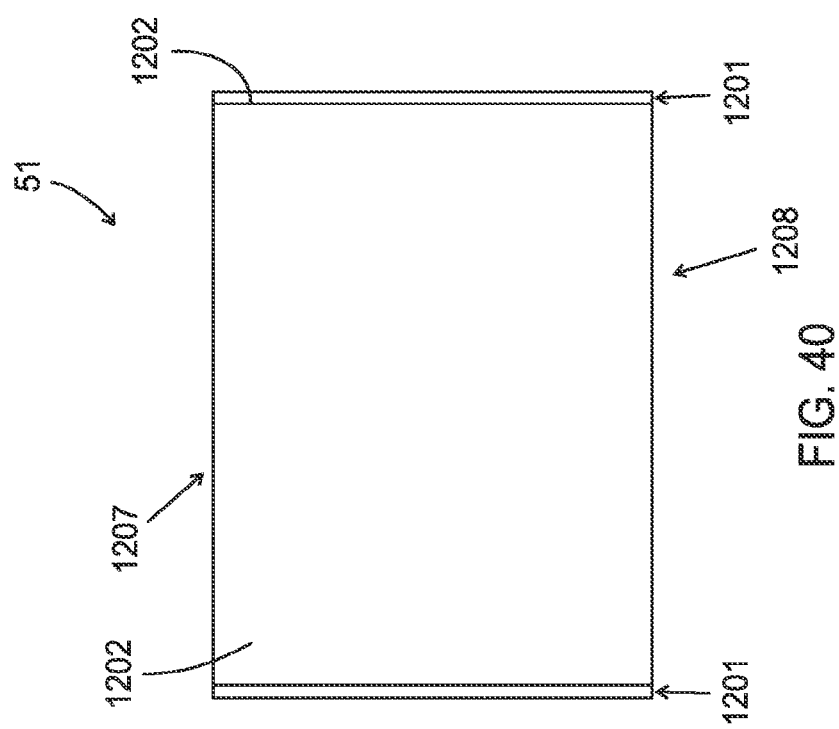
FIG. 40

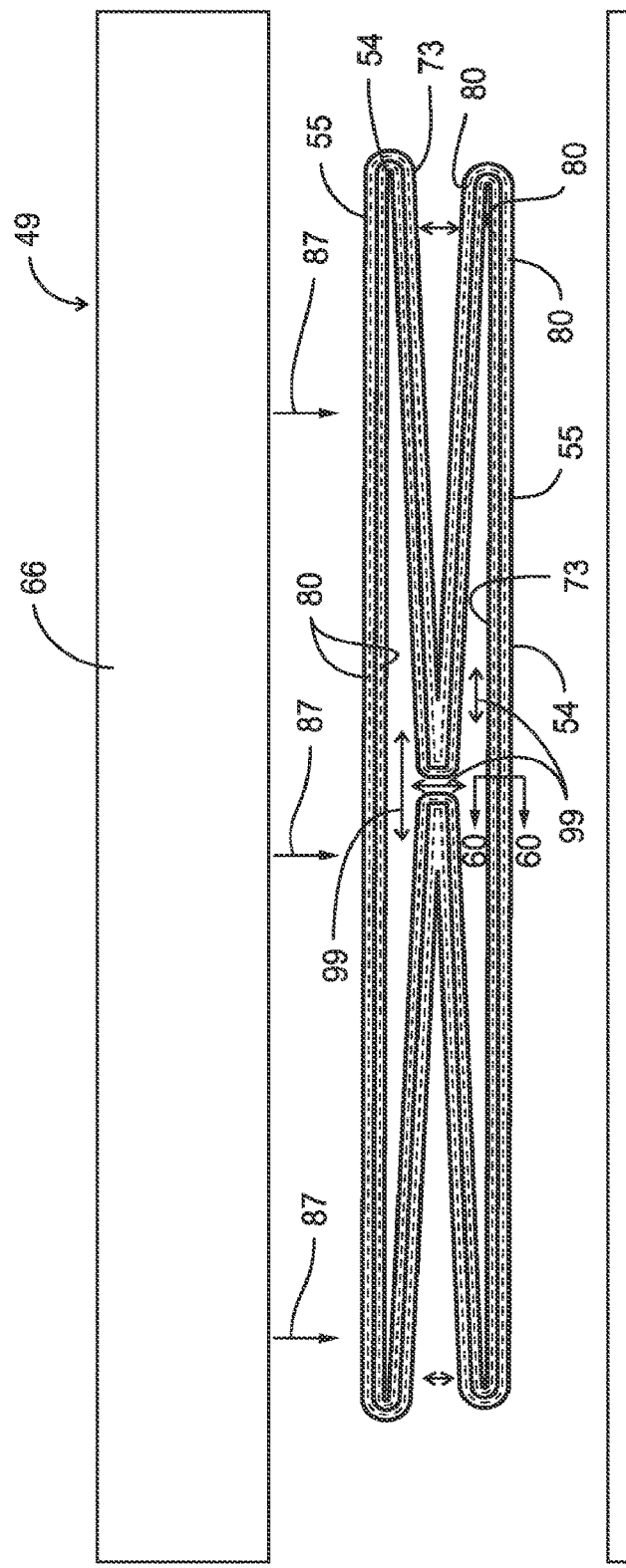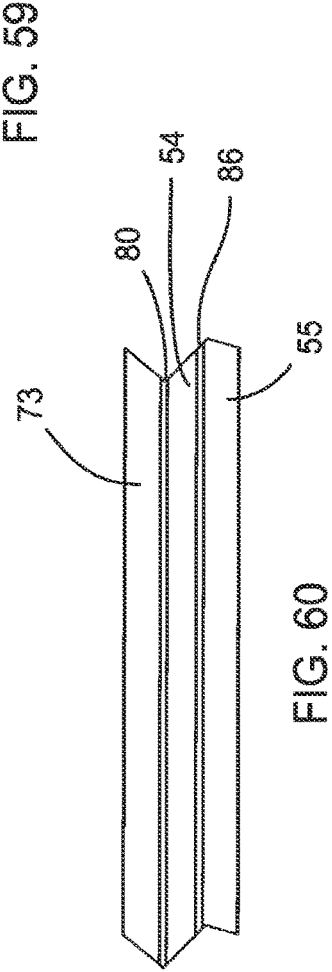
FIG. 59
FIG. 60

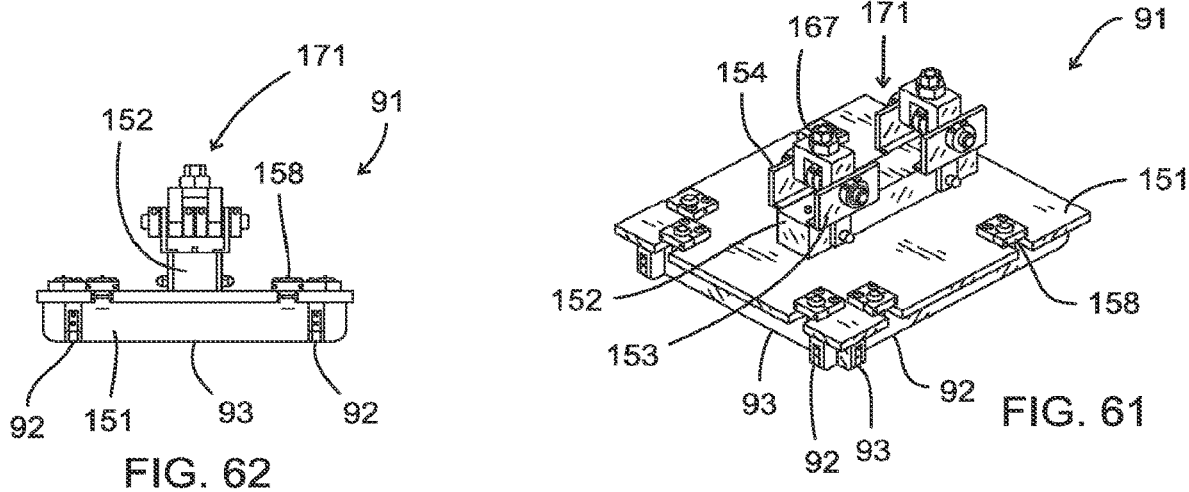
FIG. 62
FIG. 61
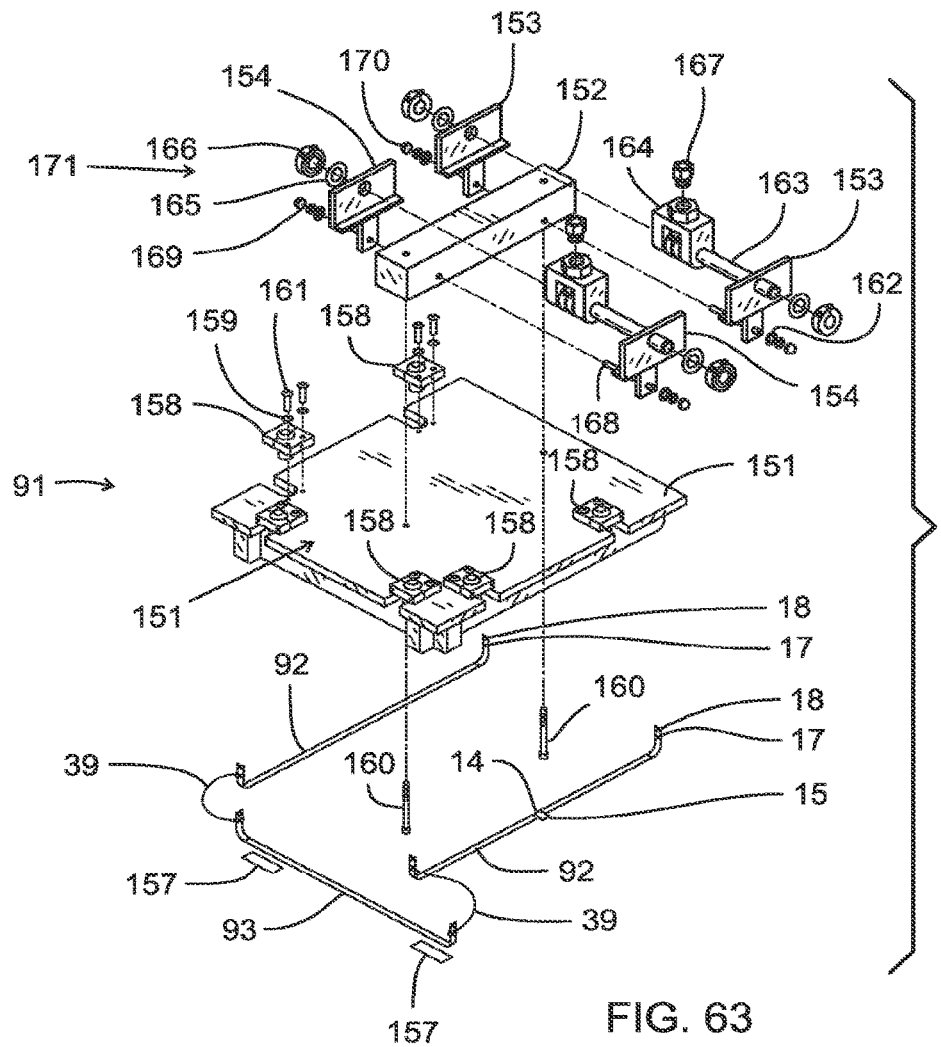
FIG. 63

HEAT SEAL BAR SENSORLESS TEMPERATURE SENSING AND CONTROL

CROSS-REFERENCE TO RELATED APPLICATIONS

This is a continuation of U.S. patent application Ser. No. 17/330,668, filed 26 May 2021 (issued as U.S. Pat. No. 11,673,348 on 13 Jun. 2023), which claims priority to and/or the benefit of U.S. Provisional Patent Application Ser. No. 63/154,780, filed on 28 Feb. 2021 and U.S. Provisional Patent Application Ser. No. 63/030,227, filed on 26 May 2020, which are each hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a system and method for sensorless sensing and control of a heating element of a heat seal bar. More particularly, the present invention relates to a system and method for sensorless sensing and control of a heating element of a heat seal bar adapted for use in a heat sealing machine, e.g., of the type used to manufacture stitchless bulk bags or bulk bags including one or more joints formed via heat sealing. A heating element is calibrated using a sensor and then the sensor is removed from the heating element. Voltage and current feedback signals of the heating element are processed using voltage and current transducers. A controller, e.g., a Programmable Logic Controller (PLC), calculates real-time electrical resistance of the heating element and the temperature of the heating element during a heat sealing process.

2. General Background of the Invention

In heat sealing machinery used to heat seal woven, flexible plastic fabrics together, e.g., woven polypropylene or polyethylene fabrics, external thermocouple sensors typically are attached to heat seal bars, e.g., as used in U.S. patent application Ser. No. 15/807,272, entitled "STITCHLESS BULK BAG WITH HEAT FUSED SEAMS AND METHOD OF PRODUCTION", published as No. US2018/0126661A1. In the heat sealing systems of US2018/0126661A1, which names the inventors of the present application, external thermocouple sensors are used to monitor and control temperatures during a heat sealing process. These sensors can be flat "leaf-type" sensors that are installed under each heating element and make physical contact with the heating element. These sensors are very fragile and after numerous machine cycles, they can become physically damaged to the point of failure. In use, a major factor that contributes to sensor damage is the expansion and contraction of the heating elements under pressure during the heating and cooling process. The friction between the heating elements and sensors causes two (2) undesired consequences. Often times the sensors will physically move out of position causing an inaccurate reading. In other instances, the friction over time causes the insulation protecting the sensor head to separate, causing the sensor head to short out on the heating element. Sensors quickly became a major maintenance issue that regularly impacted production.

Attempts have been made by the inventors of the present application to secure the sensors in position, however they still would become damaged over time. Different sensor types were also tried, yet the more robust sensors used thicker insulation on the sensor head, which increased the response time of the sensor, making it unfeasible for some desired heat sealing applications, e.g., in one or more applications for heat sealing bulk bags as described in US patent publication numbers US2014/0363106 and/or US2018/0126661.

External sensors are more susceptible to external factors such as physical pressure and external heat absorption. Varying these factors will usually alter the output reading of a sensor. There is thus a need in the art to obtain a more direct temperature reading of heat seal bar heating elements without use of a sensor that can be easily damaged on the heat seal bar during a heat sealing process, which affects accuracy.

The following U.S. Patents and publications are hereby incorporated herein by reference thereto:

i) U.S. patent application Ser. No. 14/297,441, filed on 5 Jun. 2014, entitled "METHOD OF PRODUCTION OF FABRIC BAGS OR CONTAINERS USING HEAT FUSED SEAMS", published as No. US2014/0363106 on 11 Dec. 2014, and issued as U.S. Pat. No. 10,112,739, on 30 Oct. 2018;

ii) International PCT Patent Application No. PCT/US2014/041155, filed on 5 Jun. 2014, entitled "METHOD OF PRODUCTION OF FABRIC BAGS OR CONTAINERS USING HEAT FUSED SEAMS", published as No. WO2014/197728A1 on 11 Dec. 2014;

iii) U.S. patent application Ser. No. 15/345,452, filed 7 Nov. 2016, entitled "INDUSTRIAL BAG DISCHARGE SPOUT", published as No. US2018/0050863A1 on 22 Feb. 2018, and issued as U.S. Pat. No. 10,745,192, on 18 Aug. 2020;

iv) International PCT Patent Application No. PCT/US2017/060411, filed 7 Nov. 2017, entitled "INDUSTRIAL BAG DISCHARGE SPOUT", published as No. WO2018/085843A1 on 11 May 2018;

v) U.S. patent application Ser. No. 15/383,841, filed 19 Dec. 2016, entitled "INDUSTRIAL BAG LIFT LOOP ASSEMBLY", published as No. US2018/0118451A1 on 3 May 2018, and issued as U.S. Pat. No. 10,479,599 on 19 Nov. 2019;

vi) International PCT Patent Application No. PCT/US2017/067393, filed 19 Dec. 2017, entitled "INDUSTRIAL BAG LIFT LOOP ASSEMBLY", published as No. WO2018/118975A1 on 28 Jun. 2018;

vii) U.S. patent application Ser. No. 15/807,272, filed 8 Nov. 2017, entitled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020;

viii) International PCT Patent Application No. PCT/US2017/060652, filed 8 Nov. 2017, entitled "STITCHLESS BULK BAG WITH HEAT FUSED SEAMS AND METHOD OF PRODUCTION", published as No. WO2018/089504A1 on 17 May 2018;

ix) U.S. patent application Ser. No. 16/126,635, filed on 10 Sep. 2018, entitled "METHOD OF PRODUCTION OF FABRIC BAGS OR CONTAINERS USING HEAT FUSED SEAMS", published as US 2019/0185212A1 on 20 Jun. 2019;

x) U.S. patent application Ser. No. 17/007,509, filed on 31 Aug. 2020, entitled "BULK BAG BOTTOM AND DISCHARGE ASSEMBLY INCLUDING A REINFORCER"; and xi) U.S. patent application Ser. No. 17/007,828, filed on 31 Aug. 2020, entitled "LIFT LOOP ASSEMBLY TEST PROCESS AND APPARATUS".

BRIEF SUMMARY OF THE INVENTION

The system, method and apparatus of the present invention solve the problems in the prior art in a simple and straight forward manner. The system, method and apparatus of the present invention include sensorless technology for heat seal bars that uses electrical voltage and current feedback signals to monitor and control the temperature of heating elements used in a heat sealing machine during a heat sealing process, e.g., of the type adapted to heat seal woven, flexible, plastic fabrics together, e.g., woven polypropylene or polyethylene fabrics.

The voltage and current feedback signals are preferably processed by a controller (e.g., a Programmable Logic Controller (PLC), laptop, a computer or another desired type of controller), while power is being applied to a heating element to calculate the real-time electrical resistance of each heating element of a heat seal bar. Electrical resistance of each heating element varies relative to its temperature, allowing the controller or PLC to monitor the temperature by monitoring the resistance. External thermocouple sensors are preferably used to calibrate the temperature readings calculated by the controller or PLC. Once the PLC is calibrated, temperature sensing and control are performed without external "sensors" on the heat seal bars while being used to heat seal fabrics together in a heat seal machine. An example of a thermocouple sensor that can be used for calibration in one or more embodiments of the present invention is a type k SA1XL thermocouple sensor commercially available from Omega Engineering.

When heating elements have power applied during heating, the controller or PLC preferably processes a steady voltage and current feedback signal to determine temperature. However, during cool down or ambient periods there normally would be no feedback signal to process since power is not being applied. When power is applied to the heating element in order to receive a feedback signal, the controller or PLC preferably sends short electrical pulses to the heating element during periods when heating is not desired. The electrical pulsing allows the PLC to sample the temperature with little to no heating.

Although temperature sensing by resistance is known and used in some heat sensing applications, the system, method and process of the present invention is novel and unique in how it is applied. Thermocouple sensors that were previously used by the same inventors in a heat sealing of bulk bags process, e.g., as described in patent application publication numbers US2014/0363106 and/or US2018/0126661, which are incorporated herein by reference, use the principle of detecting temperature based on a resistance calculation. However, in order to eliminate the thermocouple sensors on the heat seal bar assemblies during the heat sealing process, as is done under the present invention, a method was needed to sense the resistance of the heating elements themselves.

One method in detecting resistance in metal is by calculating voltage and current while power is applied. Since voltage and current transducers are readily available in the automation industry, standard voltage and current transducers from several different manufacturers were tested in developing the present invention. It was determined that the output response time of most standard transducers was not sufficient for the desired application during heat sealing of bulk bags, for example. The slow feedback response affected the accuracy of the temperature control. Most of the standard transducers available in the market have a response time of greater than 100 ms. In order to successfully implement the sensorless application in the heat sealing system and process of the present invention, custom voltage and current transducers were produced and tried with a 50 ms response time. Such transducers provide the output needed to accurately control the temperature of the heating elements used in one or more preferred embodiments of the heat sealing process of the present invention.

Transducers that can be used in one or more preferred embodiments of the present invention are preferably voltage and current transducers that can be manufactured by Ohio Semitronics, for example, that are custom modified for a faster output response time. The specification for the output response time is preferably 50 milliseconds (ms) with a +/−2 millisecond (ms) tolerance. The transducers preferably must operate within this tolerance to maintain accuracy of the resistance reading. Other output response times could work as long as the voltage and current transducer output response times are +/−2 milliseconds from each other. Longer than 50 ms to 52 ms output response can also work; however, it would require a longer electrical pulse to be sent to the heating elements during cool down which would cause undesired heating of the heating element during the cool down process, which is not desired in preferred embodiments of the method of heat sealing a bulk bag.

In one or more preferred embodiments, transducers can be used with output response times from 25 to 75 ms as long as they are matched within +/−2 ms of each other.

In one or more preferred embodiments, first, the voltage and current feedback signals are processed by transducers with most preferably 50 ms response time, or preferably 48 to 52 ms response time, that convert the voltage and/or current to analog output signals that can be processed by a controller, e.g, a PLC, laptop, computer or other desired controller. A controller, e.g., a PLC, preferably uses custom programming to take averages and perform smoothing of the transducer output signals. The program preferably flattens out the transducer output signal by taking a running average of multiple sampling points of voltage and current to calculate a more stable feedback signal. The program calculates the real-time temperature based on calibration values stored from the latest calibration. The calculated temperature value is used to control a pulse output on the controller or PLC. The controller or PLC pulse output is preferably connected to switching device, e.g., a "peak switch" solid state relay (SSR) that physically controls the input power to a power transformer. The power transformer preferably sends power directly to the heating element.

In a slightly different configuration of one or more preferred embodiments, the calculated temperature value can be used to control an analog output on the PLC. In this case the analog output can be used to control a switching device that is a silicon controlled rectifier or "SCR" power controller. The SCR physically controls the input voltage to a power transformer and varies this voltage based on the analog output signal from the PLC.

Siemens S7-1200 analog PLC modules, for example, can be used to process the voltage and current feedback signals from the voltage and current transducers, however PLCs or other types of controllers from other manufacturers can also be used. Siemens TIA portal engineering software can be used for all programming, if desired, in one or more embodiments of the present invention and is available commercially.

Sensorless technology of the present application can be used in the heat sealing systems and with heat seal machinery and heat seal bars as disclosed in patent application publication numbers US2014/0363106 and/or US2018/0126661, for example, which are incorporated herein by reference. Sensorless technology of the present application can also be used for other numerous, potential applications when it is desired to monitor temperature of a heating element on a heat seal bar.

As discussed, in one or more of the heat sealing systems and processes of patent application publication numbers US2014/0363106 and/or US2018/0126661, for example, external thermocouple sensors are used to monitor and control temperatures. These sensors are generally flat "leaf-type" sensors that are installed under each heating element and make physical contact with the heating element. These sensors were very fragile and after numerous machine cycles, they can become physically damaged to the point of failure. A major factor that contributes to sensor damage is the expansion and contraction of the heating elements under pressure during the heating and cooling process. The friction between the heating elements and sensors causes two (2) undesired consequences. Often times the sensors can physically move out of position causing an inaccurate reading. In other instances, the friction over time can cause the insulation protecting the sensor head to separate causing the sensor head to short out on the heating element. Sensors thus can quickly become a major maintenance issue that can regularly impact production.

During experimentation to solve the above-referenced problems, attempts were made to secure the sensors in position, however, the sensors still would become damaged over time. Different sensor types were also tried, yet more robust sensors that used thicker insulation on the sensor head increased the response time of the sensor making it unfeasible for the desired heat sealing application of heat sealing a bulk bag, for example.

External sensors are more susceptible to external factors such as physical pressure and external heat absorption. Varying these factors will usually alter the output reading of a sensor. The sensorless technology of the present application solves these problems and obtains a more direct temperature reading by reading the actual resistance of the heating element itself and as a result is less affected by external forces. Because it is a more direct temperature reading, sensorless technology of the present application results in more precise, consistent and repeatable temperature control with far less overshoot.

All of the above issues associated with external sensors are completely resolved with the sensorless technology of the present invention as it completely eliminates the external sensor during normal operation of heat sealing machinery, e.g., when manufacturing a bulk bag or other woven plastic container using a heat sealing process.

In one or more preferred embodiments, calibration sensors during a calibration cycle can simply be placed directly under a desired heating element with the sensor facing up, wherein the pressure used in the calibration cycle process holds the sensor against the heating element during sealing.

A preferred embodiment of the present invention includes a method for temperature sensing and control of a heat seal bar assembly in a heat seal machine of a type that can heat seal plastic fabrics together at desired heat sealed joint locations, the method comprising the following steps:

a) calibrating temperature and electrical resistance readings of a heating element on a heat seal bar using a sensor on the heat seal bar and a controller, wherein the controller calculates average temperature values of the sensor and average electrical resistance values of the heat element during a calibration cycle and stores the average temperature values and the average electrical resistance values as calibration values;

b) removing the sensor from the heat seal bar after calibration is completed in step "a";

c) providing power to the heating element so that the heating element will begin heating during a heat seal cycle;

d) processing voltage and current feedback signals of the heating element using the controller to calculate real-time electrical resistance of the heating element based on the calibration values during the heat seal cycle; and e) calculating temperature of the heating element based on electrical resistance data received by the controller during the heat seal cycle and the calibration values.

In one or more preferred embodiments, in step "d" a transducer is used to process the voltage and current feedback signals, which converts the voltage and current feedback signals to analog output signals that are processed by the controller.

In one or more preferred embodiments, in step "d" the controller takes averages and performs smoothing of the transducer output signals by flattening out a transducer output signal by taking a running average of multiple sampling points to calculate a more stable feedback signal.

In one or more preferred embodiments, further comprising using the calculated temperature to control a pulse output on the controller, wherein the pulse output is preferably connected to a switch or switching device that physically controls the input power to a power transformer, which preferably sends power to the heating element.

In one or more preferred embodiments, further comprising using the calculated temperature to control an analog output on the controller, wherein the analog output is preferably connected to an SCR power controller that varies the input voltage to a power transformer, which preferably sends power to the heating element.

A preferred embodiment of the present invention includes a system for temperature sensing and control of a heating element of a heat seal bar, the system comprising:

a) a control panel that preferably includes a controller, a transducer, a transformer and a switch or a switching device such as a solid state relay or SCR power controller;

b) a heat seal bar preferably including a heating element;

c) a sensor preferably attachable to the heat seal bar prior to using the heat seal bar in a heat seal cycle and removable from the heat seal bar during heating in the heat seal cycle;

wherein the controller is preferably operable to provide calibration values of the heat seal bar during a calibration cycle based on temperature values received from the sensor and electrical resistance values of the heating element;

wherein the transformer is preferably operable to apply power to the heating element after the calibration cycle when the sensor is removed from the heating element;

wherein the transducer is preferably operable to process voltage and current feedback signals received from the heat seal bar, which the controller uses to calculate real-time electrical resistance of the heating element during the heat seal cycle; and wherein the controller preferably calculates temperature of the heating element during heating based on electrical resistance data and calibration data acquired by the controller.

In one or more preferred embodiments, the transducer is preferably used to process the voltage and current feedback signals, which converts the voltage and current feedback signals to analog output signals that are processed by the controller.

In one or more preferred embodiments, the controller takes averages and preferably performs smoothing of the transducer output signals by flattening out a transducer output signal by taking a running average of multiple sampling points to calculate a more stable feedback signal.

In one or more preferred embodiments, the calculated temperature is preferably used to control an analog or digital pulse output on the PLC, wherein the controller output is preferably connected to the switch or switching device, which could be a solid state relay or SCR power controller, that physically controls the input power to a power transformer, which sends power to the heating element.

In one or more preferred embodiments, the heating element is preferably plated with 0.001 to 0.006 inch copper plating on each end of both sides.

In one or more preferred embodiments, the heating element is preferably plated with 0.001 to 0.006 inch copper plating on each end of both sides of the heating element for most preferably a length of 2 and 7/16 inches from each end, or preferably a length of 2 inches to 3 inches from each end.

In one or more preferred embodiments, an output response time of the transducer is preferably 50 milliseconds with a +/−2 millisecond tolerance.

In one or more preferred embodiments, an output response time of the transducer is preferably 48 to 52 milliseconds with a +/−2 millisecond tolerance.

The present invention includes a method of manufacturing a bulk bag comprising the following steps:
a) overlapping desired bag portions to form desired joint locations in a calibration cycle pre-assembled or pre-heat sealed bulk bag;
b) moving the calibration cycle pre-assembled or pre-heat sealed bulk bag into a heat seal machine comprising a heat seal bar assembly that has a calibration sensor couple thereto;
c) starting a calibration cycle of the heat seal bar assembly;
d) heating a heating element of the heat seal bar assembly;
e) moving the heat seal bar assembly to make contact with at least one said desired joint location of the calibration cycle pre-assembled or pre-heat sealed bulk bag;
f) collecting data on temperature and electrical resistance of the heating element to establish electrical resistance values of the heating element at selected temperatures;
g) removing the calibration cycle pre-assembled or pre-heat sealed bag from the heat seal machine;
h) removing the calibration sensor from the heat seal bar assembly;
i) overlapping desired bag portions to form desired joint locations for a heat seal bulk bag;
j) moving the heat seal bulk bag into the heat seal machine with the heat seal bar assembly that was calibrated in steps "c" to "f";
k) starting a heat seal cycle of the heat seal bar assembly that does not have a heat sensor attached thereto;
l) heating the heat seal bar assembly;
m) monitoring the temperature of the heat seal bar assembly by collecting electrical resistance readings from the heating element of the heat seal bar assembly and comparing said electrical resistance readings to electrical resistance data of the calibration cycle;
n) moving the heat seal bar assembly to make contact with at least one said desired joint location and to form a joint between the overlapped bag portions in the desired joint location while continuing to collect and monitor electrical resistance readings of the heating element;
o) removing the heat seal bulk bag from the heat seal machine having the joint formed between said overlapped bag portions; and
wherein during the heat seal cycle of steps "k" to "n" a sensor for monitoring temperature is not included on the heat seal bar assembly.

In one or more preferred embodiments, further comprising receiving an error signal if electrical resistance readings deviate from a desired range, indicating that the temperature of the heat seal bar assembly has deviated from a desired range.

In one or more preferred embodiments, more than one heat seal bar assembly can be calibrated at the same time in steps "c" to "f".

In one or more preferred embodiments, more than one joint of the heat sealed bulk bag is formed at the same time in steps "k" to "n".

A preferred embodiment of the method of the present invention includes a method of manufacturing a bulk bag comprising the following steps:
a) overlapping desired bag portions to form desired joint locations to form a pre-assembled or pre-heat sealed bulk bag;
b) moving the pre-assembled or pre-heat sealed bulk bag into a heat seal machine with a heat seal bar assembly that does not include a heat sensor, wherein the heat seal bar assembly is calibrated so that temperature of a heating element of the heat seal bar can be determined based on electrical resistance readings of the heating element;
c) starting a heat seal cycle of the heat seal bar assembly;
d) heating the heat seal bar assembly;
e) monitoring the temperature of the heat seal bar assembly by collecting electrical resistance readings from the heating element of the heat seal bar assembly and comparing said electrical resistance readings to electrical resistance data gathered during a calibration cycle;
n) lowering the heat seal bar assembly to make contact with at least one said desired joint location to form a joint between overlapped bag portions in the desired joint location while continuing to collect and monitor electrical resistance readings of the heating element.

In one or more preferred embodiments, further comprising receiving an error signal if electrical resistance readings deviate from a desired range, indicating that the temperature of the heat seal bar assembly has deviated from a desired range.

In one or more preferred embodiments, the heat seal machine preferably includes more than one heat seal bar assembly that is calibrated so that electrical resistance readings provide information on temperature of the more than one heat seal bar assemblies.

In one or more preferred embodiments, more than one joint is preferably formed at the same time.

In one or more preferred embodiments, a method of manufacturing a bulk bag comprises the following steps:
 a) calibrating a heat seal bar assembly of a heat seal machine so that the temperature of a heating element is determined based on electrical resistance readings of the heating element;
 b) overlapping desired bag portions to form desired joint locations to form a pre-assembled or pre-heat sealed bulk bag;
 c) moving the pre-assembled or pre-heat sealed bulk bag into the heat seal machine with the heat seal bar assembly that does not include a heat sensor;
 d) starting a heat seal cycle of the heat seal bar assembly;
 e) heating the heat seal bar assembly;
 f) monitoring the temperature of the heat seal bar assembly by collecting electrical resistance readings from the heating element of the heat seal bar assembly and comparing said electrical resistance readings to electrical resistance data gathered during a calibration cycle;
 g) lowering the heat seal bar assembly to make contact with at least one said desired joint location to form a joint between overlapped bag portions in the desired joint location while continuing to collect and monitor electrical resistance readings of the heating element.

In one or more preferred embodiments of the present invention, a heating element of the present invention can be 6 inches to 90 inches in length.

In one or more preferred embodiments of the present invention, a method for temperature sensing and control of a heating element of a heat seal bar, comprises the following steps:
 a) providing a control panel that includes a controller, a transducer, a transformer and a switching device;
 b) providing a heat seal bar including a heating element;
 c) providing a sensor that is in contact with the heating element of the heat seal bar prior to using the heat seal bar in a heat seal cycle and removable from the heat seal bar during heating in the heat seal cycle;
 d) using the controller to provide calibration values of the heat seal bar during a calibration cycle based on temperature values received from the sensor and electrical resistance values of the heating element;
 e) applying power to the heating element using the transformer after the calibration cycle;
 f) processing voltage and current feedback signals received from the heat seal bar using the transducer, which the controller uses to calculate real-time electrical resistance of the heating element during the heat seal cycle; and
 g) calculating temperature of the heating element during heating based on electrical resistance data and calibration data acquired by the controller.

In one or more preferred embodiments of the present invention, a method of manufacturing a bulk bag comprises the following steps:
 a) calibrating a heat seal bar assembly of a heat seal machine so that a temperature of a heating element is determined based on electrical resistance readings of the heating element;
 b) overlapping desired bag portions to form desired joint locations to form a pre-heat sealed bulk bag;
 c) moving the pre-heat sealed bulk bag into the heat seal machine with the heat seal bar assembly that does not include a heat sensor sensing heat of the heating element;
 d) starting a heat seal cycle of the heat seal bar assembly;
 e) heating the heat seal bar assembly;
 f) monitoring temperature of the heat seal bar assembly by collecting electrical resistance readings from the heating element of the heat seal bar assembly and comparing said electrical resistance readings to electrical resistance data gathered during a calibration cycle; and
 g) lowering the heat seal bar assembly to make contact with at least one said desired joint location to form a joint between overlapped bag portions in the desired joint location while continuing to collect and monitor electrical resistance readings of the heating element.

In one or more preferred embodiments of the present invention, a method for temperature sensing and control of a heat seal bar assembly in a heat seal machine of a type that can heat seal flexible plastic fabrics together comprises the following steps:
 a) calibrating temperature and electrical resistance readings of a heating element of a heat seal bar using a sensor and a controller wherein the controller calculates average temperature values of the sensor and average electrical resistance values of the heating element during a calibration cycle and stores average temperature values and average electrical resistance values as calibration values;
 b) providing power to the heating element so that the heating element will begin heating during a heat seal cycle;
 c) processing voltage and current feedback signals of the heating element using the controller to calculate real-time electrical resistance of the heating element during the heat seal cycle; and
 d) calculating temperature of the heating element based on electrical resistance data received by the controller during the heat seal cycle and the calibration values; and
 e) wherein temperature readings from the sensor are not used to calculate temperature of the heating element during step (d).

In one or more preferred embodiments of the present invention, after step (a) the sensor is removed from the heat seal bar.

In one or more preferred embodiments of the present invention, the sensor is not used during steps (b) to (d).

In one or more preferred embodiments of the present invention, a method for temperature sensing and control of a heat seal bar assembly in a heat seal machine of a type that can heat seal flexible plastic fabrics together, comprises the steps of:
 a) calibrating temperature and electrical resistance readings of a heating element of a heat seal bar using a sensor and a controller wherein the controller calculates average temperature values of the sensor and average electrical resistance values of the heating element during a calibration cycle and stores average temperature values and average electrical resistance values as calibration values;
 b) providing power to the heating element so that the heating element will begin heating during a heat seal cycle;
 c) processing voltage and current feedback signals of the heating element using the controller to calculate real-time electrical resistance readings of the heating element during the heat seal cycle; and d) calculating temperature of the heating element based on the real-time electrical resistance readings received by the controller during the heat seal cycle and the calibration values; and e) wherein temperature readings from the sensor are not used to calculate temperature of the heating element during step (d).

In one or more preferred embodiments of the present invention, after step (a) the sensor is removed from the heat seal bar.

In one or more preferred embodiments of the present invention, after step (a), the sensor is not used during steps (b) to (d).

In one or more preferred embodiments of the present invention, a method of manufacturing a bulk bag comprises the steps of:
  a) moving a calibration cycle pre-heat sealed bulk bag into a heat seal machine comprising a heat seal bar assembly that has a calibration sensor coupled thereto;
  b) starting a calibration cycle of the heat seal bar assembly;
  c) heating a heating element of the heat seal bar assembly;
  d) moving the heat seal bar assembly to make contact with the calibration cycle pre-heat sealed bulk bag;
  e) collecting data on temperature and electrical resistance of the heating element to establish electrical resistance values of the heating element at selected temperatures;
  f) removing the calibration cycle pre-heat sealed bulk bag from the heat seal machine;
  g) moving a heat seal bulk bag having one or more heat seal areas where heat sealed joints will be formed into the heat seal machine with the heat seal bar assembly that was calibrated in steps "c" to "f";
  h) starting a heat seal cycle of the heat seal bar assembly;
  i) heating the heat seal bar assembly;
  j) monitoring the temperature of the heat seal bar assembly by collecting electrical resistance readings from the heating element of the heat seal bar assembly and comparing said electrical resistance readings to electrical resistance data of the calibration cycle; and
  k) moving the heat seal bar assembly to make contact with at least one said heat seal area and to form a joint at said heat seal area while continuing to collect and monitor electrical resistance readings of the heating element.

In one or more preferred embodiments of the present invention, a method of manufacturing a bulk bag comprises the following steps:
  a) calibrating a heat seal bar assembly of a heat seal machine so that a temperature of a heating element is determined based on electrical resistance readings of the heating element;
  b) moving a pre-heat sealed bulk bag that has one or more desired joint locations into the heat seal machine with the heat seal bar assembly;
  c) starting a heat seal cycle of the heat seal bar assembly;
  d) heating the heat seal bar assembly;
  e) monitoring temperature of the heat seal bar assembly by collecting electrical resistance readings from the heating element of the heat seal bar assembly and comparing said electrical resistance readings to electrical resistance data gathered during a calibration cycle; and
  f) lowering the heat seal bar assembly to make contact with at least one said desired joint location to form a joint while continuing to collect and monitor electrical resistance readings of the heating element.

In preferred embodiments of the present invention, preferably a sensor is not included on a heat seal bar during a heat seal cycle as sensors can easily be damaged during a heat sealing cycle, e.g., when heat sealing flexible plastic fabrics together. However, if desired, a sensor can remain on a heat seal bar or as part of heat seal machinery during a heat seal cycle with temperature sensing and control being based on electrical resistance readings and calibration data and values received during calibration of the heat seal bar.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 3-5 illustrate a preferred embodiment of a heating element of a heat seal bar of the present invention;

FIG. 16 illustrates a preferred embodiment of a screen on a control panel of the present invention, showing example calibration sensor readings with temperature calculated from transducer feedback signals;

FIG. 31 is a perspective view of a preferred embodiment of a body portion of a bulk bag of the present invention;

FIG. 32A is front view of a preferred embodiment of a body portion of a bulk bag of the present invention;

FIG. 32B is a partial detail view of a preferred embodiment of a body portion of a bulk bag of the present invention;

FIG. 33 is a top view of a preferred embodiment of a body portion of a bulk bag of the present invention that is folded/gusseted;

FIG. 34 is an end view of a preferred embodiment of a body portion of a bulk bag of the present invention that is folded/gusseted;

FIG. 39 is a perspective view of a preferred embodiment of a fill spout of a bulk bag of the present invention;

FIG. 40 is a front view of a preferred embodiment of a fill spout of a bulk bag of the present invention;

FIG. 41 is a top view of a preferred embodiment of a fill spout of a bulk bag of the present invention that is folded/gusseted;

FIG. 42 is an end view of a preferred embodiment of a fill spout of a bulk bag of the present invention that is folded/gusseted;

FIG. 59 illustrates a preferred embodiment of the method of the present invention of heating sealing bulk bag portions together between heat seal bars;

FIG. 60 illustrates a preferred embodiment of a heat sealed joint of a bulk bag of the present invention taken along lines 60-60 of FIG. 59;

FIG. 61 is a perspective view of a third preferred embodiment of a heat seal bar assembly of the present invention;

FIG. 62 is a side view of the third preferred embodiment of a heat seal bar assembly of the present invention;

FIG. 63 is an exploded view of the third preferred embodiment of a heat seal bar assembly of the present invention;

DETAILED DESCRIPTION OF THE INVENTION

Figure 1:
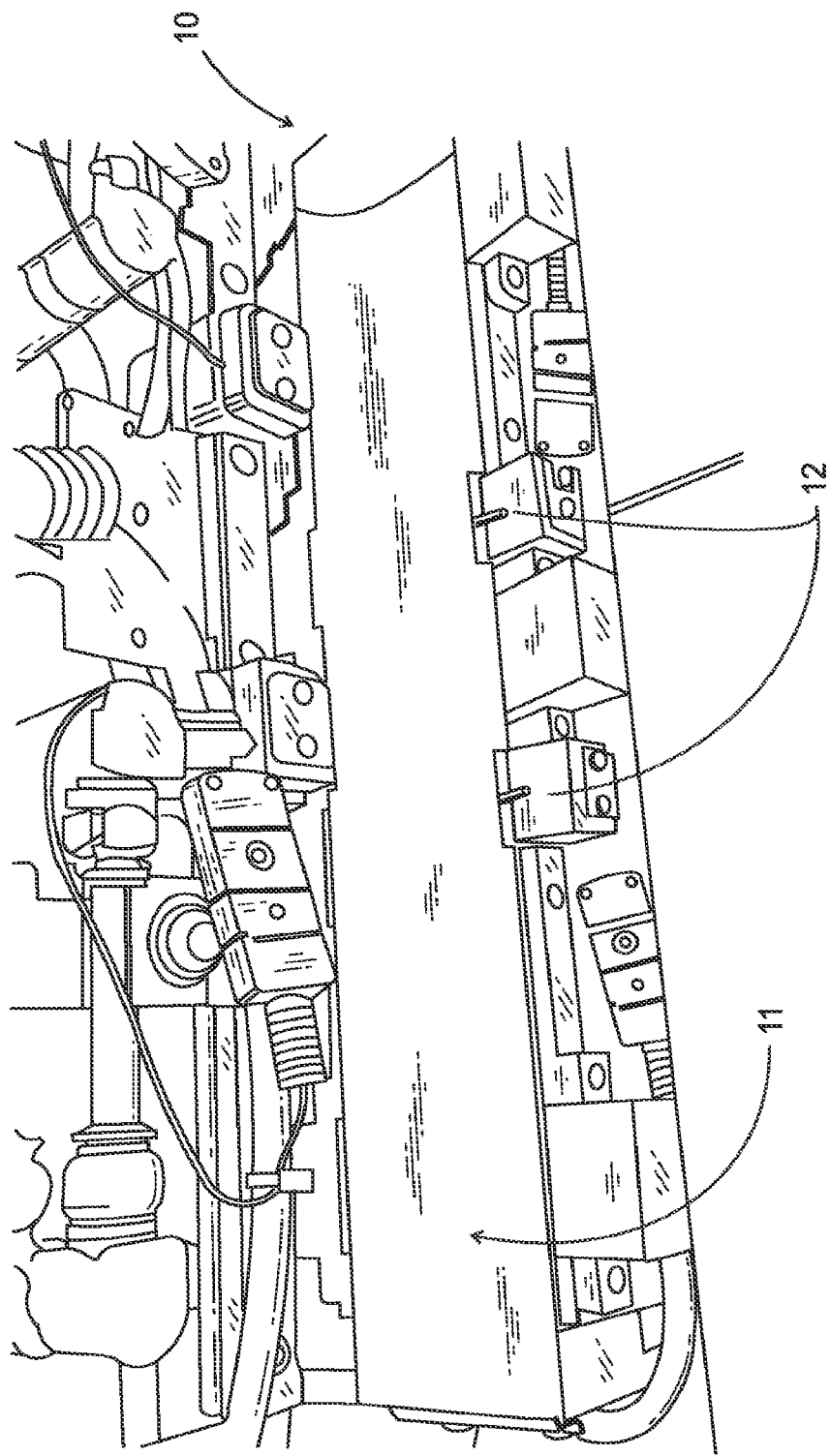
FIG. 1 is a perspective view of a prior art heat seal bar that includes thermocouple sensors that stay on the heat seal bar during a heat sealing cycle to join plastic fabrics together.
Figure 2:
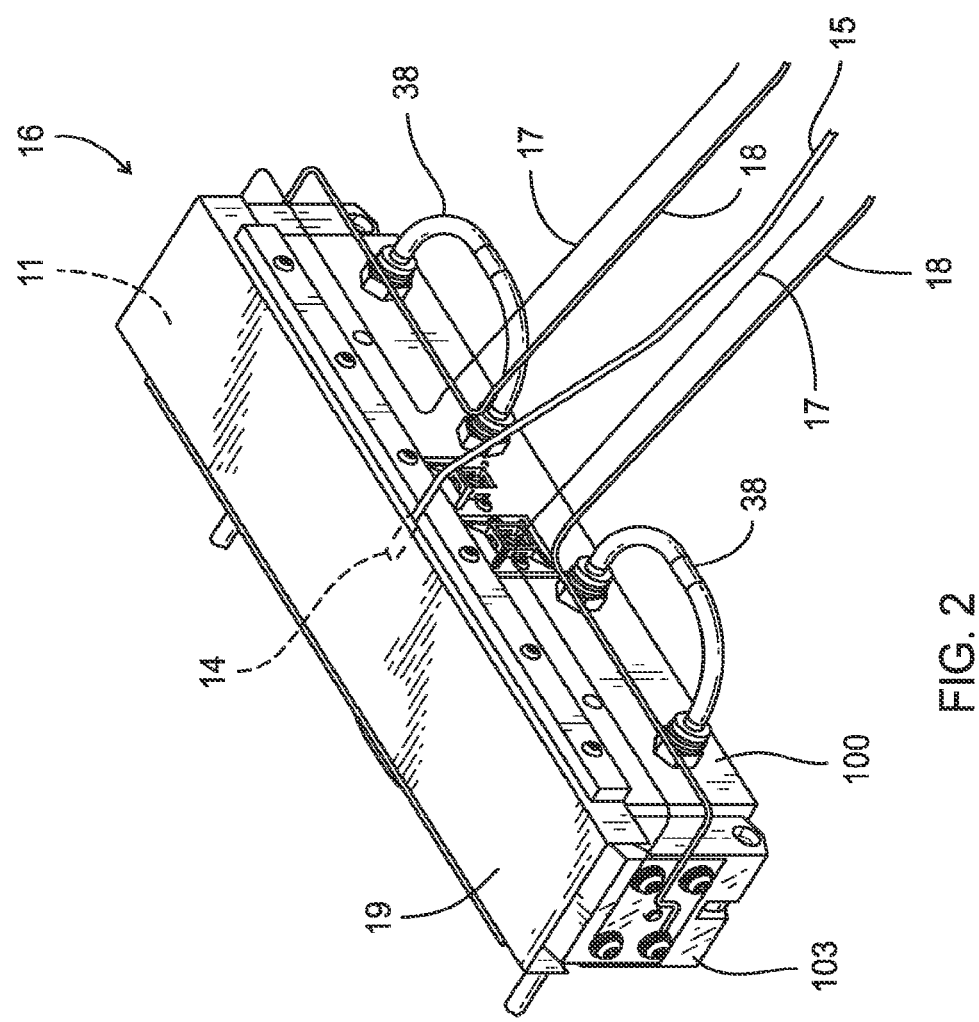
FIG. 2 is a perspective view of a first preferred embodiment of a heat seal bar assembly of the present invention that is being calibrated.
Figure 71:
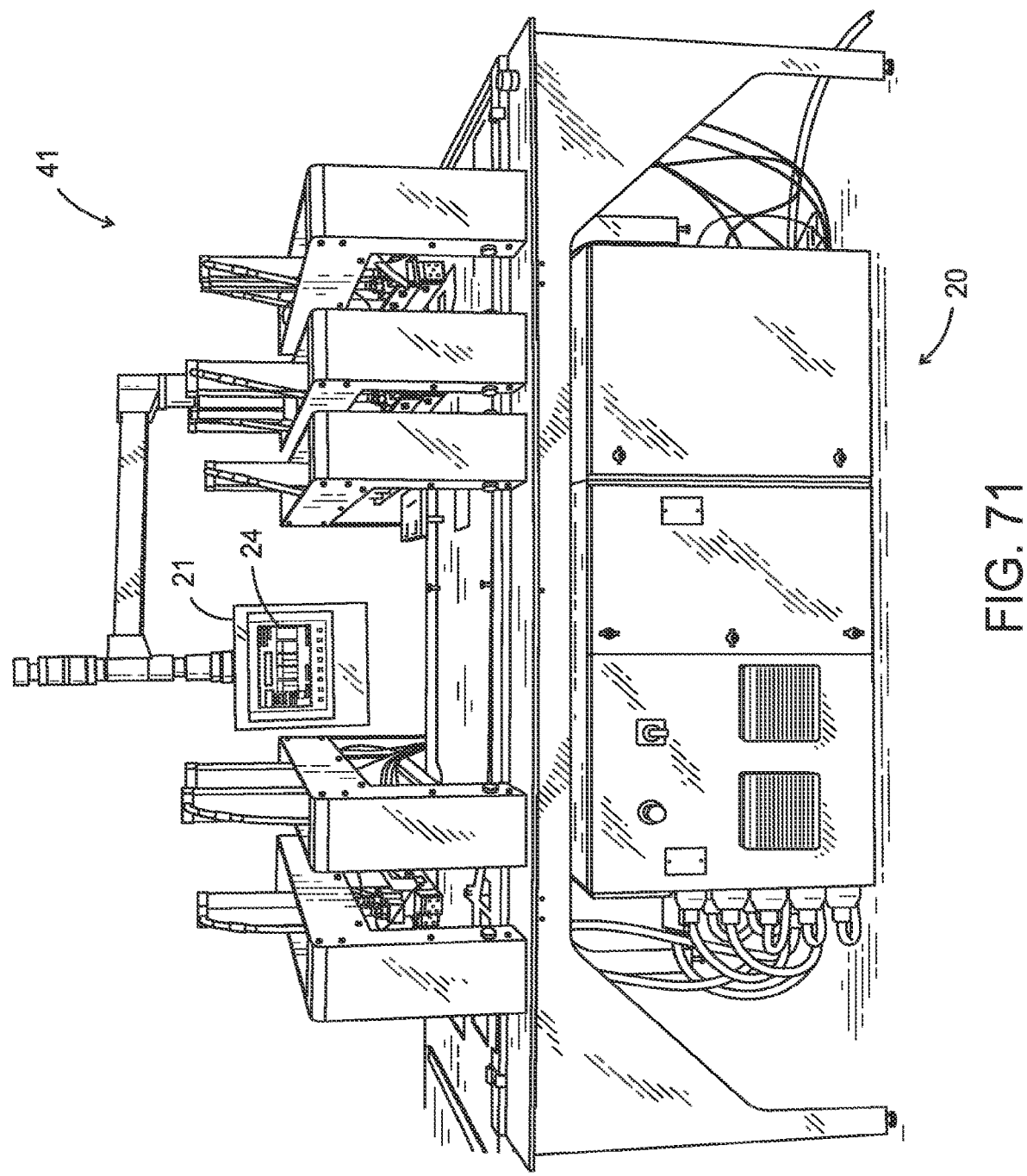
FIG. 71 is a front view of a second preferred embodiment of a control panel of the present invention under a heat seal machine of the present invention.

FIG. 1 illustrates a prior art heat seal bar 10. FIGS. 2-71 illustrate preferred embodiments of the sensorless heat sealing apparatus, system and method of the present invention.

In FIG. 1, a prior art heat seal bar 10 includes a heating element 11. Sensors 12 are shown, which remain on heat seal bar 10 during heat sealing in the prior art applications of heat sealing woven plastic fabric together to make a bulk bag, for example.

As discussed herein, in the heat sealing systems of patent application publication numbers US2014/0363106 and US2018/0126661A1, for example, external thermocouple sensors 12 are used to monitor and control temperatures during a heat sealing process. These sensors 12 are typically flat "leaf-type" sensors that are installed under each heating element 11 and make physical contact with the heating element 11. These sensors 12 are very fragile and after numerous machine cycles, they can become physically damaged to the point of failure. In use, a major factor that contributes to sensor 12 damage is the expansion and contraction of the heating elements 11 under pressure during the heating and cooling process when heat sealing plastic bulk bag portions together, for example. The friction between the heating elements 11 and sensors 12 causes two (2) undesired consequences. Often times the sensors 12 will physically move out of position causing an inaccurate reading. In other instances, the friction over time causes insulation protecting the sensor head to separate, causing the sensor head to short out on the heating element 11. Sensors 12 quickly became a major maintenance issue that regularly impacted production in the prior art.

FIG. 2 illustrates a first preferred embodiment of a heat seal bar assembly of the present invention, designated generally by the numeral 16. A sensor 14, which is sometimes referred to herein as a calibration sensor, can be selectively included in heat seal bar assembly 16, e.g., during calibration of heat seal bar assembly 16, and can be selectively removed from heat seal bar assembly 16, e.g., after calibration is complete and heat seal bar assembly 16 is ready to be used in a heat sealing process. A heat seal bar assembly 16 also preferably includes lines 38, which are sometimes referred to herein as water cooling lines, which can be used to help speed up a cool-down time of heating element 11 of heat seal bar assembly 16.

Figure 67:
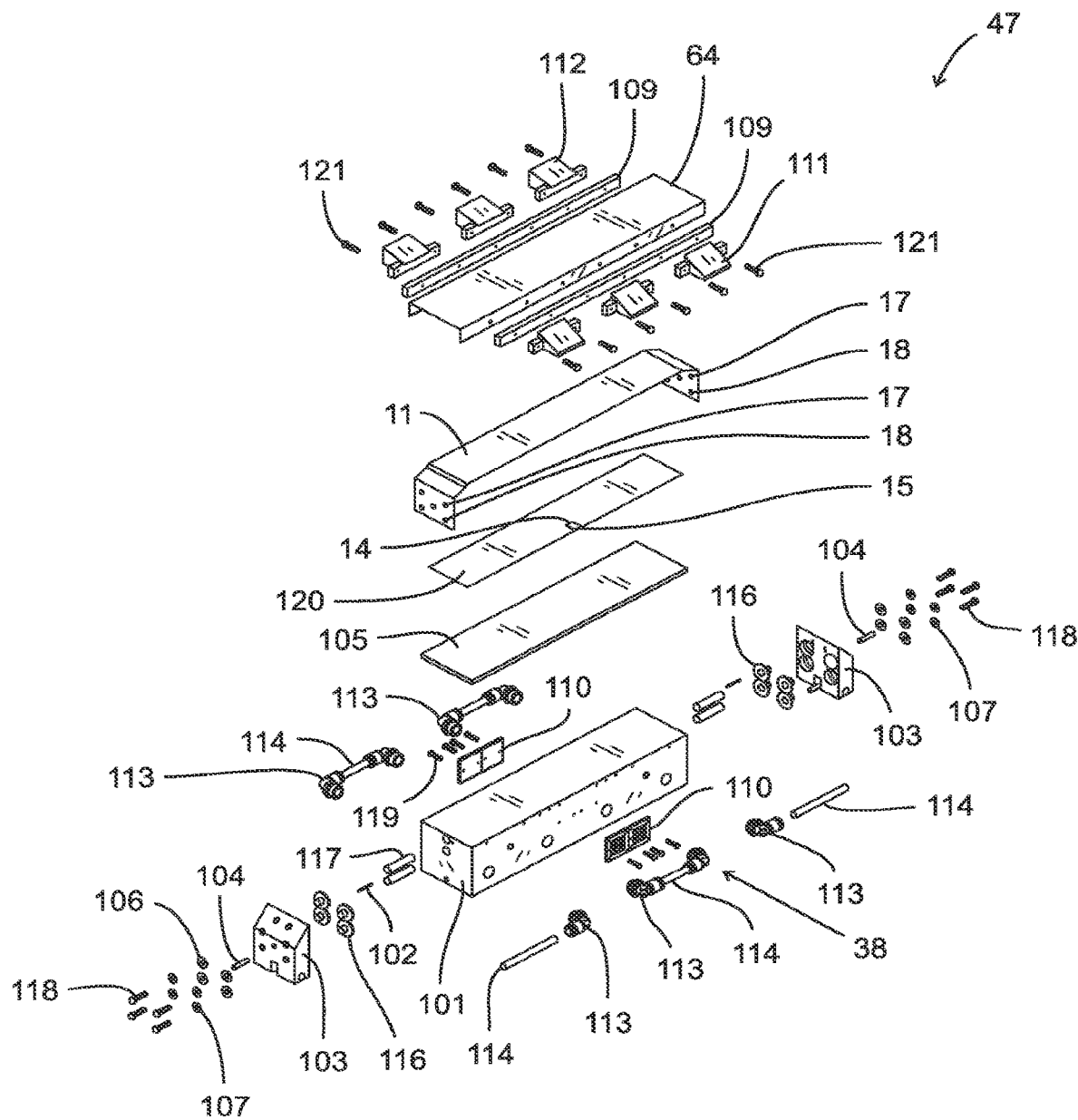
FIG. 67 is an exploded view of the fifth preferred embodiment of a heat seal bar assembly of the present invention.

Heat seal bar assembly 16 can include a body portion 100 that is shaped according to a desired bag joint shape. (See also FIG. 67 with regard to a heat seal bar assembly 47). Heat seal bar assembly 16 can also include an insulating pad 105 and a protective sheet 120 in between a body portion and heating element 11 (e.g., like what is shown and described with regard to FIG. 67). A cover 19 can be on top of heating element 11. Heating element 11 is also preferably shaped according to a desired bag joint shape. End plates or end caps 103 can be included. End plates or end caps 103 and heating element 11 can be coupled to body 100 with a desired fastener assembly, e.g. springs 117, nuts 116, pins 102, pins 104, washers 106, washers 107, and screws 118 as shown in FIG. 67 for example.

A cover 19 can be coupled to a body 100 with screws 121, or other desired fasteners. Bumpers 111, 112 and clips 109 can also be coupled to body 100 with screws 121. Bumpers 111, 112 are preferably in position to provide a bumper for carrier plate 40. Cooling lines 38 can also be included on a heat seal bar assembly 16, which can comprise tubing 114 and can be coupled to body 100 with an elbow 113, screws 119, and tie holder 110, or with another desired fastener.

Figure 25:
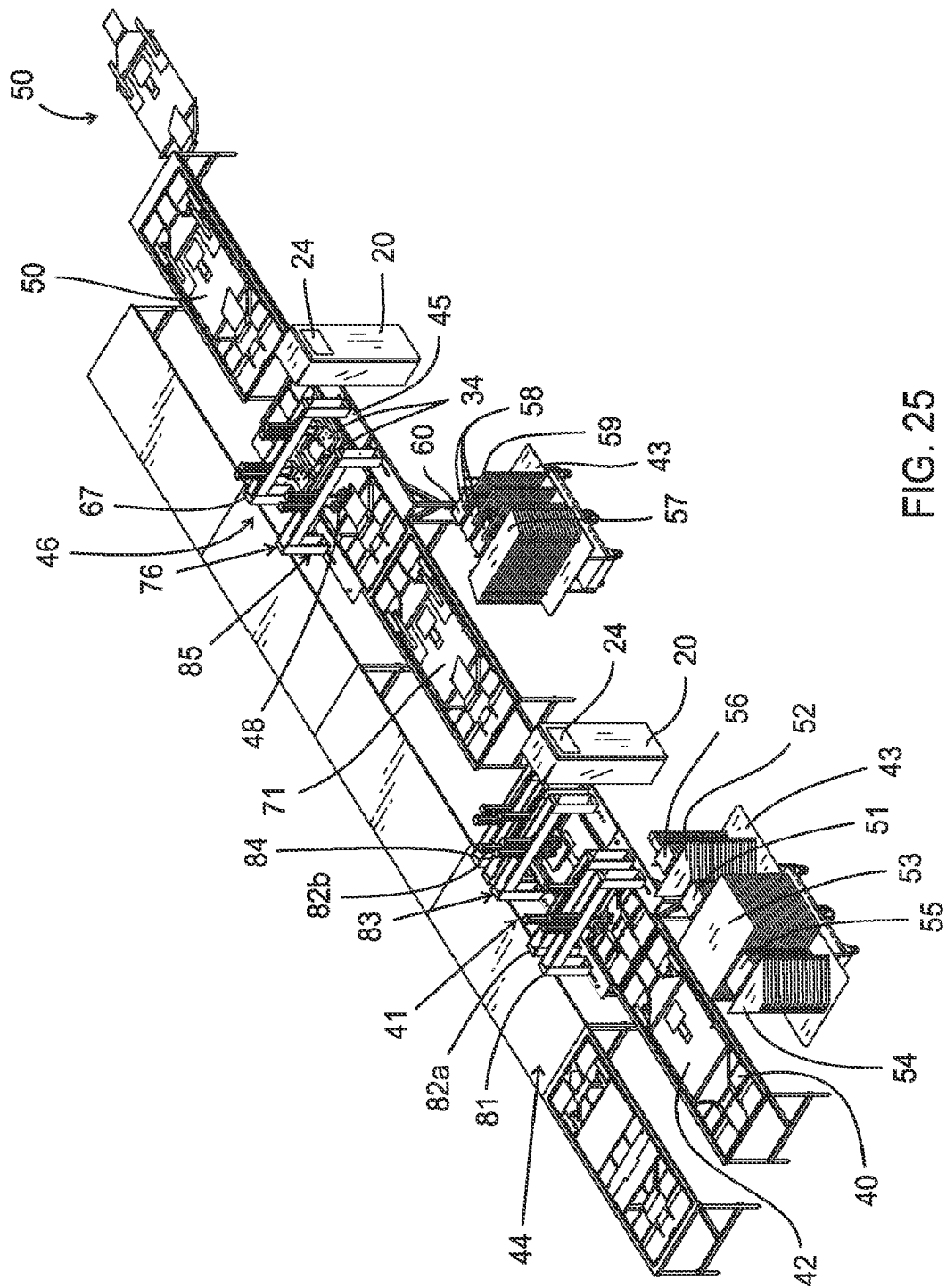
FIG. 25 is a perspective view of an assembly line heat seal bulk bag production area in a preferred embodiment of the system and process of the present invention.
Figure 26:
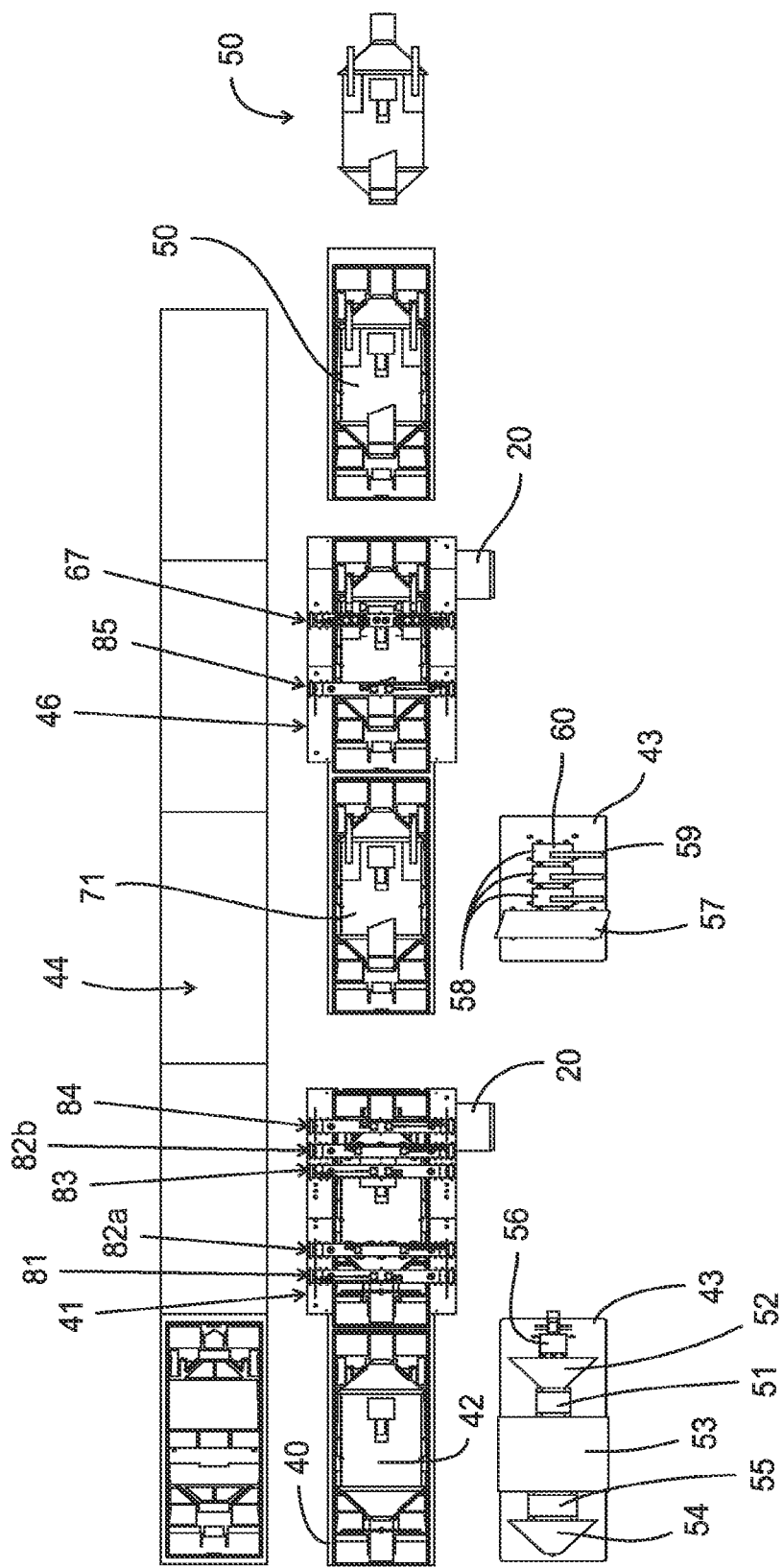
FIG. 26 is a top view of the assembly line heat seal bulk bag production area as shown in FIG. 25.
Figure 27:
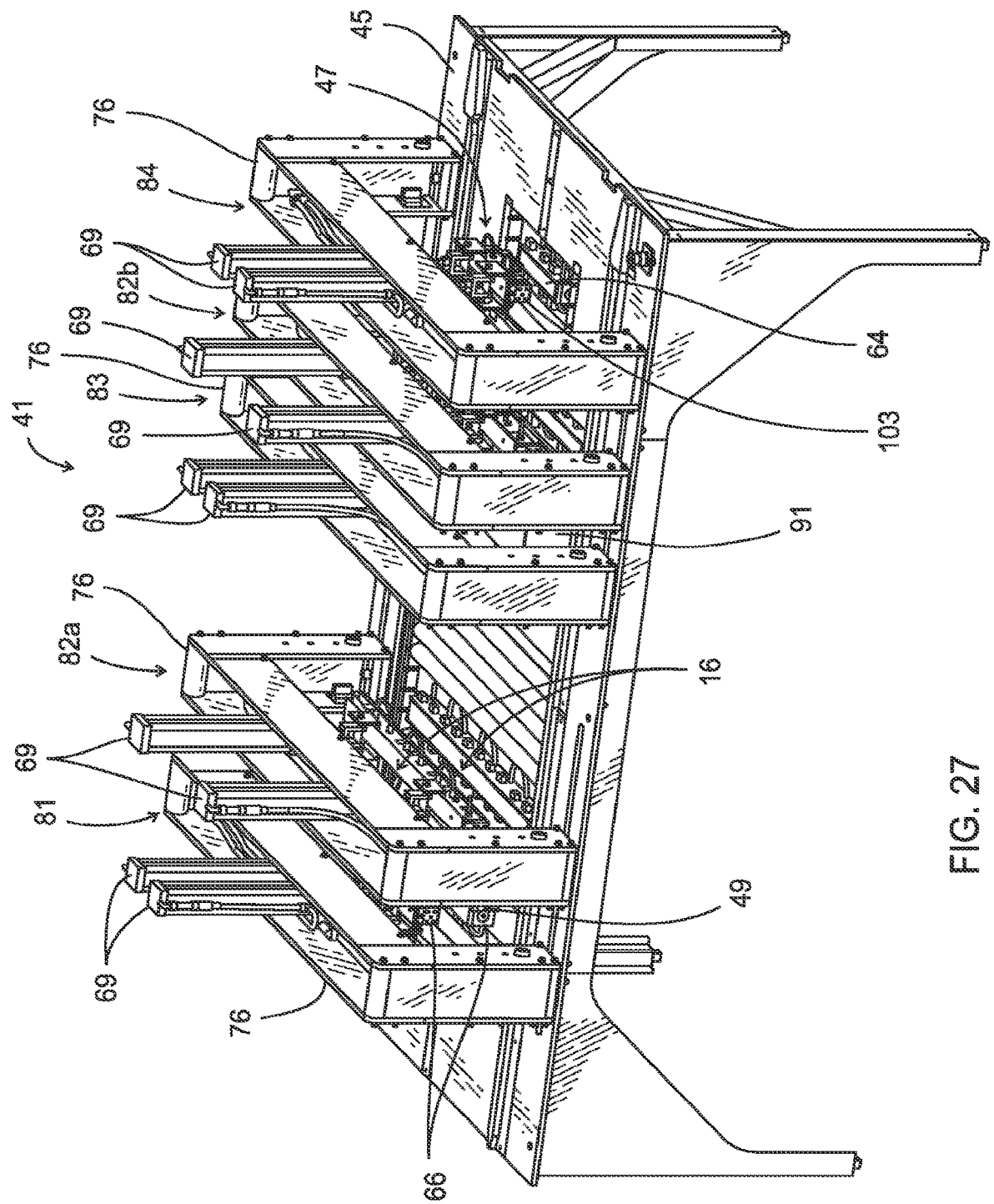
FIG. 27 is a perspective view of a first preferred embodiment of a heat sealing machine of the present invention.
Figure 28:
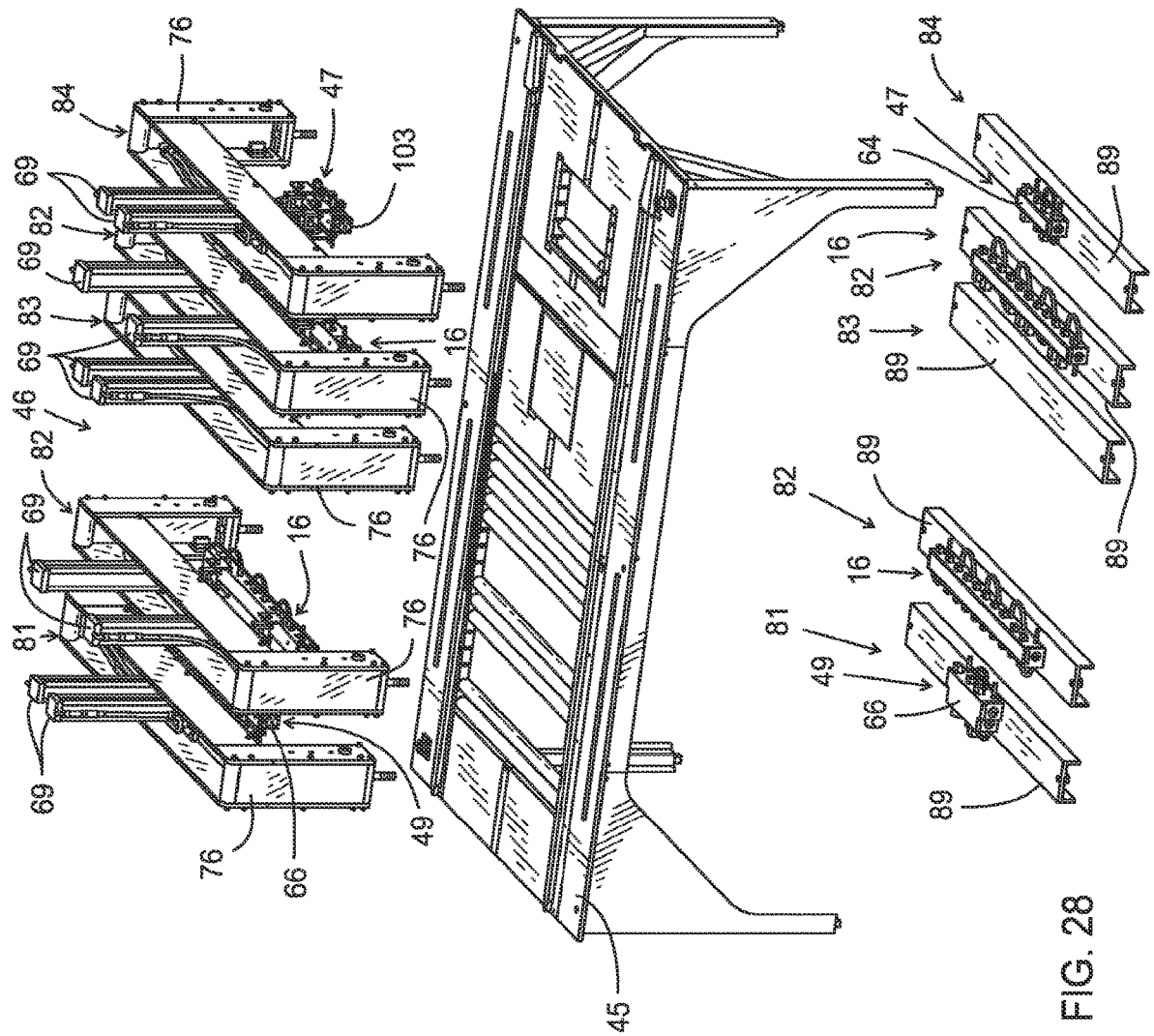
FIG. 28 is an exploded view of the first preferred embodiment of a heat sealing machine of FIG. 27.

A heat seal bar assembly 16 can be used to join a top/top portion 52 and a body/body portion 53, or a bottom/bottom portion 54 and body/body portion 53 of a bulk bag 50 together in a heat seal machine 41 in preferred embodiments of the heat sealing system and process of the present invention (see FIGS. 25-30). In preferred embodiments of the present invention, lower and upper heat seal bar assemblies 16 are included in a heat seal machine 41 as shown in FIGS. 27-28 to heat seal a body 53 to a top portion 52 and to heat seal a body 53 to bottom portion 54 so as to have heat evenly distributed from top to bottom during a heat sealing process. Only one of the lower or upper heat seal bar assemblies 16 needs to be calibrated if the upper and lower heat seal bar assemblies are the same. If desired, however, or if upper and lower heat seal bar assemblies are not the same, then each upper and lower heat seal bar assembly can be calibrated.

Referring to FIGS. 2 and 8-12, during calibration, a calibration sensor 14 can be placed under a heating element 11 of heat seal bar assembly 16 where calibration sensor 14 makes physical contact with heating element 11. Calibration sensor 14 can plug into a connector that is wired back to controller 21, e.g., with electrical line/sensor lead line 15. Power transformers 25 are also preferably connected to heat seal bar 16 via other electrical lines/power wires from transformers 18, which connect to power transformers 25 at a control panel 20. Electrical lines/voltage measuring wires 17 from voltage transducers 22 are also shown in FIG. 2, which preferably connect to voltage transducers 22 at a control panel 20.

In a preferred embodiment of a sensorless temperature sensing and control system and method of the present invention, during a heat sealing process of a bulk bag 50, which preferably is made of woven plastic fabric (e.g., polyethylene or polypropylene fabric, for example), electrical voltage and current feedback signals received by a controller 21 (e.g., a PLC, lap top, computer, or other desired controller) from a heating element 11 of a heat seal bar assembly 16 are used to monitor and control the temperature of heating elements 11, wherein no heat sensing sensors, e.g., no sensors 12 or 14, are physically connected to a heat seal bar assembly 16 during the heat sealing process.

FIGS. 3-5 illustrate a heating element 11 of the present invention, which preferably includes plating 13, which preferably is made of copper. In preferred embodiments a heating element 11 is copper plated with about 0.001" to 0.006" of copper plating 13 on each end of both sides of heating element 11 for a length of about 2 and 7/16" from each end. Dimensions of a heating element can vary depending on the type of heat seal bar assembly that heating element 11 is included in. For example, in preferred embodiments as shown and described herein a heating element 11 of heat seal bar assembly 16 used to heat seal a top portion 52 and body portion 53 together is preferably longer than a heating element of a heat seal bar assembly 47 that is used to heat seal a fill spout 51 and top portion 52 together. The length and width and dimensions of a heating element 11 can be chosen based on the desired size of a heat sealed joint 86 between flexible fabrics to be joined together.

Figure 6:
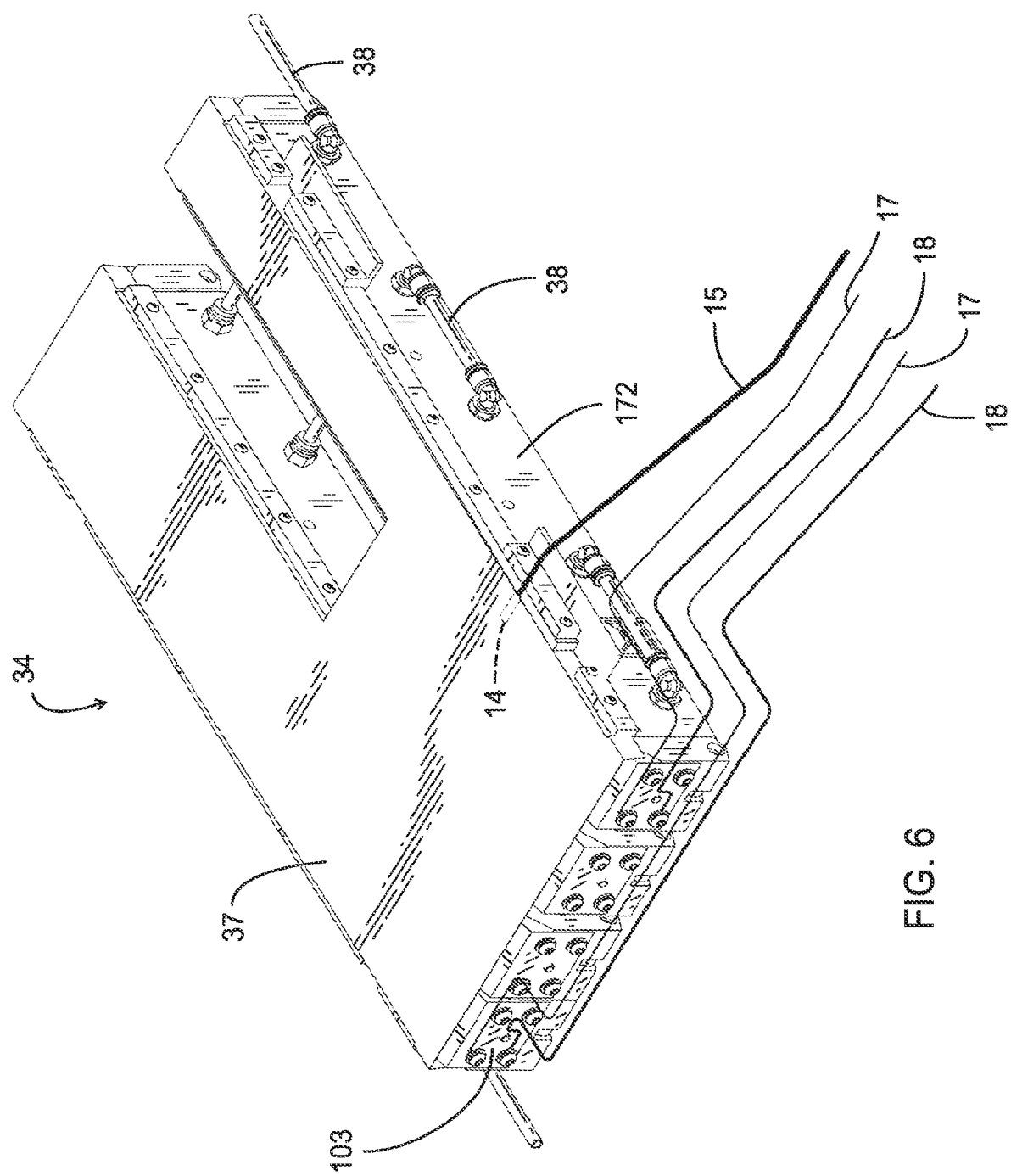
FIG. 6 is a perspective view of a second preferred embodiment of a heat seal bar assembly of the present invention that is being calibrated.
Figure 7:
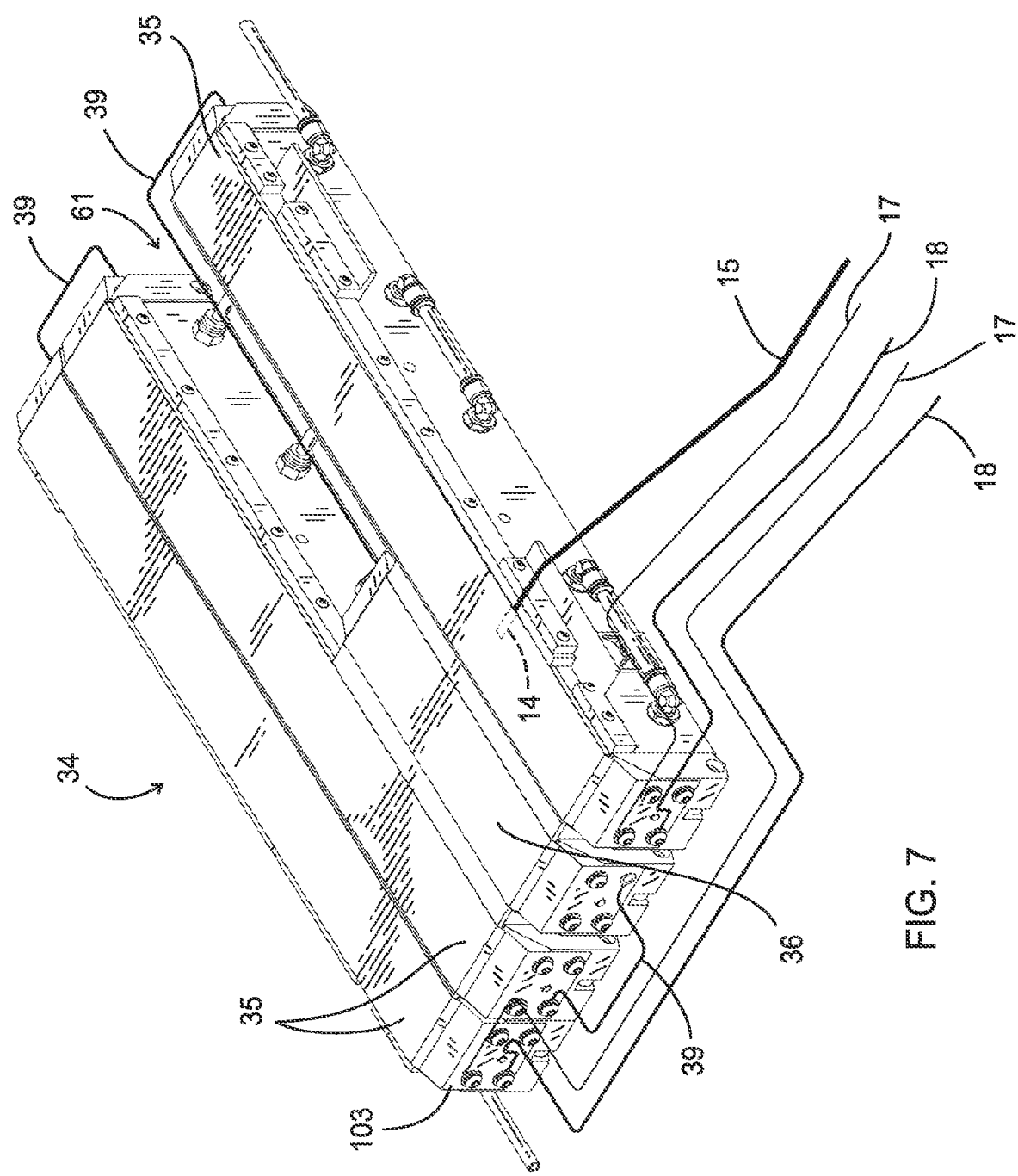
FIG. 7 is another perspective view of the second preferred embodiment of a heat seal bar assembly of the present invention as shown in FIG. 6 without a top cover thereon.

FIGS. 6-7 illustrate a second preferred embodiment of a heat seal bar assembly 34, which is used in one or more preferred embodiments of the system and method as shown and described herein to heat seal a lift loop assembly 58 to a bulk bag 50 body portion 53. Preferably, a lift loop assembly 58 includes lift loop/lift member 59 coupled to a patch 60, which preferably is made of flexible plastic fabric (see e.g., FIGS. 18, 48-49). Lift loop/lift member 59 preferably is sewn to patch 60 and patch 60 is then joined to bulk bag 50 via heat sealing. Lift loop/lift member 59 can also be coupled to patch 60 via heat sealing or use of an adhesive, for example, if desired. Preferably a lift loop 59 and/or patch 60 is not stitched to a body portion 53 of a bag 50.

Heat seal bar assembly 34 preferably includes 3 heating elements 35, preferably of the same dimensions, and one heating element 36, which is preferably shorter than heating elements 35. Respective heating elements 35, 36 of heat seal bar assembly 34 are preferably not connected together on the top but are electrically connected together through power jumper lines 39 at end caps 103 to the ends of heating elements 35, 36, e.g., as shown in FIG. 7. If the heating elements 35, 36 touch each other on the top, they can short out. Therefore, preferably a gap is included between heating elements 35, 36, e.g., most preferably there is an ⅛" (⅛ inch) gap (or preferably a gap of ⅛ inch to ¼ inches) between heating elements 35, 36. A cover 37 is included on top of heat seal bar assembly 34 in FIG. 6. In FIG. 7, cover 37 is removed. Heating elements 35, 36 can be constructed in a similar way as a heating element 11 shown in FIGS. 3-5, with dimensions selected based on the desired joint area for the joint between patch 60 and body 53.

Heat seal bar assembly 34 can have a base or body portion 172 preferably with a "u" shape defining the shape of the assembly. Heat seal bar assembly 34 can also include an insulating pad and a protective sheet (e.g., similar to a protective pad 105 shown in FIG. 66 with regard to seal bar assembly 49 but having a shape adapted to fit with seal bar assembly 34) in between a body portion 172 and heating elements 35, 36. A cover 37 can be on top of heating elements 35, 36. Heating elements 35, 36 together collectively are also preferably shaped according to a desired bag joint shape. End plates or end caps 103 can be included. End plates 103 and heating elements 35, 36 can be coupled to body 172 with a desired fastener assembly, e.g. springs 117, nuts 116, pins 102, pins 104, washers 106, washers 107, and screws 118 as shown in FIG. 66 for example.

Figure 66:
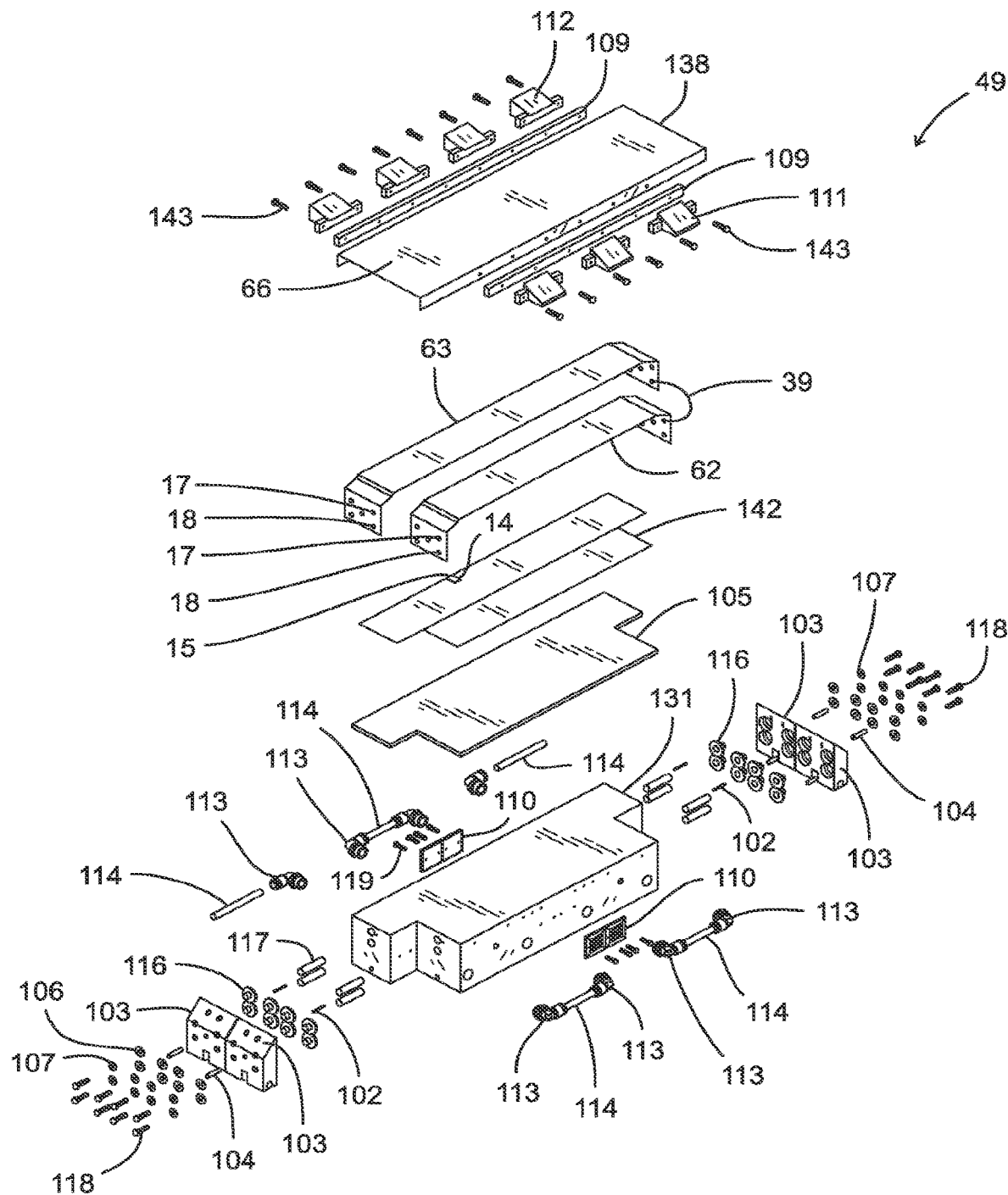
FIG. 66 is an exploded view of the fourth preferred embodiment of a heat seal bar assembly of the present invention.

A cover 37 can be coupled to a body 172 with a screw, e.g., with screw 143 shown in FIG. 66, or other desired fasteners. Bumpers 111, 112 and clips 109 can also be coupled to body 172 with a screw, e.g., a screw 143 or other desired fastener. Bumpers 111, 112 are preferably in position to provide a bumper for carrier plate 40. Cooling lines 38 can also be included on a heat seal bar assembly 34, which can comprise tubing 114 and can be coupled to body 172 with an elbow 113, screws 119, and tie holder 110, or with another desired fastener. Heat seal bar assembly 34, thus can include similar parts and components as shown with regard to heat seal bar assembly 49 in FIG. 66, with dimensions of respective pieces changed based on the heat seal bar assembly 34 shape.

Preferably a shape of heat seal bar assembly 34 allows heating sealing of patch 60 to bag 50 body 53 without a heat seal bar assembly contacting lift loop 59. When a lift loop assembly 58 is gusseted/folded on body 53 prior to heat sealing, e.g., as shown in FIGS. 18, 20-22, 25-26, preferably lift loop assembly 58 is positioned on body 53 so that heat seal bar assembly 34 during heat sealing patch 60 to body 53 in heat sealing machine 41 does not touch lift loop 59, with lift loop 59 being located in the space/gap 61 that is not occupied by heating element 36, in between two heating elements 35.

During calibration, a calibration sensor 14 can be placed under a heating element 35 or 36, where the calibration sensor 14 can make physical contact with a said heating element 35 or 36, which is shown in FIG. 7 with respect to a heating element 35. In FIG. 7, calibration sensor 14 is shown calibrating a heating element 35. Power jumper lines 39 preferably enable use of only one calibration sensor 14 for heat seal bar assembly 34 even though more than one heating element is included in heat seal bar assembly 34. Calibration sensor 14 can plug into a connector that is wired back to controller 21, e.g., with electrical line/sensor lead 15. Power transformers 25 are also preferably connected to heat seal bar assembly 34 via other electrical lines/power wires from transformers 18, which connect to power transformers 25 at a control panel 20. Electrical lines/voltage measuring wires from voltage transducers 17 are also shown in FIGS. 6, 7, which preferably connect to voltage transducers 22 at a control panel 20 (see FIGS. 8-10, 11, 13).

In preferred embodiments of calibrating a heat seal bar assembly 16 or 34, first a calibration sensor 14 is used to calibrate voltage and current feedback signals received by controller 21 when sensor 14 senses different temperatures of a heating element 11, 35 or 36. After calibration of a heat seal bar assembly 16 or 34 using a sensor 14, voltage and current feedback signals are preferably processed by a controller 21 to calculate the real-time electrical resistance of a heating element 11, 35 or 36. Data and electrical resistance is then used to calculate real-time temperature of the heat seal bar assembly 16 or 34 during heating sealing plastic bag portions together when a sensor 14 is no longer attached to heat seal bar assembly 16 or 34. The third, fourth, fifth and sixth preferred embodiments of a heat seal bar assembly of the present invention as shown in FIGS. 61-68 can also be calibrated in the same or a similar way with a calibrating sensor 14 placed under a respective heating element of the different embodiments of the heat seal bar assemblies that are in communication with control panel 20.

Figure 10:
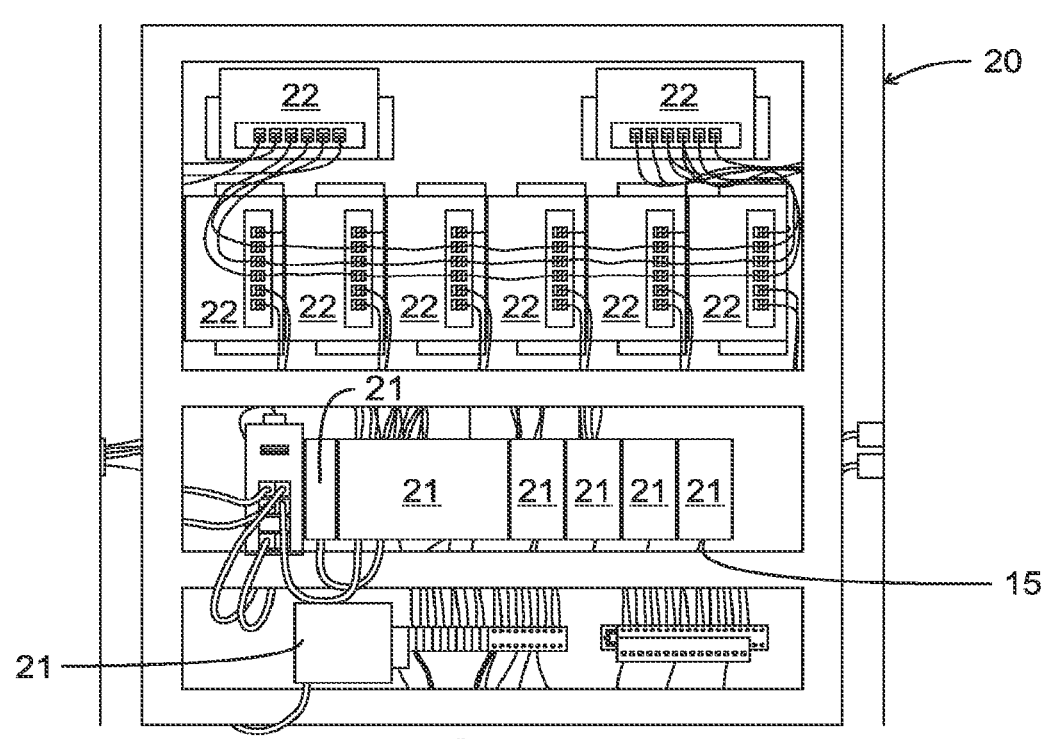
FIG. 10 is a partial view of the first preferred embodiment of a control panel of the present invention.
Figure 11:
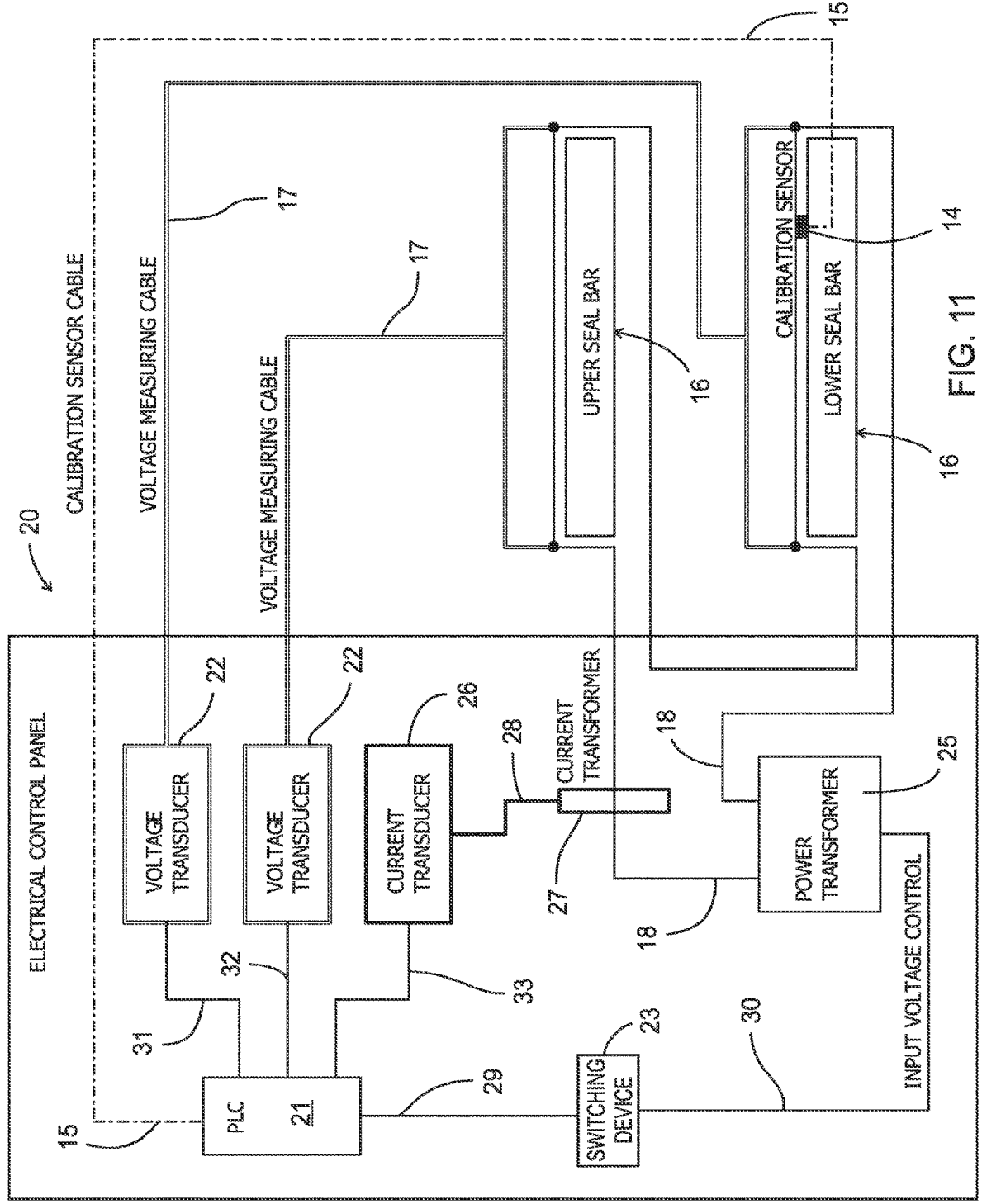
FIG. 11 is a schematic diagram illustrating electrical components and layout for calibration of a heat sealer circuit in a preferred embodiment of the apparatus, system and process of the present invention.

FIG. 11 illustrates preferred electrical components and layout for resistance control during a calibration cycle in a preferred embodiment of the apparatus, system and process of the present invention. As shown in FIG. 11, a control panel 20 includes a controller or PLC 21, a switch or switching device 23 (e.g., a Solid State Relay (SSR) or a Silicon Controlled Rectifier (SCR)), voltage transducers 22, a current transducer 26, a current transformer 27, and a power transformer 25 (see also FIGS. 8-10, 71). Controller or PLC 21 is in electrical communication with voltage transducers 22 via lines/wires 31, 32. Controller or PLC 21 is in electrical communication with current transducer 26 via line/wire 33. Controller or PLC 21 is in communication with switch or switching device 23 via input voltage control line/wire 29. Switch or switching device 23 (e.g., a solid state relay switch or a silicon controlled rectifier) is also in communication with power transformer 25 via input voltage control line/wire 30. Current transducer 26 is in communication with current transformer 27 via line/wire 28. Current transformer 27 is in communication with power transformer 25 via power line/wire 18. Voltage transducers 22 are in communication with one or more heat seal bars 16 via line/voltage measuring cables 17. Power transformer 25 is in communication with current transformer 27 and/or one or more heat seal bars 16 via power lines/wires 18. Calibration sensor 14 on a lower heat seal bar assembly 16 of a machine heat seal assembly 82 is in electrical communication with controller or PLC 21 via line 15. Heat seal bar assemblies 34, 47, 48, 49, 91 can also be calibrated in the same way.

Figure 12:
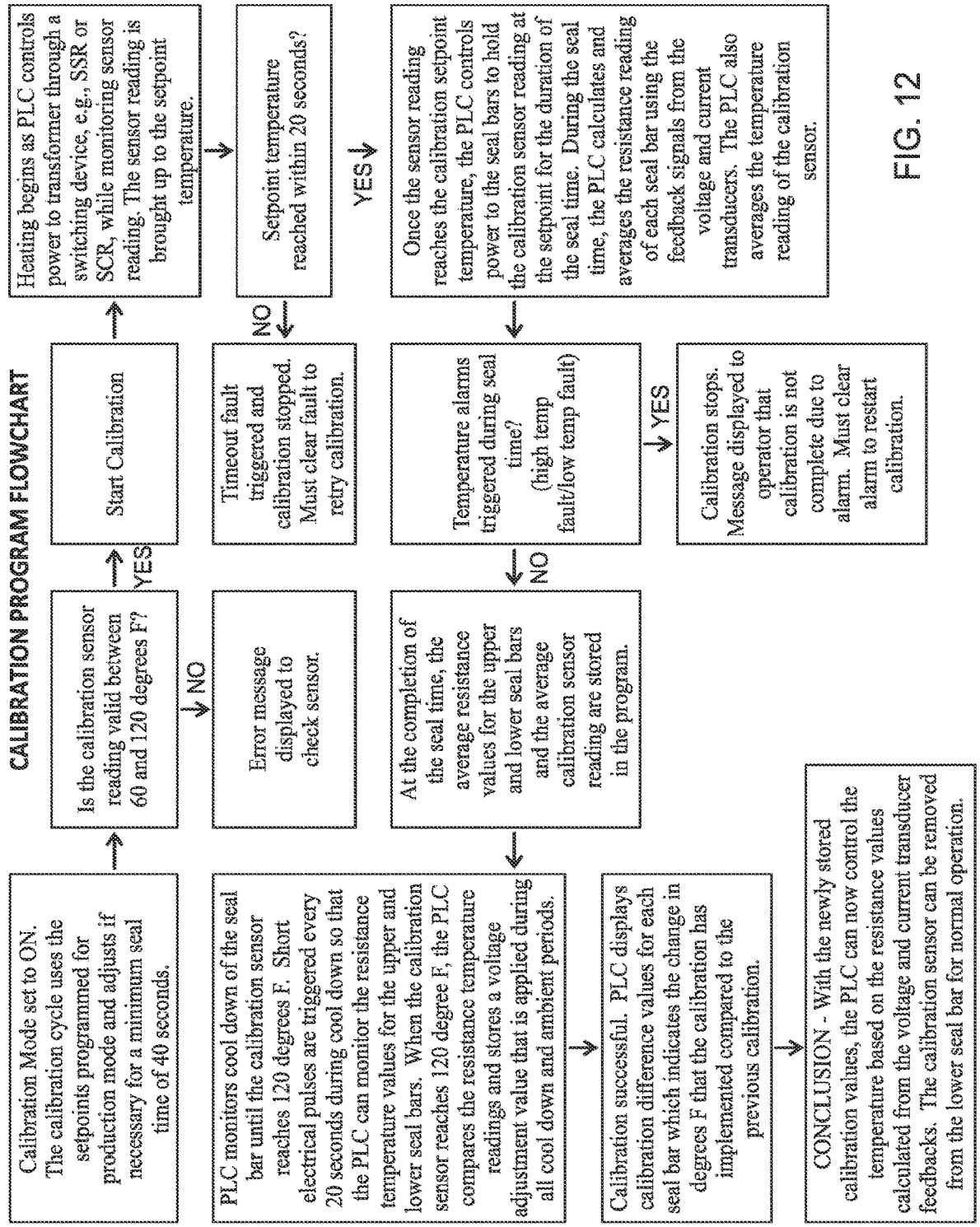
FIG. 12 is a preferred embodiment of a calibration flow chart showing preferred process steps during calibration of a heat seal bar assembly of the present invention.

FIG. 12 is a Flow Chart illustrating process steps during calibration that software of controller or PLC 21 can be programmed to step through, as set forth below.

Calibration Mode is set to ON at controller 21. The calibration cycle uses the setpoints programmed for production mode and adjusts if necessary for preferably a minimum seal time of 40 seconds. (A minimum seal time can also be set to another time interval if desired.)

Is the calibration sensor reading valid between 60 and 120 degrees F.? If not, an error message is displayed to check sensor. If yes, start calibration mode begins. 60 to 120 degrees F. is a preferred range for the calibration cycle because this range helps to ensure that a calibration sensor is installed and has a good reading. When sensors become defective, they will sometimes produce a really high or low reading back to a controller 21. Defective sensors also sometimes produce a reading that bounces around dramatically. Also, when a sensor is not installed a controller 21 reading usually will bounce around dramatically and tends to read high. Having this range helps to ensure that a "good" sensor is installed and ready for a "good" calibration.

Heating begins as controller or PLC 21 controls power to transformer 25 through a switching device while monitoring sensor 14 reading. The sensor 14 reading is brought up to the setpoint temperature. The set point temperature is preferably the same as the production setpoint temperature for that particular seal bar so that the calibration can be as accurate as possible at the normal sealing temperature for that seal bar. (Note: the normal production setpoint temperatures vary for each seal bar.) The setpoint temperature can also be any temperature within the specification range of the sensor.

Is setpoint temperature reached within 20 seconds? If not, a timeout fault is triggered and calibration is stopped. Preferably the fault must be cleared, e.g., by technical support, to retry calibration. If yes, once the sensor reading reaches the calibration setpoint temperature, the controller or PLC 21 controls power to the seal bars to hold the calibration sensor 14 reading at the setpoint for the duration of the seal time. (20 seconds is a preferred time interval because the typical time to reach a setpoint temperature is between 10-15 seconds. Other time intervals can be 15 to 30 seconds.) During the seal time, the controller or PLC 21 calculates and averages the resistance reading of each seal bar assembly 16 using the feedback signals from the voltage 22 and current 26 transducers. The controller or PLC 21 also averages the temperature reading of the calibration sensor 14.

Are temperature alarms triggered during seal time (high temp fault/low temp fault)? If yes, calibration stops. Message is displayed to operator that calibration is not complete due to alarm. Preferably, the alarm must be cleared, e.g., by the operator or technical support, to restart calibration.

If no, at the completion of the seal time, the average resistance values for the upper and lower seal bar assemblies 16 and the average calibration sensor 14 reading are stored in the program.

Controller or PLC 21 monitors cool down of the seal bar assembly 16 until the calibration sensor reaches 120 degrees F. (120 degrees F. is a preferred temperature because it is close enough to ambient to make an accurate adjustment to the sampling temperature. A temperature range can also be 80 to 130 degrees F.) Short electrical pulses are triggered preferably every 20 seconds during cool down (or every 5 to 30 seconds) so that the PLC can monitor the resistance temperature values for the upper and lower seal bar assemblies 16. When the calibration sensor 14 reaches 120 degree F., the controller or PLC 21 compares the resistance temperature readings and stores a voltage adjustment value that is applied during all cool down and ambient periods.

Calibration is successful. The controller or PLC 21 displays calibration difference values for each seal bar assembly 16 which indicates the change in degrees Fahrenheit that the calibration has implemented compared to the previous calibration.

CONCLUSION—With the newly stored calibration values, the controller or PLC 21 can now control the temperature based on the resistance values calculated from the voltage 22 and current 26 transducer feedbacks. The calibration sensor 14 can be removed from the lower seal bar for normal operation during a heat sealing process, e.g., to join plastic fabrics together.

Heat seal bar assemblies 16, 34, 47, 48, 49, and 91 can be calibrated using the steps as shown in FIG. 12.

Figure 13:
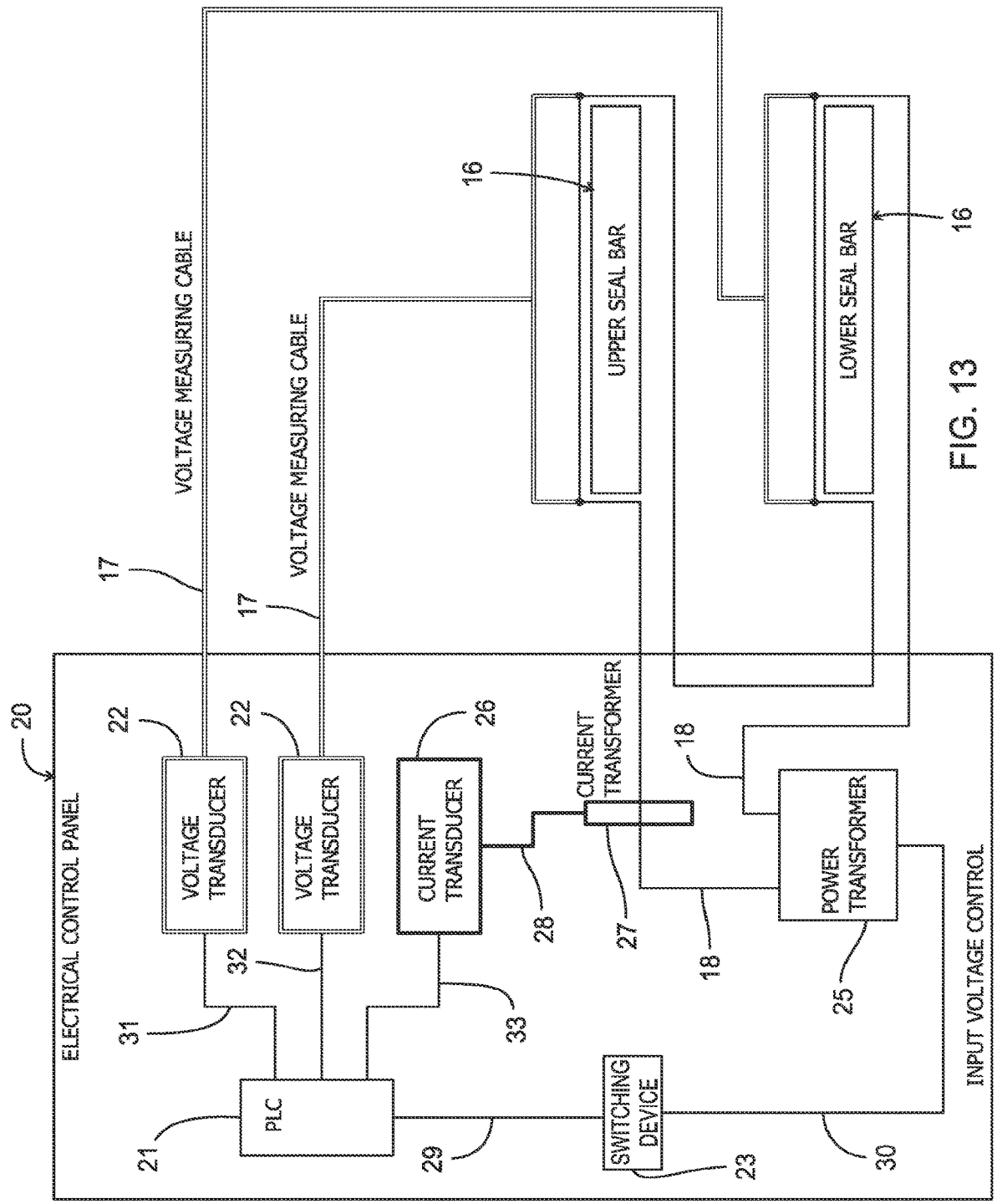
FIG. 13 is a schematic diagram illustrating electrical components and layout for a heat sealer circuit in a preferred embodiment of the apparatus, system and process of the present invention.

FIG. 13 illustrates preferred electrical components and layout for a heat sealer circuit of a preferred embodiment of the apparatus, system and process of the present invention, during a heat sealing cycle, e.g., when heat sealing flexible plastic fabrics together. As shown in FIG. 13, a control panel 20 includes a controller or PLC 21, switch or switching device 23 (e.g., Solid State Relay (SSR) switch or a Silicon Controlled Rectifier (SCR)), voltage transducers 22, a current transducer 26, a current transformer 27, and power transformer 25 (see also FIGS. 8-10, 71). Controller or PLC 21 is in electrical communication with voltage transducers 22 via lines/wires 31, 32. Controller or PLC 21 is in electrical communication with current transducer 26 via line/wire 33. Controller or PLC 21 is in communication with switch or switching device 23 via input voltage control line/wire 29. Switch or switching device 23 (e.g., a solid state relay switch or silicon controlled rectifier) is also in communication with power transformer 25 via input voltage control line/wire 30. Current transducer 26 is in communication with current transformer 27 via line/wire 28. Current transformer 27 is in communication with power transformer 25 via power line/wire 18. Voltage transducers 22 are in communication with one or more heat seal bars 16 via line/voltage measuring cables 17. Power transformer 25 is in communication with current transformer 27 and/or one or more heat seal bars 16 via power lines/wires 18. Calibration sensor 14 and line 15 are not included as calibration sensor 14 is not included in a heat seal bar assembly 16 during a heat sealing process of joining flexible plastic fabrics, for example, together. Temperature and electrical resistance of heat seal bar assemblies 34, 47, 48, 49, 91 can also be used in a heat sealing process in the same or a similar way.

Figure 14:
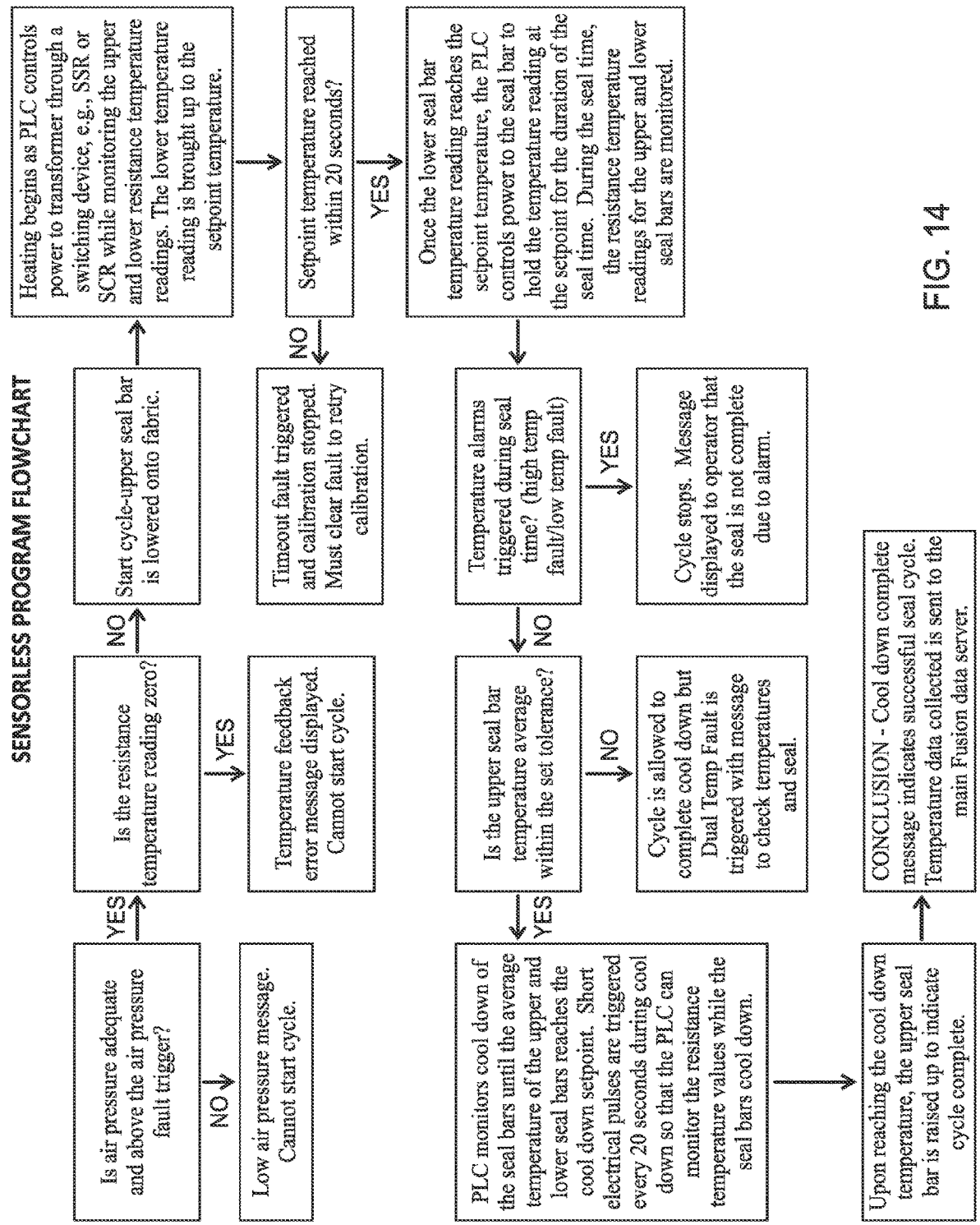
FIG. 14 is a preferred embodiment of a sensorless program flow chart showing preferred steps during a sensorless heat sealing process of the present invention.

FIG. 14 illustrates a sensorless program flowchart that includes process steps for software during a heat sealing cycle, e.g., to join flexible plastic fabrics together, including as follows.

Determine if air pressure is adequate and above the air pressure fault trigger. Preferably air pressure is adequate if between 35 psi to 38 psi. An air pressure fault trigger most preferably is set to alarm if air pressure is below 35 psi or can be set to alarm if air pressure is below a desired pressure selected between 30 psi to 40 psi. If not, a low air pressure message is generated and sent and the cycle cannot start. If yes, determine if the resistance temperature reading is zero. If yes, a temperature feedback error message is displayed, and cycle cannot start. If not, start cycle and upper seal bar is lowered onto fabric.

Heating begins as controller or PLC 21 controls power to transformer 25 through a switching device while monitoring the upper and lower resistance temperature readings. The lower temperature reading is brought up to the setpoint temperature.

Determine if setpoint temperature is reached within 20 seconds. (20 seconds is a preferred time interval because the typical time to reach setpoint is between 10-15 seconds. Other time intervals can be 15 to 30 seconds.) If not, timeout fault is triggered and calibration stopped. Preferably, the fault must be cleared by an operator or technical support to retry calibration. If yes, once the lower seal bar temperature reading reaches the setpoint temperature, the controller or PLC 20 controls power to the seal bar to hold the temperature reading at the setpoint for the duration of the seal time. During the seal time, the resistance temperature readings for the upper and lower seal bars are monitored. A setpoint temperature preferably is 250-320 degrees F. for an application of heat sealing flexible polypropylene fabrics together.

Are temperature alarms triggered during seal time (high temp fault/low temp fault)? If yes, cycle stops. Message is displayed to operator that the seal is not complete due to alarm. If not, is the upper seal bar temperature average within the set tolerance? A set tolerance preferably is 10 degrees F., and can be 10 to 20 degrees F. If not, cycle is allowed to complete cool down but a Dual Temp Fault is triggered with message to check temperatures and seal. If yes, controller or PLC 21 monitors cool down of the seal bars until the average temperature of the upper and lower seal bars reaches the cool down setpoint, which can be 160 degrees to 170 degrees F. and is most preferably 165 degrees F. Short electrical pulses are triggered every 20 seconds during cool down so that the PLC can monitor the resistance temperature values while the seal bars cool down. (20 seconds is a preferred time interval because it is long enough to limit heating but quick enough to produce an accurate cool down reading, other time intervals can be 5 to 30 seconds.)

Upon reaching the cool down temperature, the upper seal bar is raised up to indicate cycle complete.

CONCLUSION—A cool down complete message indicates a successful heat seal cycle. Temperature data collected is preferably sent to a main data server.

The process steps of FIG. 14 can be conducted with regard to heat seal bar assemblies 16, 34, 47, 48, 49, 91.

In one or more preferred embodiments of the present invention, electrical voltage and current feedback signals are used to monitor and control the temperature of heating elements 11, 35, 36, 62, 63, 92, 93 of a heat seal bar assembly 16, 34, 47, 48, 49, or 91 (see e.g., FIG. 3). The voltage and current feedback signals can be processed by a controller or a programmable logic controller (PLC) 21 while power is being applied to a heating element 11, 35, 36, 62, 63, 92, 93 to calculate the real-time electrical resistance of each heating element 11, 35, 36, 62, 63, 92, 93. Electrical resistance of a heating element 11, 35, 36, 62, 63, 92, 93 varies relative to its temperature allowing controller or PLC 21 to monitor the temperature by monitoring the resistance.

The temperature to electrical resistance relationship varies with the thickness, width and length of a heating element 11, 35, 36, 62, 63, 92, 93. It can also vary based on the thickness and quality of plating 13 (see FIGS. 3-5), which preferably is copper plating, of the heating element 11, 35, 36, 62, 63, 92, 93 ends, or other suitable metal plating of the heating element 11 ends. For example, a heating element 11 of 42" (42 inch) length might measure 0.11 ohms at 270 degrees Fahrenheit, but a heating element 11 of same thickness but 19" (19 inch) length might measure 0.0379 ohms at 270 degrees Fahrenheit.

Electrical resistance for a 19" (19 inch) long by 2" (2 inch) wide heating element 11 at a temperature of about 70 degrees Fahrenheit can be about 0.0333 ohms. Electrical resistance for the same heating element 11 at a setpoint temperature of about 260 degrees Fahrenheit can be about 0.0377 ohms. If the resistance changes to 0.0375 ohms, this is an indicator that temperature of the heating element 11 has dropped below a lowest desired temperature of 250 degrees Fahrenheit, for example. If the resistance changes to 0.0384 ohms, this is an indicator that temperature of the heating element 11 has risen to a temperature above a highest desired temperature of 290 degrees Fahrenheit, for example. The above example is based on current preferred alarm thresholds included in preferred embodiments of the system and process of the present invention that cause the machine to alarm if the temperature drops 10 degrees below a desired setpoint during the seal time or overshoots 30 degrees above the setpoint during the seal time. An alarm threshold is preferably included in the system and process of the present invention and can be modified based on highest and lowest desired temperatures of a heat seal bar assembly 16, 34, 47, 48, 49, 91 during heat sealing.

In more preferred embodiments, a heating element 11, for example, of length 16" (16 inches) and width 2" (2 inches) with a temperature of about 70 to 250 degrees F. might have an electrical resistance of about 0.02611 to 0.02934 ohms.

Some preferred embodiments of heat seal bar assembly configurations of the present invention involve multiple heating elements, e.g., a heat seal bar assembly 34 for heat sealing a lift loop assembly 58 to a body 53 (see FIGS. 6-7), a seal bar assembly 49 for joining a discharge tube 55 and bottom 54 together via heat sealing (see FIGS. 28, 64, 66), and a seal bar assembly 91 for joining a document pouch 56 to a body 53 (see FIGS. 61-63). In these embodiments, the total resistance of the respective connected heating elements can be measured and related to a temperature value using one calibration sensor on one of the heating elements of the assembly. For example, a preferred embodiment of a lift loop seal bar assembly 34 connects three (3) heating elements 35 that are 23" (23 inches) long and one (1) heating element 36 that is 12.75" long length all in series (see FIGS. 6-7). The total resistance at 70 degrees F. might be 0.1508 ohms and the resistance at 290 degrees F. might be 0.1743 ohms. In other preferred embodiments, dimensions of heating elements 35 and 36 of a heat seal bar assembly 34 can be chosen based on desired dimensions of a lift loop assembly 58 and the desired dimensions of a joint to be formed between a lift loop assembly 58 and a body 53.

Respective heating elements 35, 36 of heat seal bar assembly 34, for example, are preferably not connected together on the top but are electrically connected together through power jumper lines 39 at end caps 103 on the ends of heating elements 35, 36, e.g., as shown in FIG. 7. End caps 103 function as a heat strip tension block. Heating elements 35, 36 can be constructed similarly to a heating element 11 as shown in FIGS. 3-5, with dimensions selected based on the desired heat seal joint.

The two heating elements 62 and 63 of heat seal bar assembly 49 similarly are preferably electrically connected together with a power jumper line 39. A heat seal bar assembly 49 can have a cover 66 as well. Similarly, for a heat seal bar assembly 49, each heating element 62, 63 of the assembly are preferably not connected together on the top but are electrically connected together through power jumper lines 39 at end caps 103. A heating element 62, 63 can be constructed similarly to a heating element 11 as shown in FIGS. 3-5, with dimensions being chosen based on the desired joint area for the joint between the bottom 54 and the discharge tube 55 and any joint between the bottom 54 and insert 73.

A calibration sensor 14, which can be an external thermocouple sensor, as shown in FIGS. 2, 7, 63, 66-67, can be used to calibrate the temperature readings from a heating element 11, 35, 36, 62, 63, 92, 93 of a respective heat seal bar assembly calculated by controller or PLC 21. In a preferred embodiment of the method including a machine seal bar assembly 81, for example, that includes a lower seal bar assembly 16 and an upper seal bar assembly 16 (see, e.g., FIGS. 27-28), steps in calibrating include:
1. Install a calibration sensor 14 on a lower heat seal bar assembly 16 of each heat seal bar 16 assembly pair that needs to be calibrated. A sensor 14 preferably is placed under a heating element 11 of a lower heat seal bar assembly 16 where it makes physical contact with the heating element 11. Sensor 14 can plug into a connector that is wired back to a PLC 21, e.g., with sensor lead line 15 (see FIGS. 2, 11)
2. Assemble bag portions of a bulk bag together to form a pre-heat sealed bag 42 using desired bag portions (e.g., fill spout or top spout 51, top 52, body 53, bottom 54 and/or discharge tube 55, and optionally including a bottom insert 73 and/or a document pouch 56) that are overlapped to form desired joint locations at the overlapped portions on a carrier plate 40 and load the pre-heat sealed bag 42 into a heat sealing machine 41 that includes heat seal bar assemblies 16 being calibrated (see FIGS. 23-27). The pre-heat sealed bag 42 provides a heat sink for the heating elements 11 of heat seal bar assemblies 16 as they are being calibrated.
3. Access a Calibration Screen 24 on a control panel 20, which can be an HMI (Human-Machine Interface) panel, in order to turn Calibration Mode ON and select the seal bar assemblies 16 that need to be calibrated.
4. A Start Calibration button appears if the calibration sensor readings are in a designated acceptable range, e.g., 60-120 degrees Fahrenheit. Press the Start Calibration button to begin the calibration.
5. Each heat seal bar assembly 16 to be calibrated will lower the upper bar after Start Calibration button is pressed or selected and will run through the normal heat seal cycle but will be controlled by the calibration sensor 14.
6. During the seal time of the calibration cycle, controller or PLC 21 calculates the average temperature of the calibration sensor 14 and also calculates the average resistance of the upper and lower heating elements 11. The software of controller or PLC 21 uses these average values to relate the resistance to the temperature. Both the upper and lower seal bar temperatures can be calibrated based on sensor 14 reading the temperature of the lower seal bar. When the upper and lower heating elements 11 are the same size and thickness and they are wired in series, the heating elements 11 will have the same electrical current passing through them at all times and as a result will generate the same amount of heat. As long as the upper and lower heating elements 11 are wired in series and are identical sizes, only one (1) sensor 14 is required for calibration. Calibration sensor 14 can be installed on the upper seal bar assembly 16 instead of the lower seal bar assembly 16 if desired and the process would work the same. If heating elements 11 of different sizes are used in upper and lower seal bar assemblies, a sensor 14 can be included on each heating element and each heating element can be calibrated. If desired, each upper and lower heat seal bar assembly can be calibrated even if of the same sizes. In some embodiments, a heat seal bar assembly possibly may include only a lower or an upper heat seal bar, and not both, and a sensor 14 can be used on the one said heat seal bar during calibration.
7. During a cool down phase of the calibration cycle, a controller or PLC 21 monitors the calibration sensor temperature reading and samples the resistance readings by sending a short electrical pulse to heating element 11 in designated time intervals, e.g., every 20 seconds. The controller or PLC 21 pulse or analog output is connected to a switching device 23, e.g., a "peak switch" solid state relay (SSR) or a silicon controlled rectifier (SCR), via input voltage control line/wire 29 that physically controls the input power to a power transformer 25. Power transformer 25 sends power to heating element 11 via power lines/wires 18. Once the sensor reading reaches 120 degrees Fahrenheit (or another highest designated desired temperature), controller or PLC 21 can make any needed adjustments to the resistance readings to line up the resistance temperature calculations with the sensor 14 reading at the lower end of the temperature range. This concludes the calibration.

The process as described above can be repeated to calibrate each heat seal bar assembly of a heat seal machine 41 or 46, for example in series, e.g., heat seal bar assemblies 34, 47, 48 49, 91. Or, each machine seal bar assembly of heat seal machine 41 can be calibrated at the same time using a controller or PLC 21. For example, each machine seal bar assembly 81, 82*a*, 83, 82*b* and 84 of heat seal machine 41, including heat seal bar assemblies 16, 47, 49 and 91 can be calibrated at the same time in a same or similar manner as described above. For a machine seal bar assembly 83 with heat seal bar assembly 91 used to couple a document pouch to a bag body, note however, that there is preferably only one heat seal bar assembly 91 in a machine seal bar assembly 83 given that it is not preferred to include both lower and upper seal bar assemblies for this function as a document pouch generally is not made of woven plastic fabric, but is polypropylene film material, and therefore there is less concern about applying even heat to get a uniform heat sealed joint between the document pouch 56 and body 53. There is also less concern about applying even top to bottom heat from both upper and lower heat seal bar assemblies, for example, as a document pouch 56 is not folded into a gusseted configuration so heat does not need to travel through multiple layers to form the joint.

Likewise, in a heat seal machine 46, each machine seal bar assembly 67 with heat seal bar assemblies 34 (for forming lift loop assemblies 58/body 53 joints), and machine seal bar assembly 85 with heat seal bar assembly 48 (for forming bottom cover 57/body 53 joint) can be calibrated in series or at the same time, in a same or similar manner as described above using a controller or PLC 21.

After calibration is complete, temperature sensing and control during a heat sealing process (e.g., to seal bulk bag portions together) are performed without external "sensors" 14, which are removed from seal bar assembly 16, for example. In a first step of temperature sensing using a heat seal bar assembly 16 as an example, power is applied to heating element 11 of heat seal bar assembly 16 by a power transformer 25, e.g., via power lines/wires 18 so that heating element 11 will start heating. When heating element 11 has power applied during heating, controller or PLC 21 processes a steady voltage and current feedback signal processed by voltage transducers 22 (with signals transferred via lines 17, 31, 32) and current transducers 26 (with signals transferred via lines 18, 28, 33) to determine temperature. However, during cool down or ambient periods of heating element 11 there normally will be no feedback signal to process since power is not being applied. Because preferably power must be applied to heating element 11 in order to receive a feedback signal, controller or PLC 21 sends short electrical pulses to the heating element during periods when heating is not desired, e.g., via lines 29, 18. The electrical pulsing allows controller or PLC 21 to sample the temperature with little to no heating. The sampling of temperature is necessary to monitor the temperature as cool down takes place.

The voltage and current feedback signals from heat seal bar assembly 16 are processed by transducers 22, 26 that convert the voltage and/or current received from heating element 11 to analog output signals that can be processed by a controller or PLC 21. Controller or PLC 21 preferably uses custom programming to take averages and perform smoothing of transducer output signals. The program calculates the real-time temperature based on calibration values stored in controller or PLC 21 from the latest calibration. The calculated temperature value is used to control an output on controller or PLC 21. The controller or PLC 21 output is connected to a switching device 23, e.g., a "peak switch" solid state relay (SSR) or silicon controlled rectifier (SCR), that physically or electrically controls the input power to a power transformer 25. Power transformer 25 sends power directly to heating element 11.

The same or a similar heat sealing process can be conducted with regard to heat seal assemblies 34, 47, 48, 49 and 91.

In a heat seal machine 41 (see FIGS. 25-28), heat sealed joints of a bulk bag 50 can be formed at one time using each of the machine seal bar assemblies 81 (for forming a discharge tube 55/bottom 54 joint), 82a (for forming a bottom 54/body 53 joint), 83 (for forming a document pouch 56 joint), 82b (for forming a body 53/top 52 joint), 84 (for forming a top 52/fill spout 51 joint), with temperature of each of the heating elements 11, 62, 63, 92, 93 being monitored using resistance as described above. Likewise, in a heat seal machine 46 (see FIGS. 25-26, 29-30), heat sealed joints of a bulk bag 50 can be formed at one time using each of the machine seal bar assemblies 67 (for forming lift loop assemblies 58/body 53 joints), 85 (for forming bottom cover 57/body 53 joints). with temperature of each of the heating elements 11, 35, 36 being monitored using resistance as described above. If desired, bag joints can be formed one at a time. Other desired combinations of joints can also be formed together at one time depending on which types of heat seal bar assemblies are included in a heat seal machine.

If desired, in another embodiment, a prior art seal bar 10, for example, as shown in FIG. 1, can be used in the system, method and process of the present invention, where one of the sensors 12 on seal bar 10 can be used for calibration and then both sensors can be removed during heat sealing.

Figure 8:
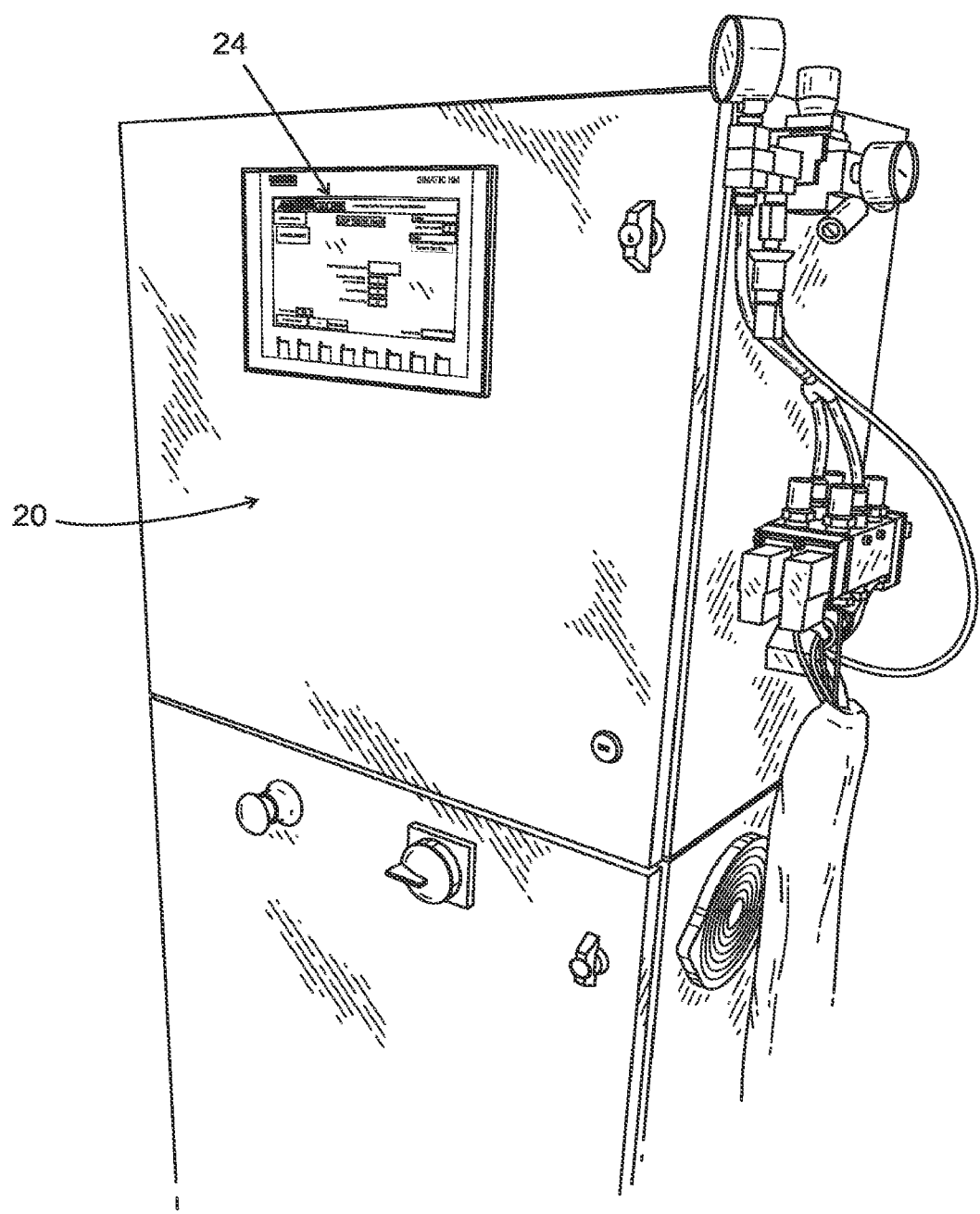
FIG. 8 is a perspective view of a first preferred embodiment of a control panel of the present invention.
Figure 9:
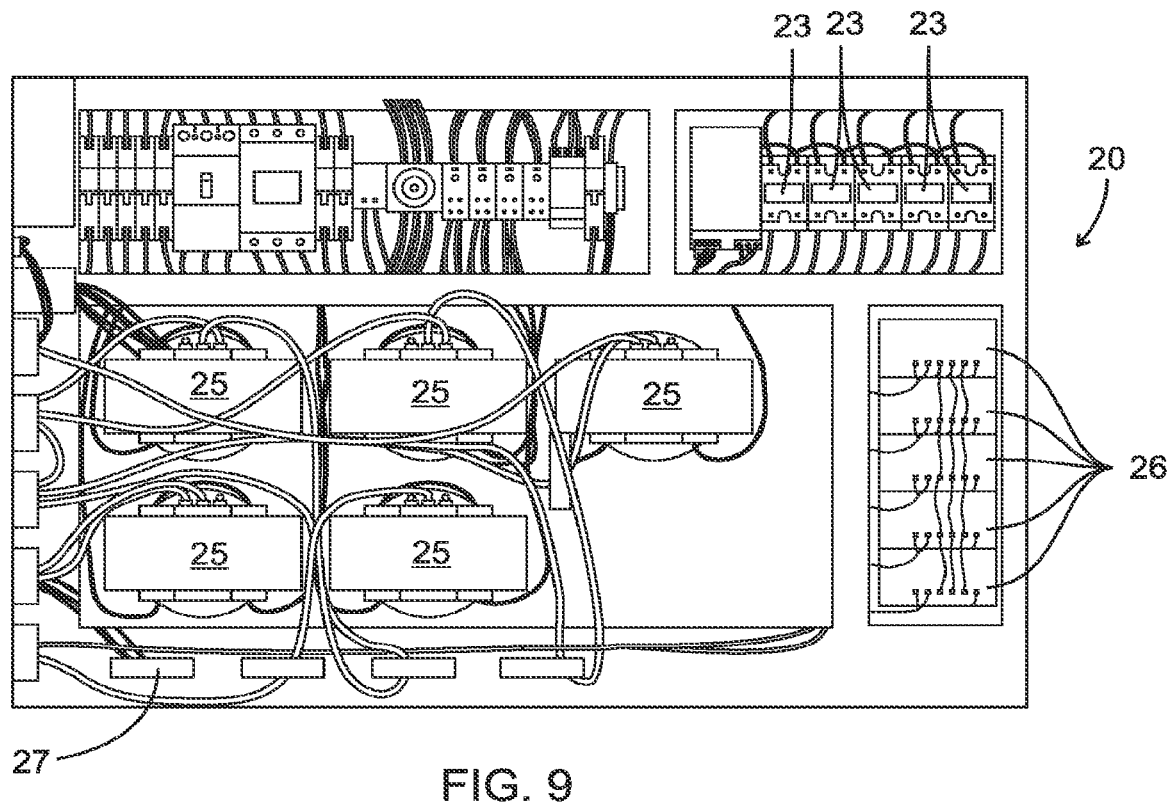
FIG. 9 is a partial view of the first preferred embodiment of a control panel of the present invention.

FIGS. 8-10 illustrate a control panel 20 that can be used in one or more preferred embodiments of the present invention. A control panel 20 preferably includes one or more controllers or PLCs 21, one or more voltage transducers 22, one or more switches or switching devices 23, one or more power transformers 25, one or more current transducers 26, and one or more current transformers 27. As shown in FIGS. 9-10, 25-26, 71, a control panel 20 with a controller or PLC 21 can be included in the system of the present invention for each heat seal machine, e.g., one control panel 20 for each heat seal machine 41, 46. A control panel 20 can be configured to run a calibration or a heat sealing cycle of one machine bar assembly at a time, or configured to run a calibration and a heat sealing cycle of more than one, or multiple, machine bar assemblies at a time. If desired, one control panel can also be configured to be used with two or more heat seal machines.

Figure 15:
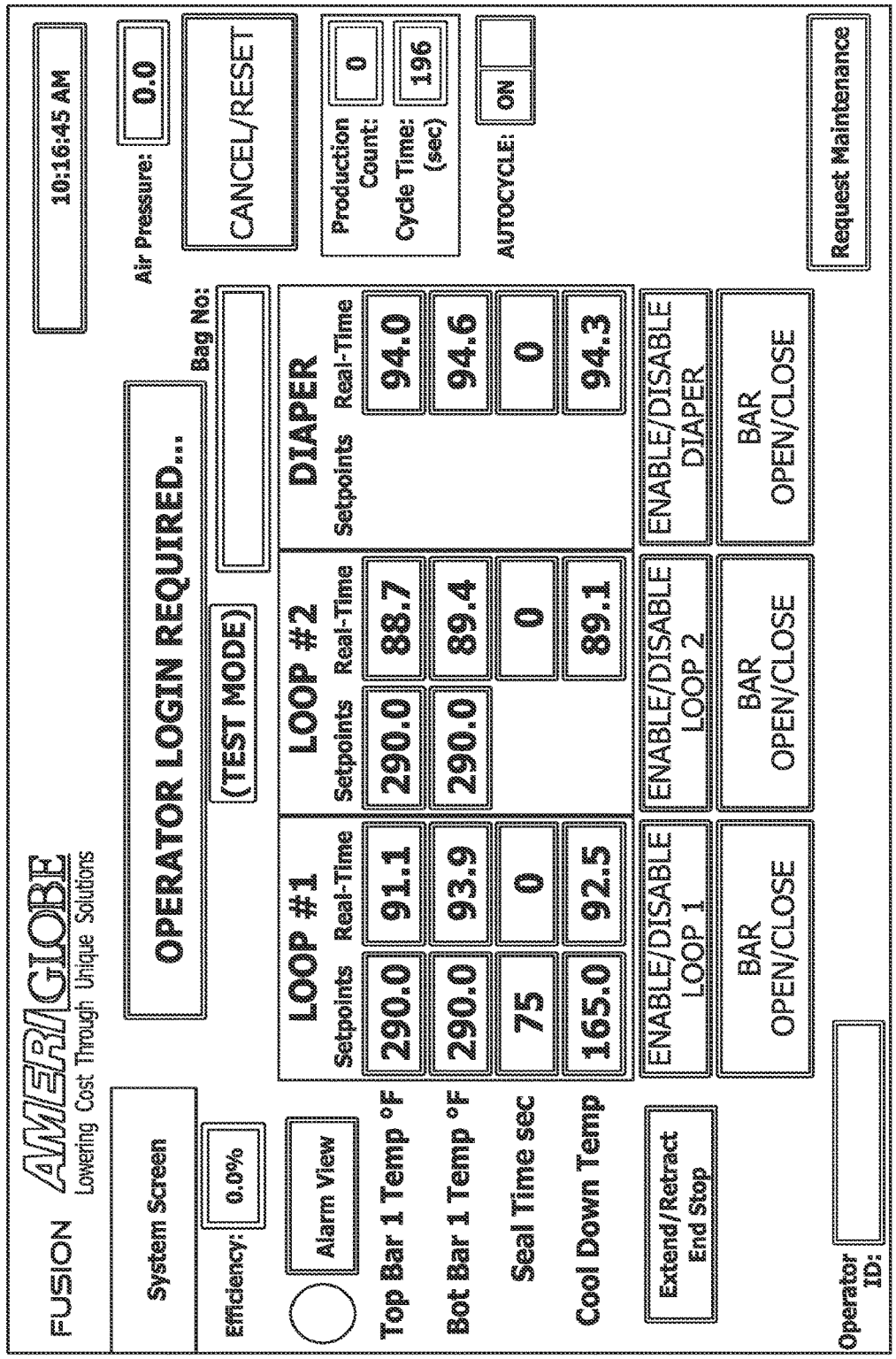
FIG. 15 is a front view of a preferred embodiment of a screen on a control panel of the present invention showing temperature readings calculated from electrical resistance.

FIG. 15 illustrates a screen 24 that can be included on a control panel 20. Screen 24 in FIG. 15 shows real time temperature readings calculated from electrical resistance.

FIG. 16 also illustrates a screen 24 that can be included on a control panel 20. Screen 24 in FIG. 16 shows real time calibration sensor readings and temperature readings calculated from the transducer feed back signals.

It should be understood that one or more preferred embodiments of the sensorless system and process described herein can be used with many different types of heat seal bars and heat seal machinery. FIGS. 27 to 28 illustrate a heat seal machine 41 that includes table 45, machine seal bar assembly 81 (for forming a discharge tube 55/bottom 54 joint), machine seal bar assembly 82a (for forming a bottom 54/body 53 joint), machine seal bar assembly 83 (for coupling a document pouch 56 to a bag body 53), machine seal bar assembly 82b (for forming a body 53/top 52 joint), machine seal bar assembly 84 (for forming a top 52/fill spout 51 joint).

Figure 64:
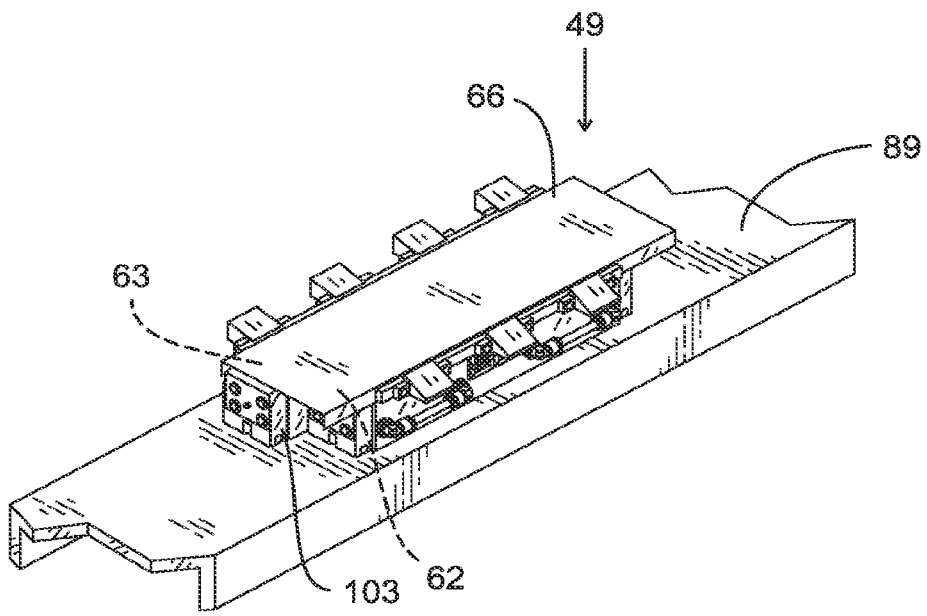
FIG. 64 is a perspective view of a fourth preferred embodiment of a heat seal bar assembly of the present invention.

A machine seal bar assembly 81 can include upper and lower heat seal bar assemblies 49 for heat sealing a discharge tube 55 and bottom portion 54 together (see FIGS. 64, 66). A bottom insert 73 can also be overlapped with a discharge tube 55 and bottom portion 54 and be heat sealed to the bottom with this same heat seal bar assembly 49. Upper and lower heat seal bar assemblies 49 can include heating elements 62, 63, each with a heating element 11, and a cover 66. Heating elements 62, 63 can be electrically joined by jumper lines or wires 39 (see FIG. 66). Upper and lower heat seal bar assemblies 49 can be moved by cylinders, e.g., air cylinders 69, or by other desired means. A machine seal bar assembly 81 can also include a frame 76 and base 89 on which a lower heat seal bar assembly 16 can be positioned.

Each machine seal bar assembly 82a and 82b can include upper and lower heat seal bar assemblies 16 (see FIG. 2) for heat sealing bottom portion 54 and body 53 together or a top portion 52 and body 53 together. Upper and lower heat seal bar assemblies 16 can be moved by cylinders, e.g., air cylinders 69, or by other desired means. A machine seal bar assembly 82a, 82b can also include a frame 76 and base 89 on which a lower heat seal bar assembly 16 can be positioned.

A machine seal bar assembly 83 can include a heat seal bar assembly 91 with heating elements 92, 93 for heat sealing a document pouch 56 to a body 53. Heat seal bar assembly 91 can be moved by cylinders, e.g., air cylinders 69, or by other desired means (see also FIGS. 61-63). A machine seal bar assembly 83 including heat seal bar assembly 91 can also include a frame 76 and base 89.

A machine seal bar assembly 84 can include upper and lower heat seal bar assemblies 47 for heat sealing top portion 52 and fill spout 51 together. Upper and lower heat seal bar assemblies 47 can include a heating element 11 (see FIG. 65) and can be moved by cylinders, e.g., air cylinders 69, or by other desired means. A machine seal bar assembly 84 can also include a frame 76 and base 89 on which a lower heat seal bar assembly 47 can be positioned (see also FIGS. 65, 67).

Figure 29:
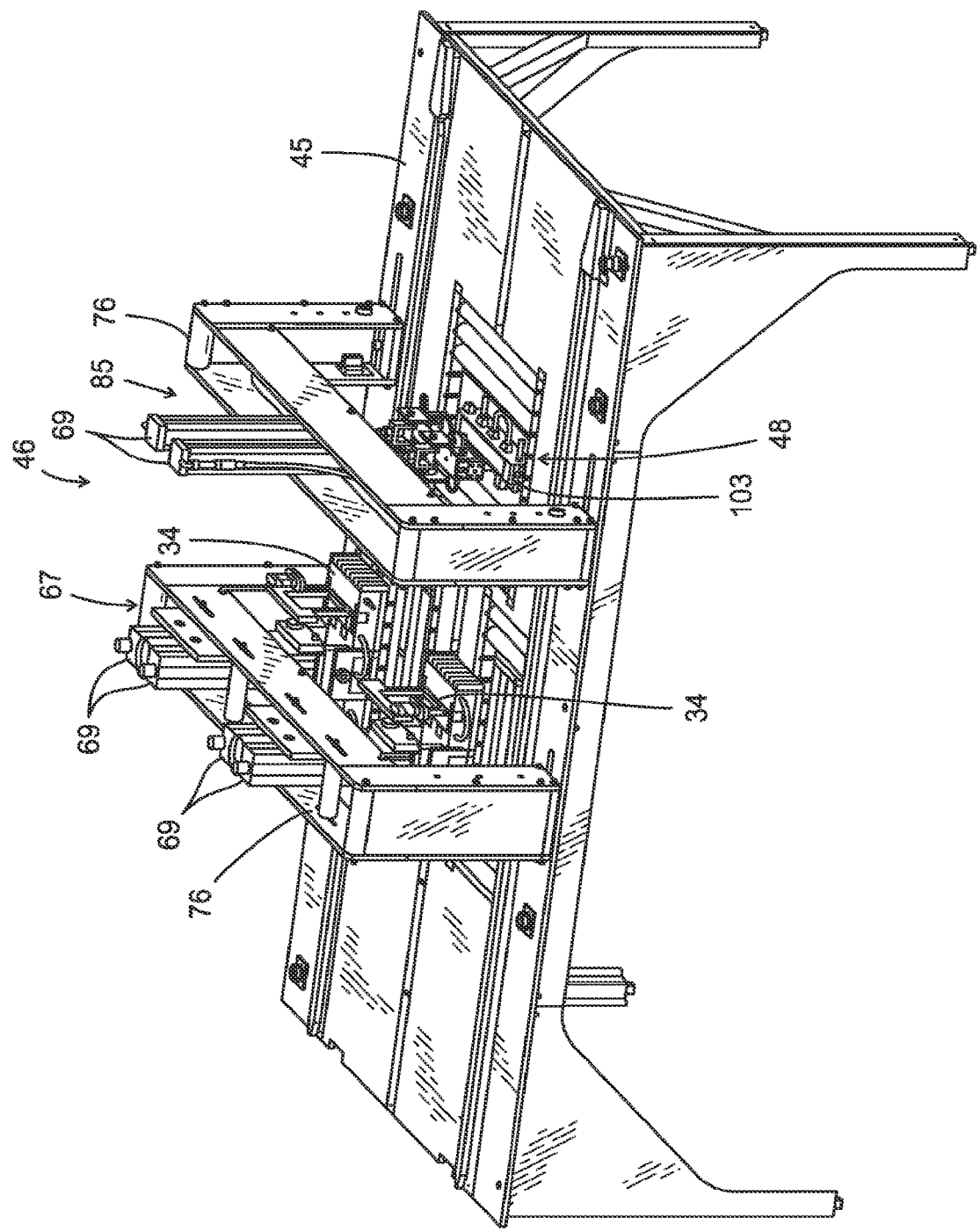
FIG. 29 is a perspective view of a second preferred embodiment of a heat sealing machine of the present invention.
Figure 30:
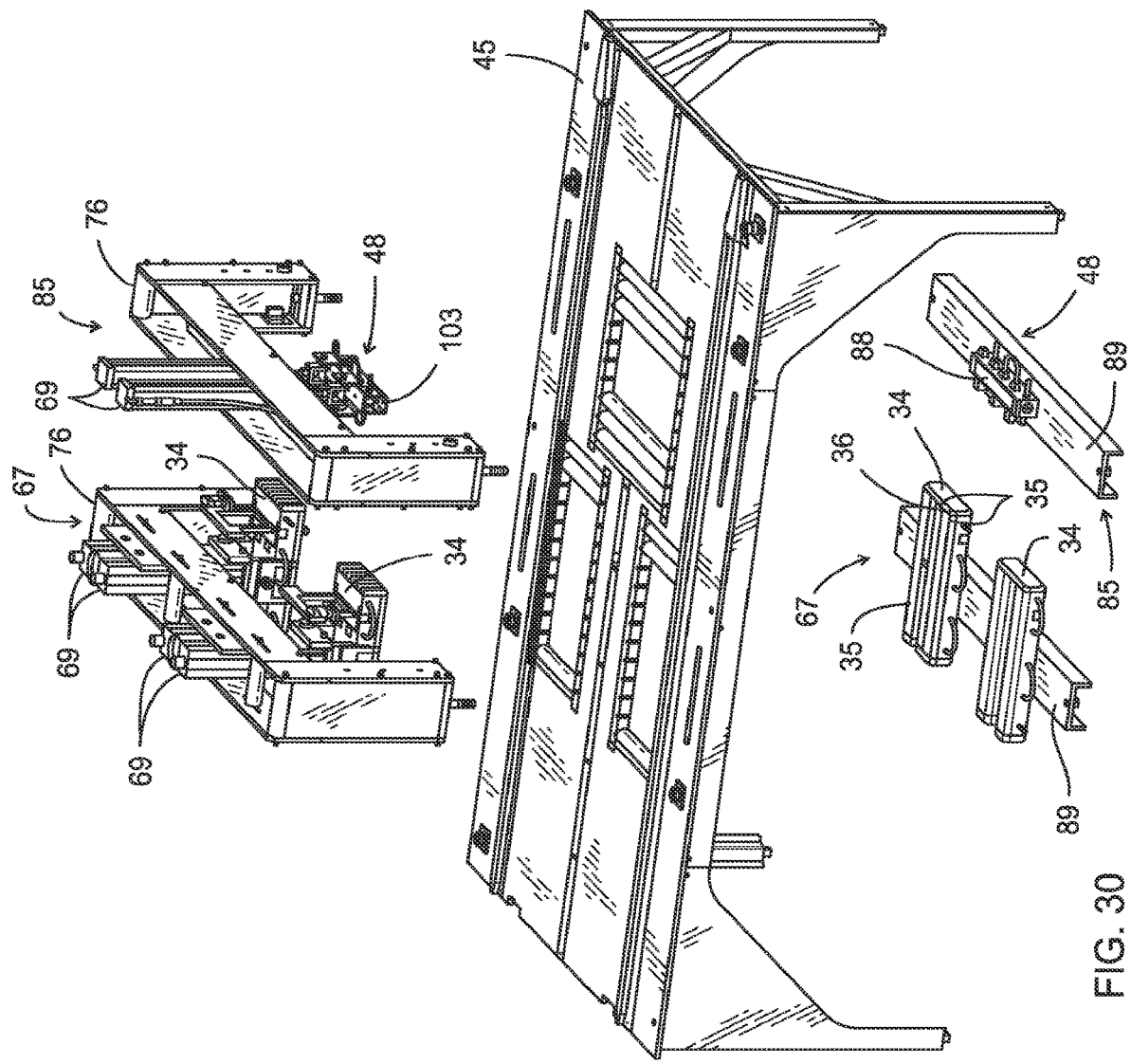
FIG. 30 is an exploded view of the second preferred embodiment of the heat sealing machine of FIG. 29.
Figure 35:
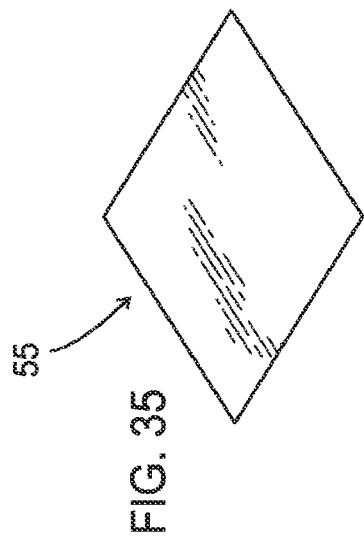
FIG. 35 is perspective view of a preferred embodiment of a discharge tube of a bulk bag of the present invention.

FIGS. 29-30 illustrate a heat seal machine 46 that includes table 45 and machine seal bar assembly 67 (for forming lift loop assembly 58/body 53 joints) and machine seal bar assembly 85 (for forming a bottom cover 57/body 53 joint).

A machine seal bar assembly 67 can include a pair of upper and lower heat seal bar assemblies 34, each with heating elements 35, 36, which can seal four lift loop assemblies 58 to a body 53 at the same time. Upper and lower heat seal bar assemblies 34 can be moved by cylinders, e.g., air cylinders 69, or by other desired means. A machine seal bar assembly 67 can also include a frame 76 and base 89 on which lower heat seal bars 35, 36 can be positioned (see also FIGS. 6-7).

A machine seal bar assembly 85 can include upper and lower heat seal bar assemblies 48 for heat sealing bottom cover 57, which is sometimes referred to as a diaper, to body 53. Upper and lower heat seal bar assemblies 48 can each include a heating element 11 (see also FIG. 68) and can be moved by cylinders, e.g., air cylinders 69, or by other desired means. A machine seal bar assembly 85 can also include a frame 76 and base 89 on which a lower heat seal bar assembly 48 can be positioned.

A seal bar assembly 48 can include a cover 88, and the same or similar components as a seal bar assembly 47 as shown in FIG. 67, for example, which dimensions of respective parts selected based on the desired bag joint to be formed with seal bar assembly 48.

Other desired types of heat seal machinery can also be used in one or more embodiments of the sensorless system and process of the present invention. For example, a cover/document pouch impulse heat sealer machine assembly including one or more heat seal bars and heating elements; a bottom cover or a spout to top/bottom heat sealer machine assembly including one or more heat seal bars and heating elements; a spout/top/bottom/body impulse heat sealer machine assembly including one or more heat seal bars and heating elements; loop or loop assembly impulse heat sealer machine assembly including one or more heat seal bars and heating elements; main body impulse heat sealer machine assembly including one or more heat seal bars and heating elements; a lift loop assembly and diaper/bottom cover sealer machine including one or more heat seal bars and heating elements; a heat sealing bar assembly for sealing a spout or tube to the top or bottom of a bulk bag body; a cover/document pouch impulse heat sealer bar assembly; and/or a lift loop assembly heat seal bar assembly as shown and described in U.S. patent publication no. US2018/0126661, or with other embodiments shown and described in the applications, publications, and patents incorporated herein by reference.

The sensorless system and process of the present application can also be used with other heat seal bars in applications other than joining plastic fabrics together wherein it is desired to monitor temperature of a heating element of a heat seal bar.

The sensorless system and process of the present invention can be used with a single heat seal bar or with upper and lower heat seal bar assembly combinations or with multiple heat seal bars connected together, e.g., in the lift loop assembly seal bar embodiment and discharge tube/bottom seal bar embodiment described herein. In some embodiments, instead of having a single body in the desired shape for the assembly as a whole, e.g., as shown in FIG. 66, multiple bodies and multiple heating elements can be connected to form a desired overall heat seal body shape.

In one or more preferred embodiments, machine heat seal bar assemblies with upper and lower heat seal bar assemblies are used in the system and/or process of the present invention and a sensor on the lower heat seal bar is used for calibration.

In one or more preferred embodiments, machine heat seal bar assemblies with upper and lower heat seal bars are used in the system and/or process of the present invention and a sensor on the upper heat seal bar assembly is used for calibration. A seal bar pair (upper and lower) can be calibrated with a sensor on the lower or upper bar.

In one or more preferred embodiments of a machine heat seal bar assembly, a heating element is copper plated with 0.001" to 0.006" copper plating on each end of both sides for a length of 2 and 7/16" from each end. FIGS. 3-5 illustrate a heating element 11 with plating 13 that can be used in one or more preferred embodiments.

In most preferred embodiments, a heating element is copper plated with 0.001" copper plating on each end of both sides for a length of 2 and 7/16" from each end.

In other heat sealing systems and methods, e.g., as described in patent application publication no. US2014/0363106 and/or US2018/0126661, incorporated herein by reference, heat seal bars include a clamping system in which bare Nichrome heating element ends are clamped between brass end caps. In testing of the sensorless system and process of the present invention, the sensorless development attempted with the brass end caps, however, was unsuccessful. The brass was not able to dissipate the heat from the element ends very well and would become very hot after numerous machine cycles. As the temperature of the brass end caps would increase, the resistance of the brass would increase at a different rate from the resistance of the Nichrome heating elements. This caused inconsistencies in the temperature readings. Copper is a much better dissipater of heat and also has a much lower resistance than brass making it a more suitable insulator for the heating element ends in the sensorless application of one or more preferred embodiments of the system and process of the present invention. By plating the heating element ends with copper, the resistance of the Nichrome heating element can be detected more accurately as the resistance of the copper plating is almost negligible.

In other preferred embodiments of the present invention, other metals having similar resistivity and thermal conductivity can be used instead of copper. Other suitable metals with similar resistivity and thermal conductivity characteristics to copper, for example, include silver, gold and aluminum, which can possibly be used as a substitute for copper.

Referring to FIGS. 25-26, an assembly line production area for heat sealing bulk bags 50 is shown. A pre-heat sealed bulk bag 42 can be assembled on a carrier plate 40, with bag parts or pieces or portions held on carrier 43 prior to assembling the bag portions together to form a pre-heat sealed bulk bag 42. A pre-heated sealed bulk bag 42 can be put together, for example, by overlapping respective bag portions together to form desired joint locations for the bag on a carrier plate 40 (see FIGS. 23-26). Prior to entering a first heat seal machine, e.g., heat seal machine 41, a pre-heat sealed bulk bag can have no heat sealed bag joints.

Carrier plate 40 with pre-heat sealed bag 42 can be passed through one or more heat sealing machines, e.g., heat seal machine 41, including machine heat seal bar assemblies that have heat seal bars with heating elements 11, 35, 36, 62, 63, 62, 93. The heat seal bar assemblies can be calibrated at control panels 20 prior to passing a pre-heat sealed bulk bag 42 through a heat seal machine to undergo a heat sealing process to form a bag 50 with heat sealed joints. Resistance and temperature readings during heat sealing of heat seal bar assemblies can also be gathered at control panels 20.

In a preferred embodiment as shown in FIGS. 25-26, two heat seal machines 41, 46 can be used to manufacture a bulk bag 50. After pre-heat sealed bag 42 passes through heat seal machine 41, a partially completed bag/partially heat sealed bag 71 (with heat sealed joints formed between a discharge tube 55 and bottom 54, bottom 54 and body 53, body 53 and top 52, and top 52 and fill spout 51, and also with a document pouch sealed to body 53 is still on carrier plate 40 and is ready to move into heat seal machine 46. Heat seal machine 46 completes a bag 50 by heat sealing lift loop assemblies 58 and a bottom cover 57 to body 53. A return table for 44 after a pre-heat sealed bulk bag 42 and partially heat sealed bag 71 is finished undergoing a heat seal process to form a completed bag 50 is also shown in the figures. In other embodiments, any desired number of joints for a bag can be formed in a desired heat seal machine. For example, some bags may have less than four lift loop assemblies, may not have a document pouch and/or may not have a bottom cover. Other styles of bulk bags than what are shown in the figures can also be made with a desired number of heat sealed joints.

FIGS. 25-26 show folded/gusseted bag parts or portions and also a document pouch 56 on carriers 43. Fill spout 51, top 52, body 53, bottom 54 and discharge tube 55 are folded and gusseted on carrier 43 ready to be overlapped with respective bag portions for assembly on carrier plate 40 near heat seal machine 41. Document Pouch 56 is also on this carrier 43.

Lift loop assembles 58 are also folded on a carrier 43 that includes bottom cover 57 near heat seal machine 46 and are ready to be assembled on partially completed bag 71 before entering heat seal machine 46.

Figure 17:
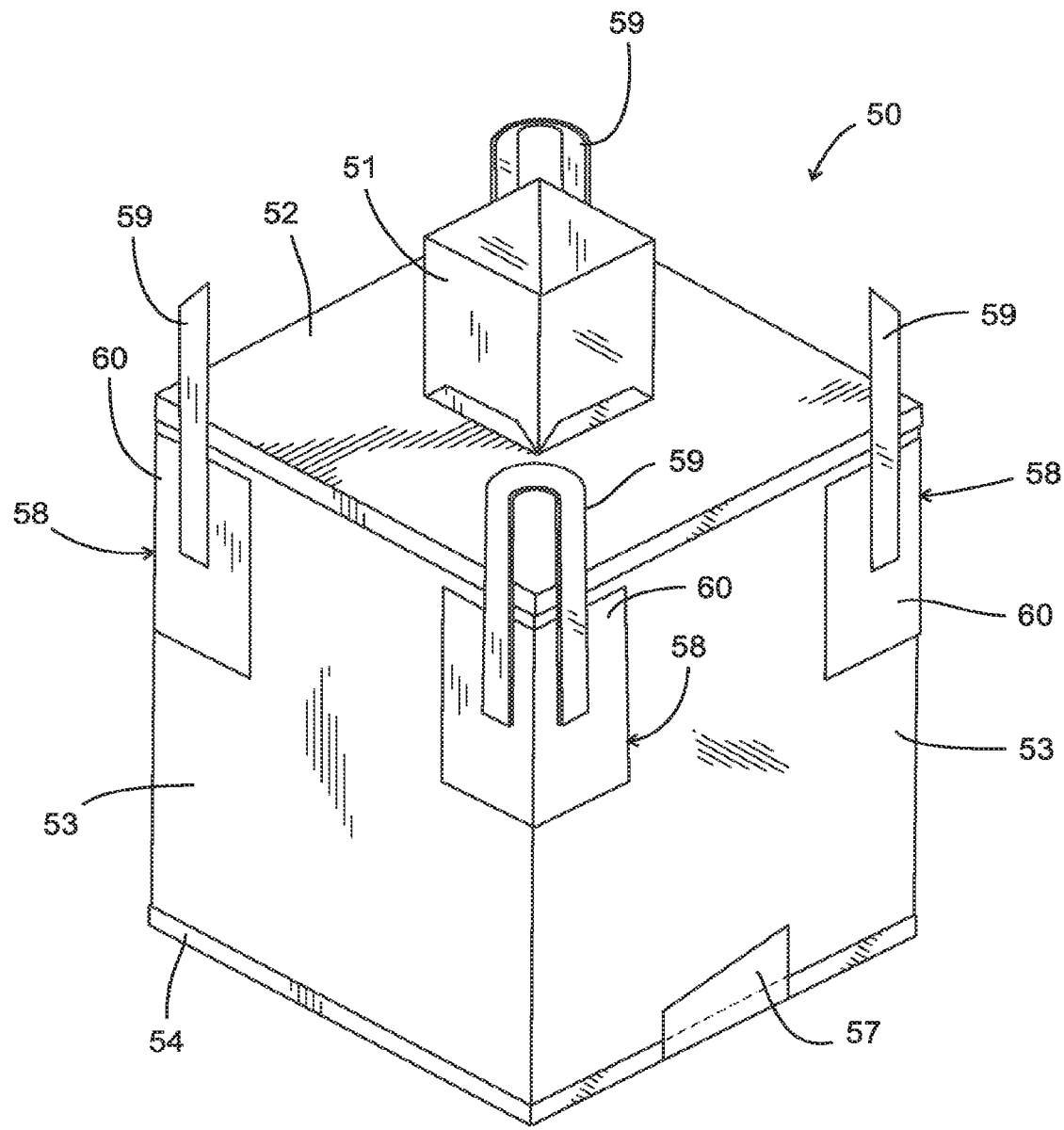
FIG. 17 is a perspective view of a preferred embodiment of a bulk bag of the present invention.
Figure 18:
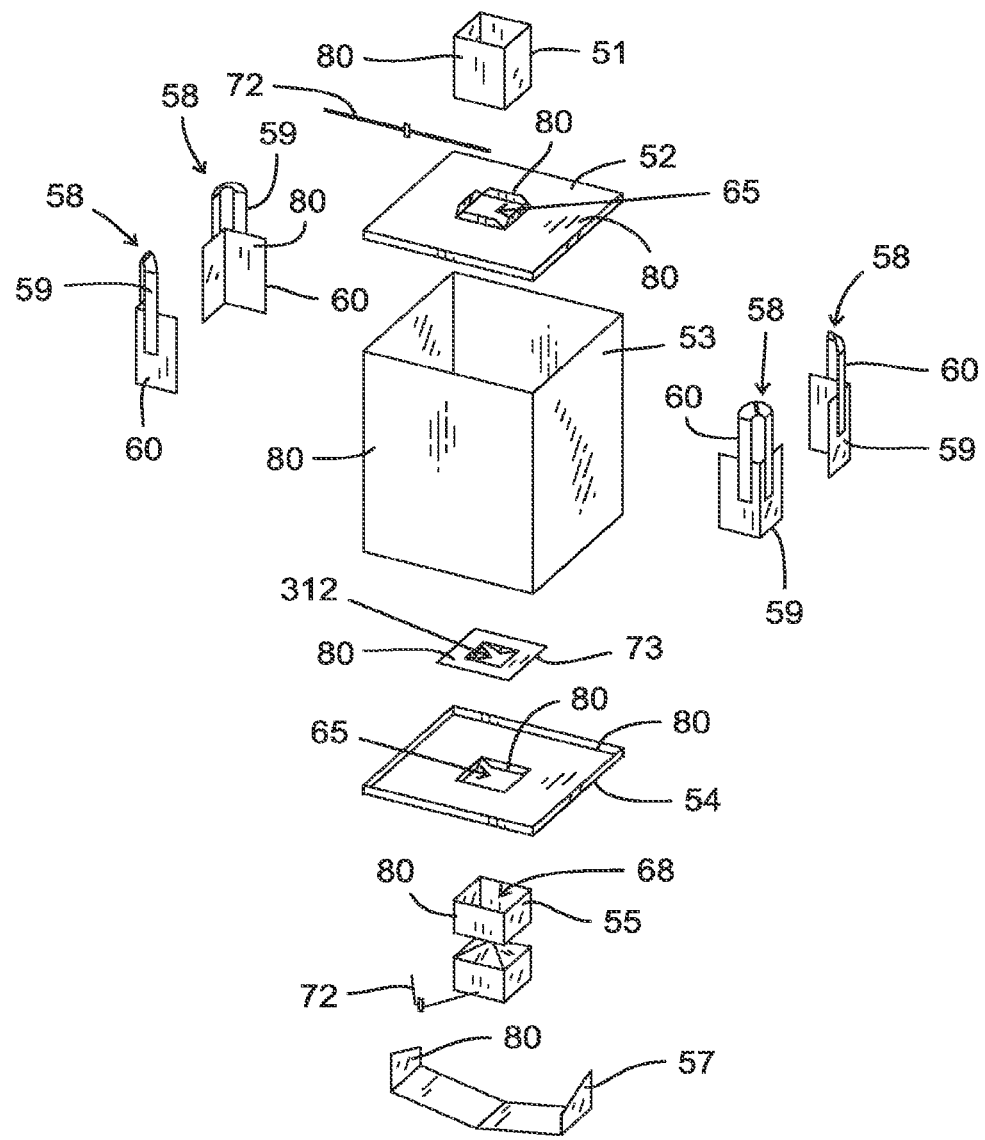
FIG. 18 is an exploded view of a preferred embodiment of a bulk bag of the present invention.

FIG. 17 illustrates a filled bulk bag 50, e.g., of the type that can be manufactured in the system and process shown in FIGS. 25-26. FIG. 18 illustrates an exploded view of a bulk bag 50, e.g., of the type that can be manufactured in the system and process shown in FIGS. 25-26. FIGS. 19-22 illustrate bulk bags 50 that are folded in flat gusseted form. Joints are formed in portions 86 where one bag portion overlaps with another bag portion. Heat seal bars as described herein heat seal in the areas designated by numeral 86 that include overlapped bag portions to form the bag joints.

Figure 19:
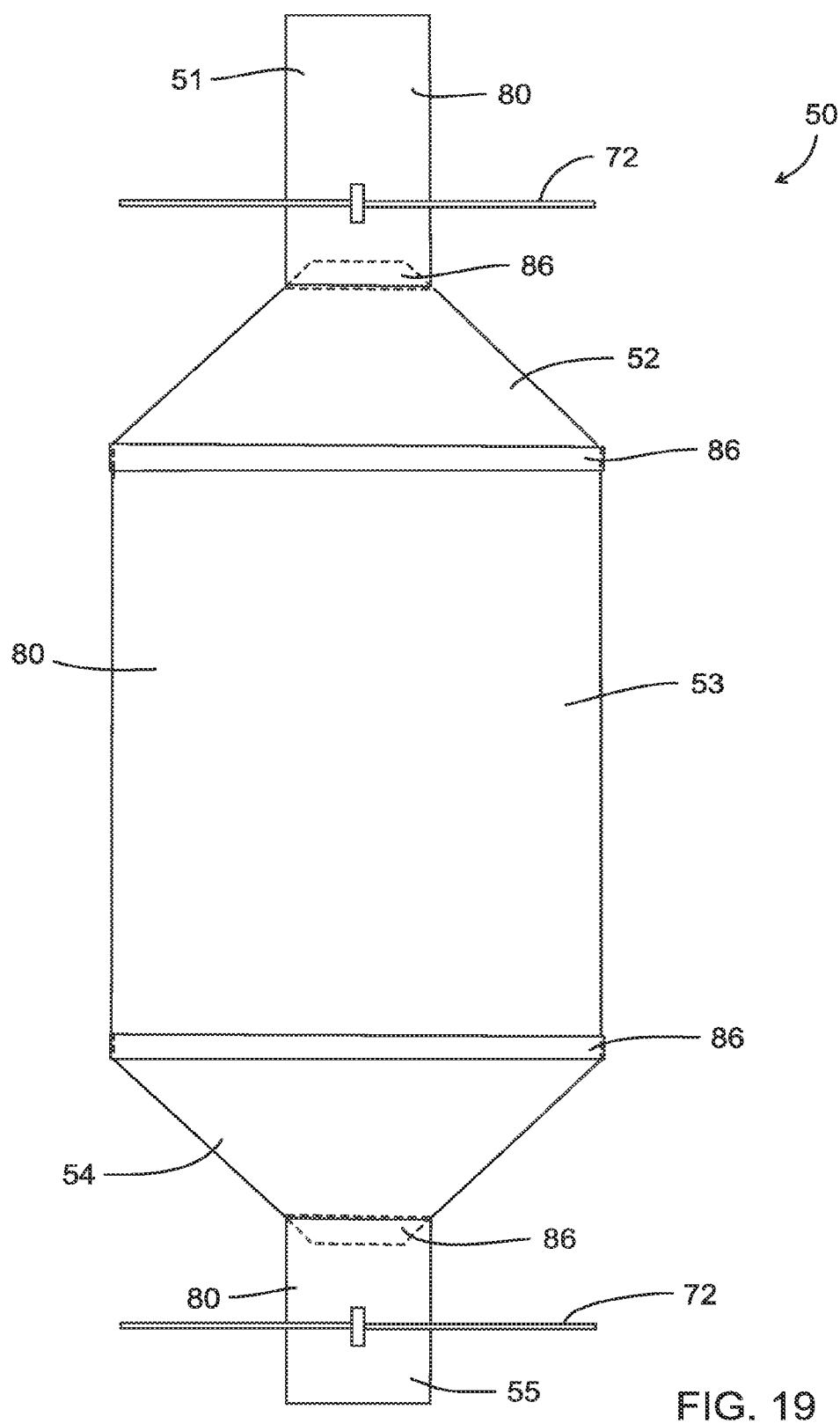
FIG. 19 is a top view of a preferred embodiment of folded or gusseted bulk bag of the present invention.
Figure 20:
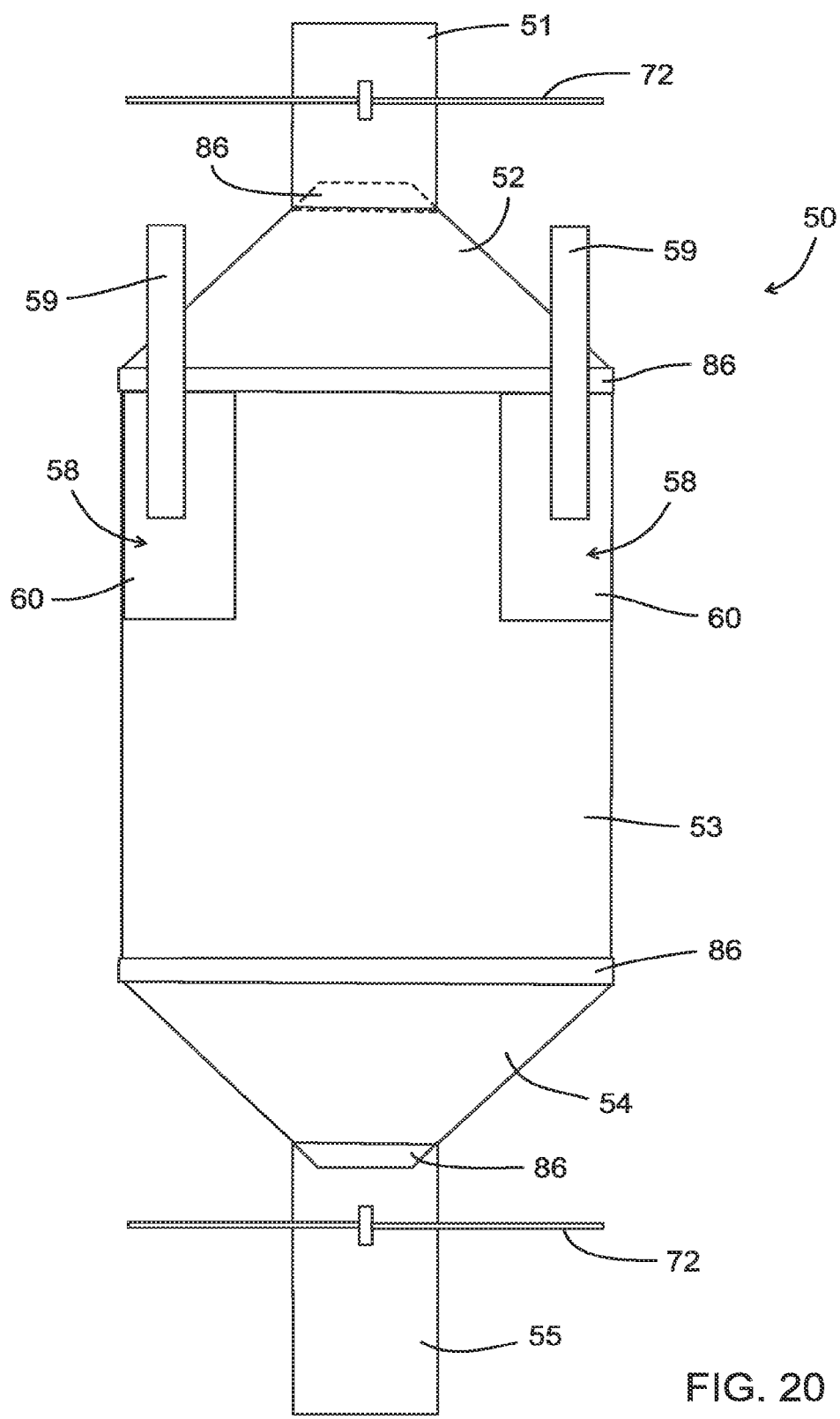
FIG. 20 is another top view of a preferred embodiment of folded or gusseted bulk bag of the present invention.
Figure 21:
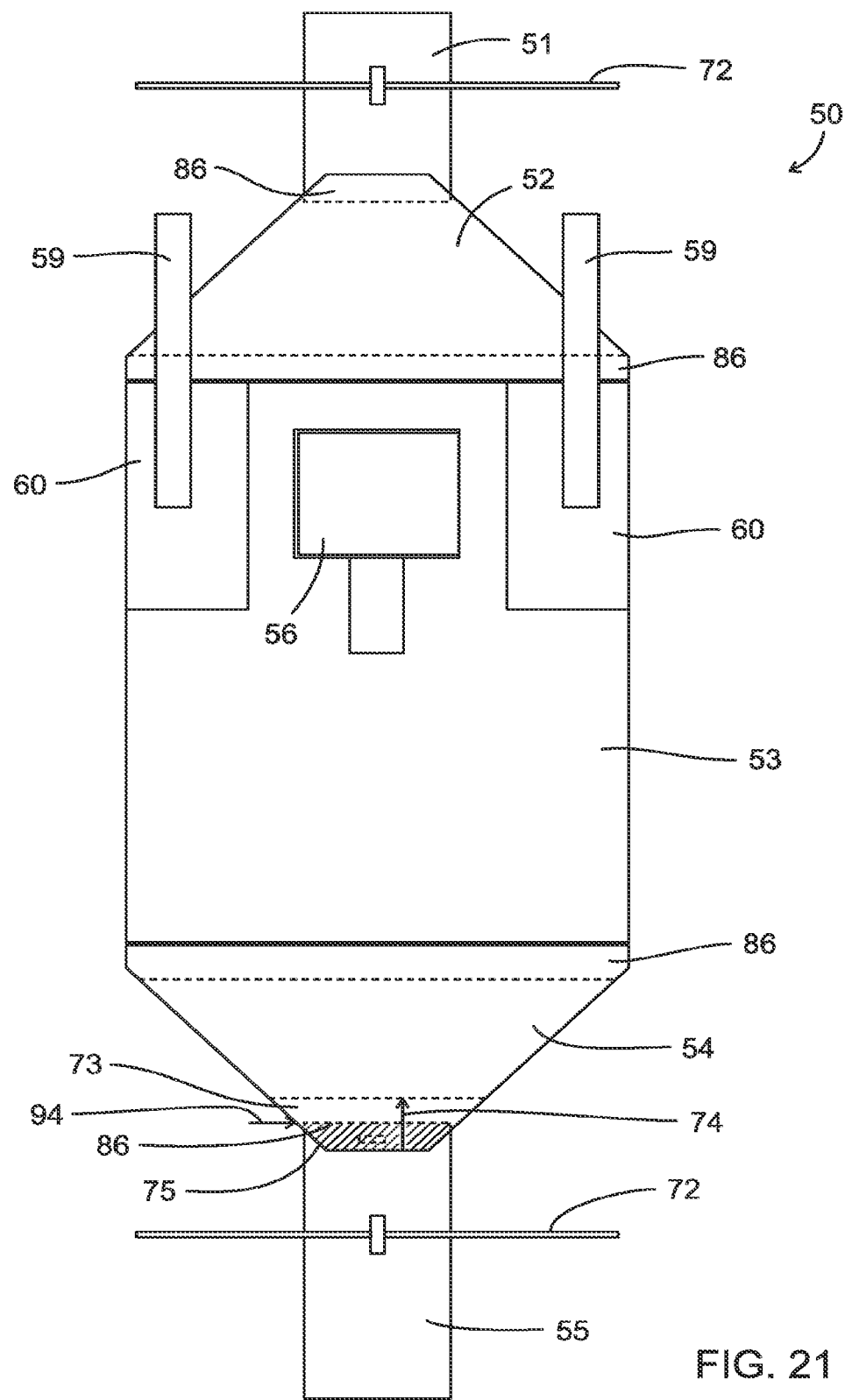
FIG. 21 is another top view of a preferred embodiment of a folded or gusseted bulk bag of the present invention.
Figure 22:
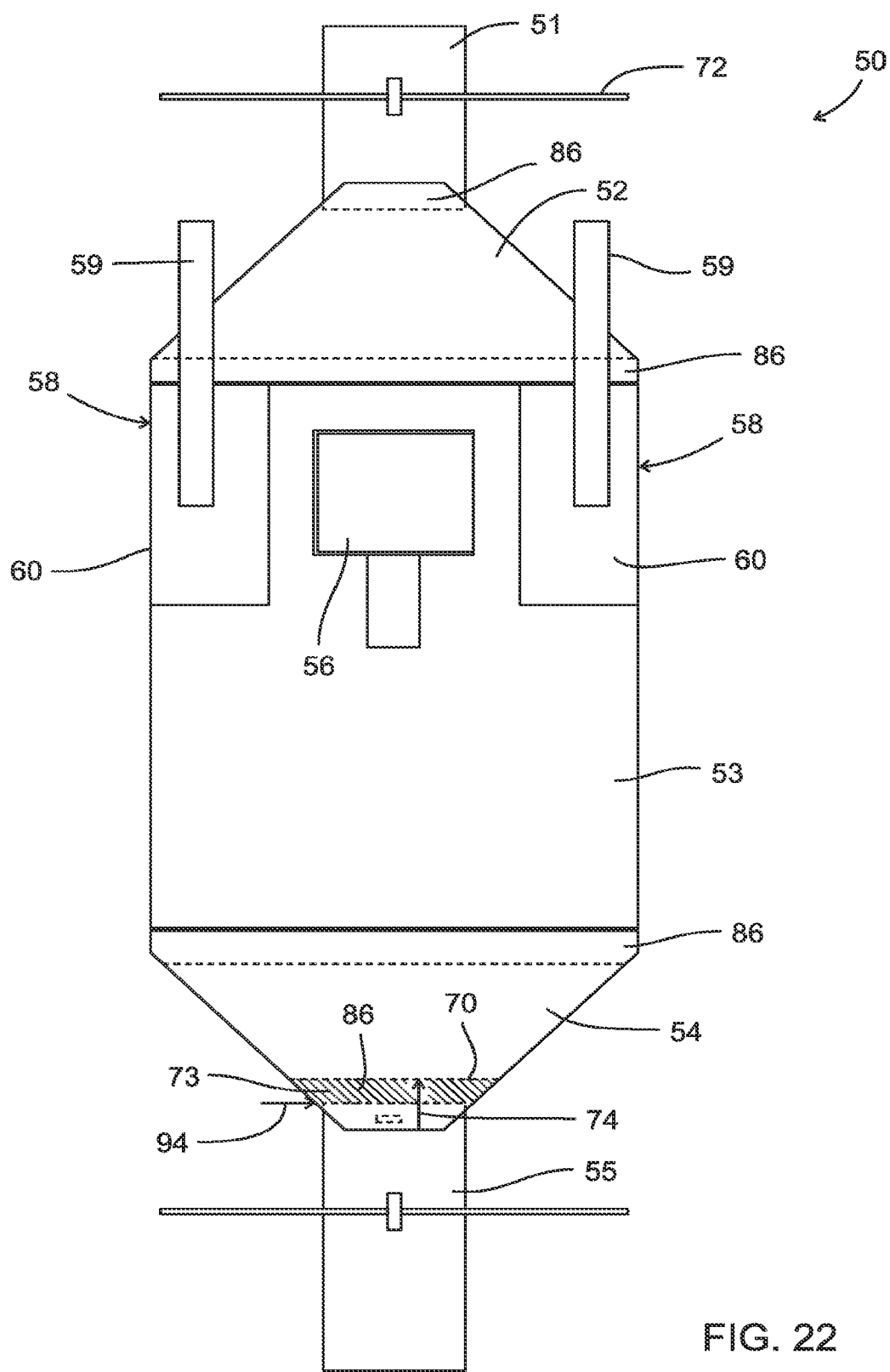
FIG. 22 is another top view of a preferred embodiment of a folded or gusseted bulk bag of the present invention.
Figure 23:
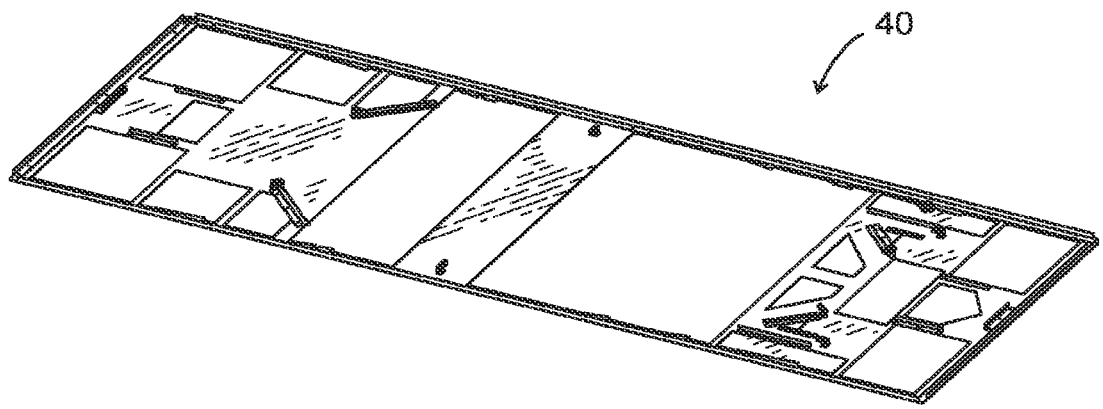
FIG. 23 is perspective view of a preferred embodiment of a carrier plate of the present invention.
Figure 24:
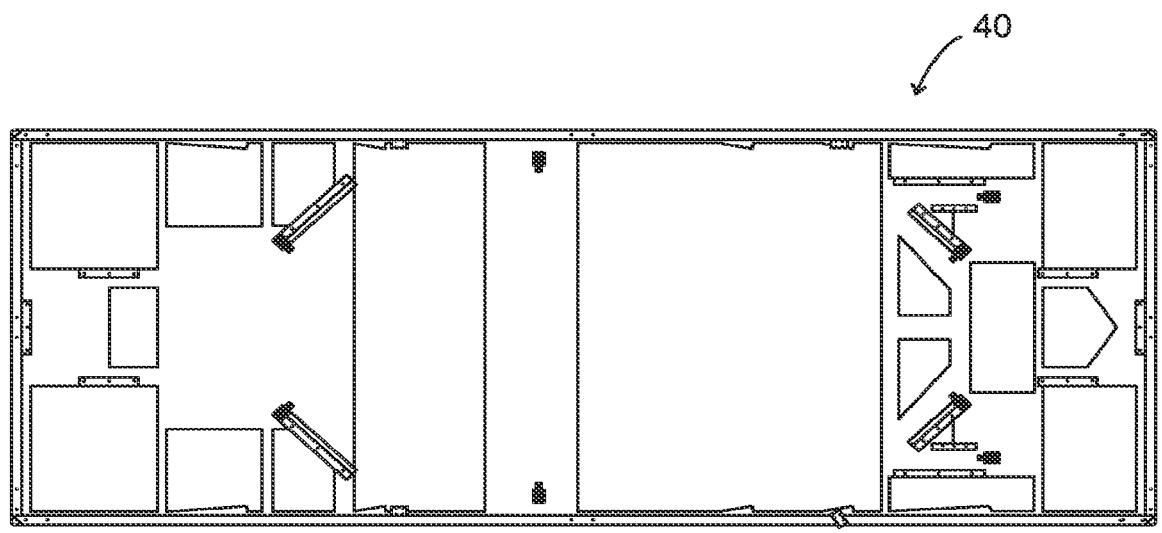
FIG. 24 is top view of a preferred embodiment of a carrier plate of the present invention.

Referring to FIGS. 21-22, if a bottom insert 73 is included in a bulk bag 50, a bottom insert 73, discharge tube 55 and bottom 54 are overlapped together and bottom 54 is heat sealed to both the insert 73 and discharge tube 55. Cross hatching 75 in FIG. 21 illustrates the location of a heat seal joint 86 between bottom 54 and discharge tube 55. Cross hatching 70 in FIG. 22 illustrates the location of a heat seal joint 86 between bottom 54 and insert 73. Arrow 74 designates a length of insert 73 when overlapped with bottom 54 and discharge tube 55. Insert 73 reinforces a place of weakness in a joint 86 between a discharge tube 55 and bottom 54, which is designated by arrow 94, and sometimes referred to as a zero point. In FIG. 19, an embodiment of a bag 50 is illustrated without an insert 73 where just a discharge tube 55 and bottom 54 are joined together to form a joint 86 in the overlap portion of discharge tube 55 and bottom 54.

FIGS. 31-34 illustrate a body portion 53. Body portion 53 is a preferably a tubular piece of flexible plastic fabric that can be folded/gusseted as shown in FIGS. 33 (which is a top view) and 34 (which is an end view). Body portion 53 is folded as shown in FIGS. 33-34 when on carrier 43 and overlapped with top 52 and bottom 54 on carrier plate 40.

Figure 37:
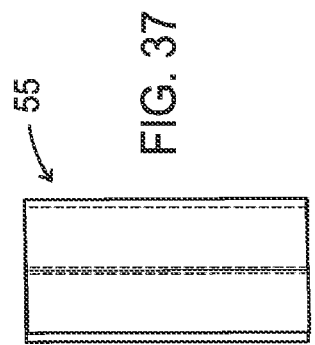
FIG. 37 is a top view of a preferred embodiment of a discharge tube of a bulk bag of the present invention that is folded/gusseted.
Figure 38:
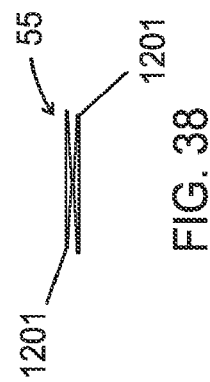
FIG. 38 is an end view of a preferred embodiment of a discharge tube of a bulk bag of the present invention that is folded/gusseted.
Figure 36:
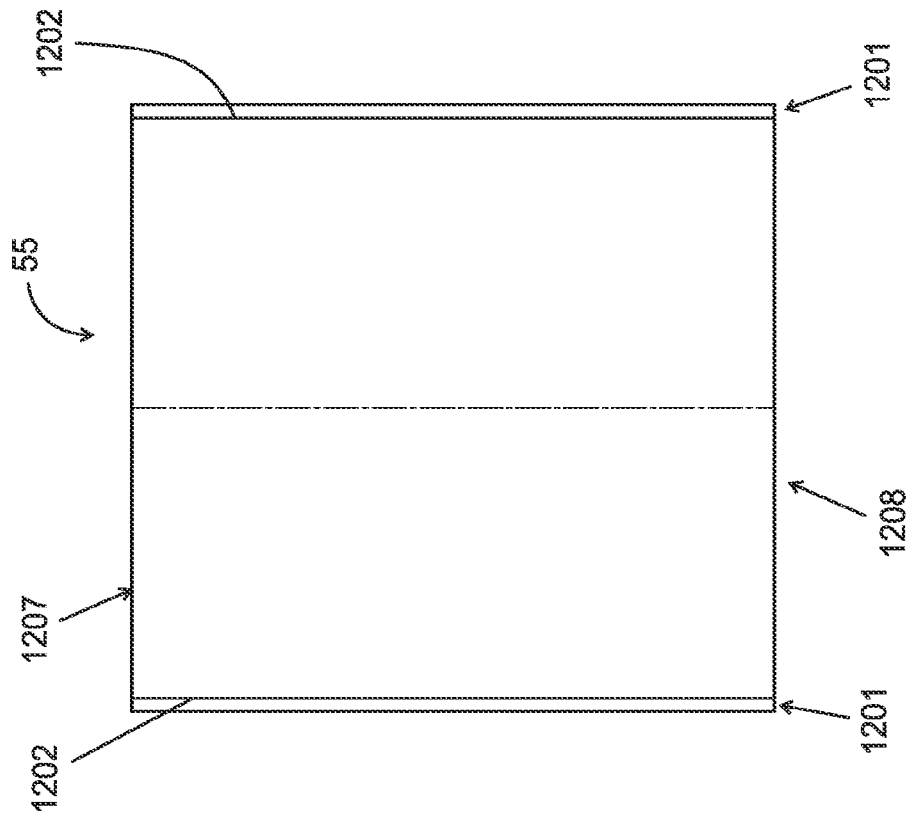
FIG. 36 is a front view of a preferred embodiment of a discharge tube of a bulk bag of the present invention.

FIGS. 35-38 illustrate a discharge tube 55. Discharge tube 55 is preferably a tubular piece of flexible plastic fabric that can be folded/gusseted as shown in FIGS. 37 (which is a top view) and 38 (which is an end view). Discharge tube 55 is folded as shown in FIGS. 37-38 when on carrier 43 and overlapped with bottom 54 on carrier plate 40. Discharge tube 55 can include an opening 68 (see FIG. 18). A tie or cord 72, as shown in FIG. 18 can be included in a discharge tube 55 if desired.

FIGS. 39-42 illustrate a fill spout 51. Fill spout 51 is preferably a tubular piece of flexible plastic fabric that can be folded/gusseted as shown in FIGS. 41 (which is a top view) and 42 (which is an end view). Fill spout 51 is folded as shown in FIGS. 41-42 when on carrier 43 and overlapped with top 52 on carrier plate 40. A tie or cord 72, as shown in FIG. 18 can be included in a fill spout 51 if desired.

Bag portions 51, 52, 53, 54, 55, 57, 58 preferably have a coating 80 applied to the bag fabric at least in a joint area where a bag portion will be bonded to another bag portion. The coating 80 can be on exterior surfaces or interior surfaces of a bag portion when in a gusseted configuration. For example, if a coating 80 is on a body 53, a fill spout 51 and a discharge tube 55 exterior, a coating 80 will be on a bottom 54 or top 52 interior surface when gusseted so that when these body portions are overlapped, e.g., as shown in FIGS. 18-22 and 57-60, coating on one bag portion is facing coating on another bag portion. The coating 80 applied can be a bonding coating, e.g., propylene-based plastomer or elastomer coating (e.g., a coating made with products sold under trademarks VERSIFY™ 3000 and EXXON™), or a standard fabric laminate coating, e.g., a standard polypropylene fabric coating comprising a majority percentage of polypropylene and some polyethylene. In a joint area of overlapped bag portions, a bonding coating, e.g., a propylene-based plastomer or elastomer coating, can face a standard fabric laminate coating to be bonded together during a heat sealing process to form a bag joint 86. Or, in a joint area of overlapped bag portions, a bonding coating, e.g., propylene-based plastomer or elastomer coating, can face another bonding coating, e.g., another propylene-based plastomer or elastomer coating, to be bonded together during a heat sealing process to form a bag joint 86. A bottom surface of patch 60 and bottom cover 57 can have a standard laminate coating if body 53 has a bonding coating, or vice versa. Likewise, an interior surface of bottom 54 and top 52 can have a bonding coating if body 53, fill spout 51, and discharge tube 55 have a standard laminate coating, and vice versa. An insert 73 can also have a standard laminate coating thereon if bottom 54 has a bonding coating, and vice versa. Reference is made to U.S. patent application Ser. No. 15/807,272, incorporated herein by reference, for further detail on coatings and forming heat sealed joints in a bulk bag.

Referring to FIGS. 31-42, in preferred embodiments of a bag 50, a coating is applied with an overedge coating portion 1201, for both a bonding coating (e.g., a propylene based plastomer or elastomer coating) or a standard fabric laminate coating (e.g., a standard polypropylene fabric coating comprising a majority percentage of polypropylene). The tubular bag fabric portion 51, 53, 55 can have two open end portions 1207 and 1208, and two edge portions 1202 that are not open. Coating can be applied on a first side wherein it extends past each coated edge 1202 in an over edge coating area 1201, which can be about 0 to 0.4 centimeters, example. The coating can also be applied on a second side of the tubular fabric portion 51, 53, 55 in the same manner so that it extends beyond each edge 1202 in an over coated area 1201. When coating is applied to the second side, the over edge portion of the second side will adhere to the over edge portion of the first side coating.

In a final coated tubular fabric portion 51, 53, 55, two overedge coating areas 1201 will be present. Each tubular piece can be gusseted so that a first over edge portion 1201 is on a top side of a gusset edge, and the second over edge portion 1201 is on a bottom side gusset edge, as shown in FIGS. 34, 38, 42.

When a bag body portion 53, for example, is gusseted as is shown in FIG. 33, 34, four lift loop assemblies 58 can be positioned on each gusseted edge 1203, 1204, 1205, 1206 of the bag, including on the gusseted edges 1203 and 1205 with overedge coating area 1201. The lift loop assemblies 58 can then be heat sealed to the bag. The overedge coating gusseted configuration as shown can eliminate the need for adding fabric tape at one or more patch 60 edges. The overedge coating gusseted configuration provides additional strength and reinforcement at the lift loop assemblies 58/body 53 joints to help prevent tearing or breakage.

Figure 43:
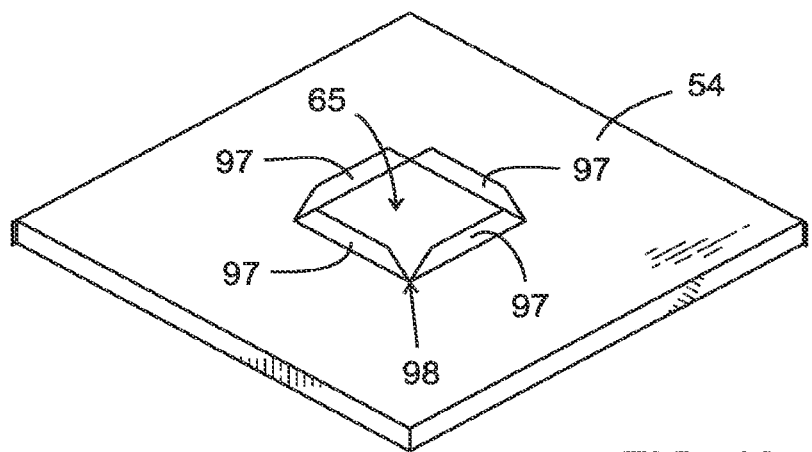
FIG. 43 is a perspective view of a preferred embodiment of a bottom portion of a bulk bag of the present invention.
Figure 44:
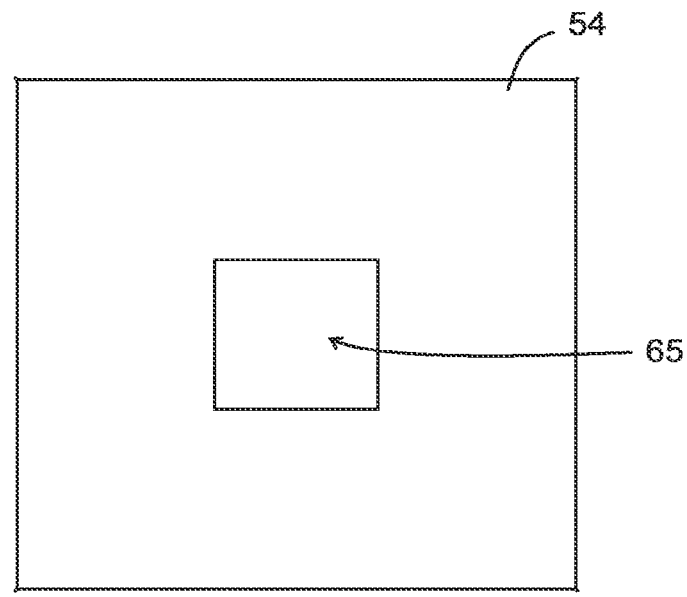
FIG. 44 is a top view of a preferred embodiment of a bottom portion of a bulk bag of the present invention.
Figure 45:
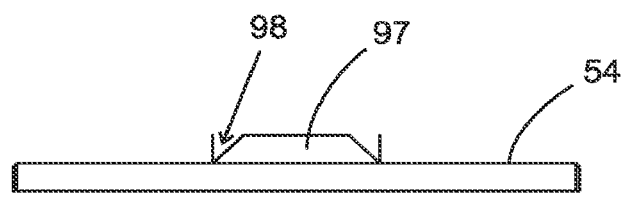
FIG. 45 is a side view of a preferred embodiment of a bottom portion of a bulk bag of the present invention.
Figure 46:
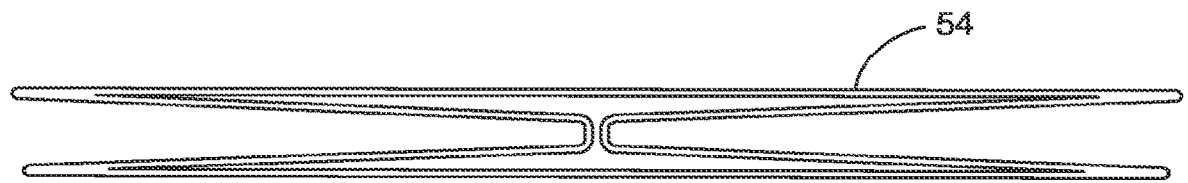
FIG. 46 is an end view of a preferred embodiment of a bottom portion of a bulk bag of the present invention that is folded/gusseted.
Figure 47:
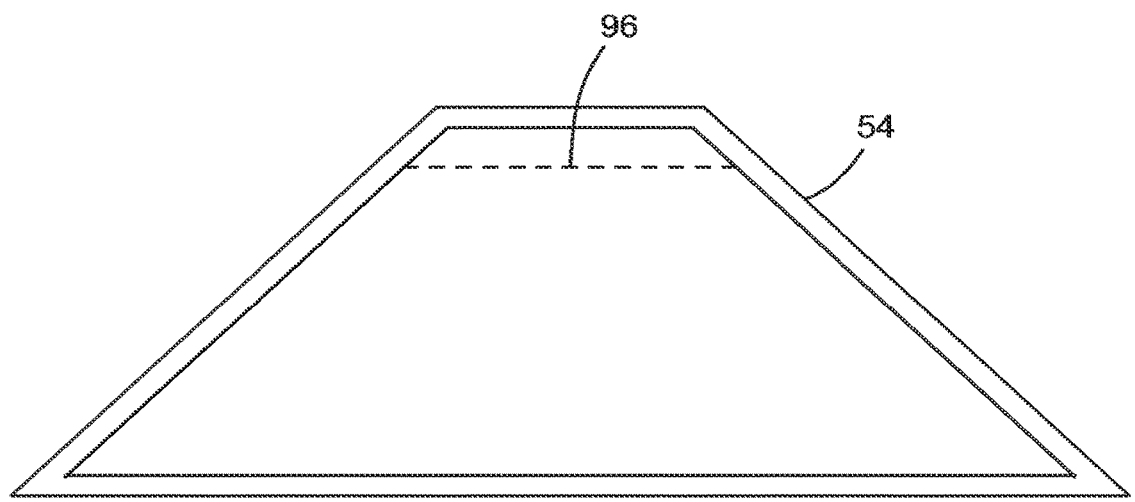
FIG. 47 is a top view of a preferred embodiment of a bottom portion of a bulk bag of the present invention that is folded/gusseted.

FIG. 43 is a perspective view of a bottom portion 54. FIG. 44 is a top view of a bottom portion 54. FIG. 45 is a side view of a bottom portion 54. FIG. 44 is a top view of a bottom portion 54. Bottom portion 54 is preferably formed form a flat piece of flexible plastic fabric with an opening 65 therein that can be folded/gusseted as shown in FIGS. 46 (end view) and 47 (top view). Four slits 98 can be included near opening 65. Line 96 is a fold line representing where bottom 54 fabric can be folded to form flaps 97 that attach to a discharge tube 55. Bottom 54 is folded as shown in FIGS. 46-47 when on carrier 43 and when overlapped with discharge tube 55 and body 53 on a carrier plate 40. A top portion 52 can be the same as a bottom portion as depicted in FIGS. 43-47 (e.g., see FIG. 18) and folded/gusseted in a same or similar manner. Top portion 52 can be folded/gusseted as shown in FIGS. 46-47 when on carrier 43 and when overlapped with fill spout 51 and body 53 on a carrier plate 40.

Figure 48:
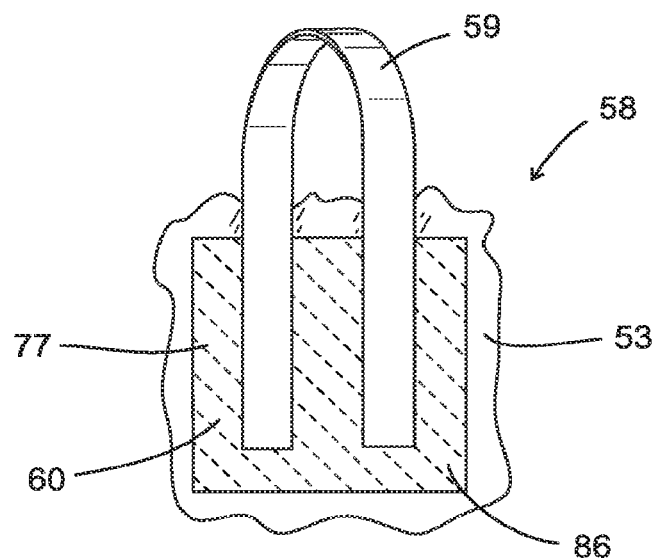
FIGS. 48-49 illustrate a preferred embodiment of a lift loop assembly of a bulk bag of the present invention.
Figure 49:
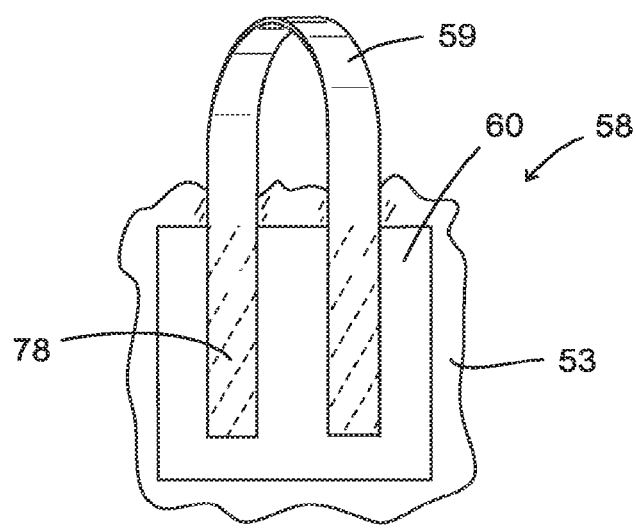

FIGS. 48-49 illustrate a lift loop assembly 58. Crosshatching 77 in FIG. 48 represents the joint formed between a bottom side of patch 60 and body 53. Crosshatching 78 in FIG. 49 represents an area where a joint 86 is not formed between patch 60 and body 53 under where the lift loop 59 is located. This is due to the shape of lift loop seal bar assembly 34 and shorter heat seal bar 36. Lift loop assembly 58 preferably can be folded in half as shown on carrier 43 in FIGS. 25-26 for being placed over edges 1203, 1204, 1205, 1206 of gusseted body portion 53 (see FIG. 34).

Figure 50:
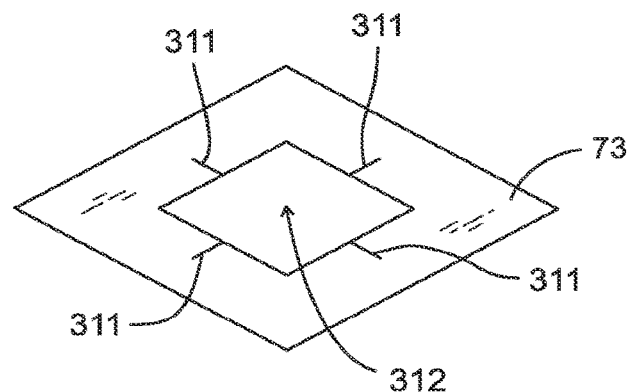
FIG. 50 is a perspective view of a preferred embodiment of a reinforcing insert of a bulk bag of the present invention.
Figure 51:
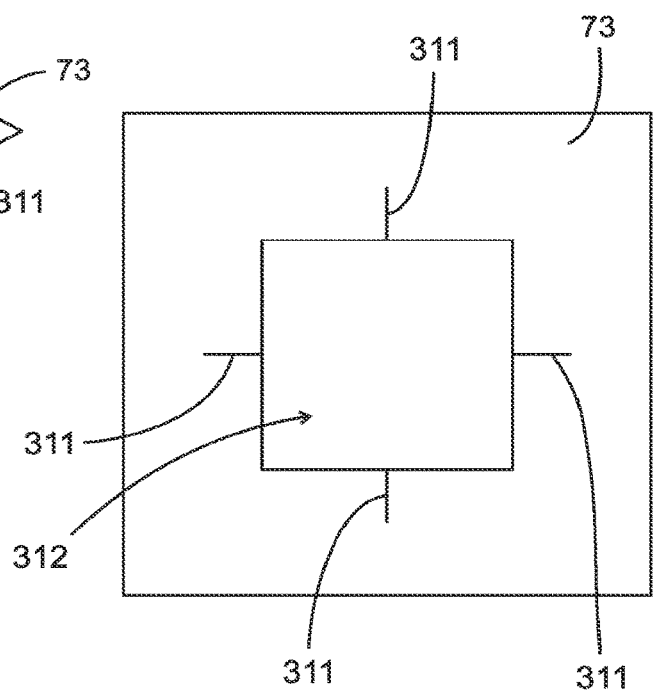
FIG. 51 is a top view of a preferred embodiment of a reinforcing insert of a bulk bag of the present invention.
Figure 52:
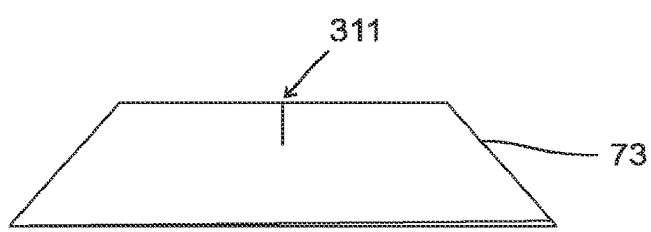
FIG. 52 is a top view of a preferred embodiment of a reinforcing insert of a bulk bag of the present invention that is folded/gusseted.
Figure 53:
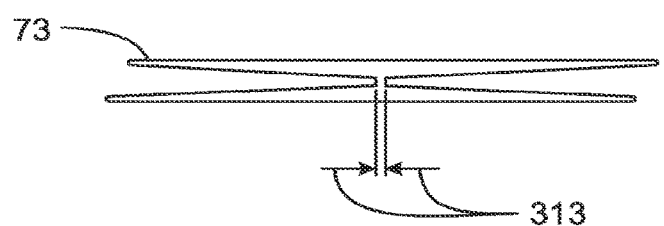
FIG. 53 is an end view of a preferred embodiment of a reinforcing insert of a bulk bag of the present invention that is folded/gusseted.
Figure 54:
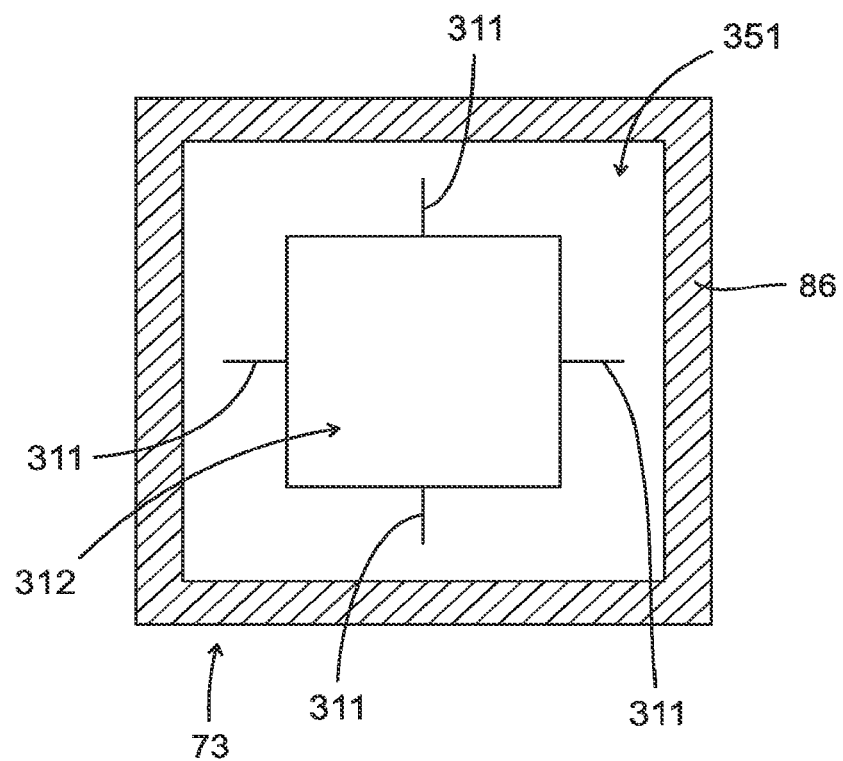
FIG. 54 is a top view of a preferred embodiment of a reinforcing insert of a bulk bag of the present invention.
Figure 55:
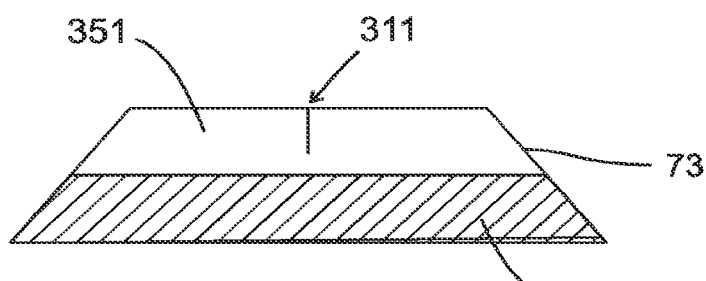
FIG. 55 is a top view of a preferred embodiment of a reinforcing insert of a bulk bag of the present invention that is folded/gusseted.

FIG. 50 is a perspective view of a reinforcing insert or a bottom insert 73. FIGS. 51, 54 are top views of a bottom insert 73. Bottom insert 73 is preferably a flat piece of flexible plastic fabric with an opening 312 therein that can be folded/gusseted as shown in FIGS. 53 (end view) and 52, 55 (top view). Bottom insert 73 can be folded as shown in FIGS. 52-53, 55 and included on a carrier 43 and when overlapped with discharge tube 55 and bottom 54. Crosshatching in FIGS. 54 and 55 illustrates the area where a joint 86 is formed between bottom insert 73 and bottom 54.

Insert 73 preferably includes one or more slits 311 (e.g., preferably four slits 311) extending from an opening 312 as shown in the figures, which allow for some movement during assembly and heat sealing of a bottom and discharge assembly including bottom 54, insert 73 and discharge tube 55. Insert 73 can be folded in a gusseted configuration as shown in FIGS. 52, 53, 55. Preferably, a space is left in between inner surfaces of gusset portions, e.g., in between arrows 313 as shown in FIG. 53, which can help prevent unwanted bag joints 86 from forming (e.g., depending on whether a coating is on an interior surface of insert 73 and what type of coating is on an interior surface of insert 73) and can help enable expansion to an open or expanded configuration after heat sealing of a bag 50.

Figure 56:
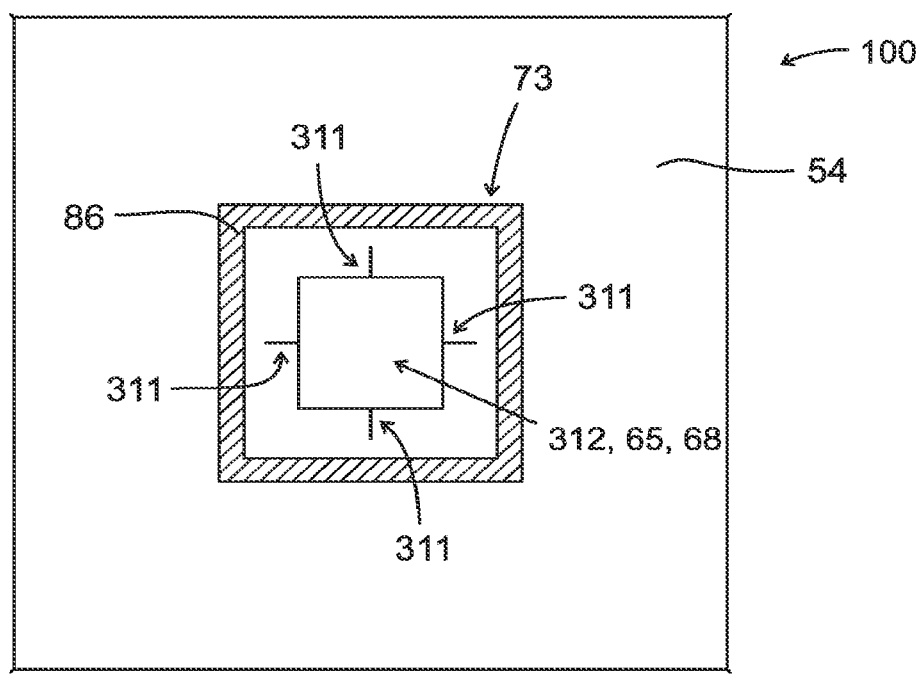
FIG. 56 is a top view illustrating a preferred embodiment of a bottom/insert/discharge tube assembly of a bulk bag of the present invention.

FIG. 56 shows bottom insert 73 coupled to bottom 54 with joint 86 shown in cross hatching, when included in a bottom/insert/discharge tube assembly of a bulk bag 50. An insert 73 can reinforce a joint between a bottom and discharge tube and reference is made to U.S. patent application Ser. No. 17/007,509, which is incorporated herein by reference thereto, for further detail on a bottom/insert/discharge tube assembly of a bulk bag that can also be formed using sensorless heat sealing technology of the present invention. Portion 351 of insert 73 that is not shown in cross-hatching in FIGS. 54-55 is the portion of insert 73 that preferably is not coupled to discharge tube 55 or to bottom 54 when overlapped with discharge tube 55 and bottom 54 as shown in FIG. 56 and placed through a heat sealing machine. Thus, the non-cross-hatched portion 351 in FIGS. 54-55 can be a free portion or non-bonded portion of insert 73 that is not heat sealed or otherwise coupled to discharge tube 55 and also is not heat sealed or otherwise coupled to bottom 54.

Figure 57:
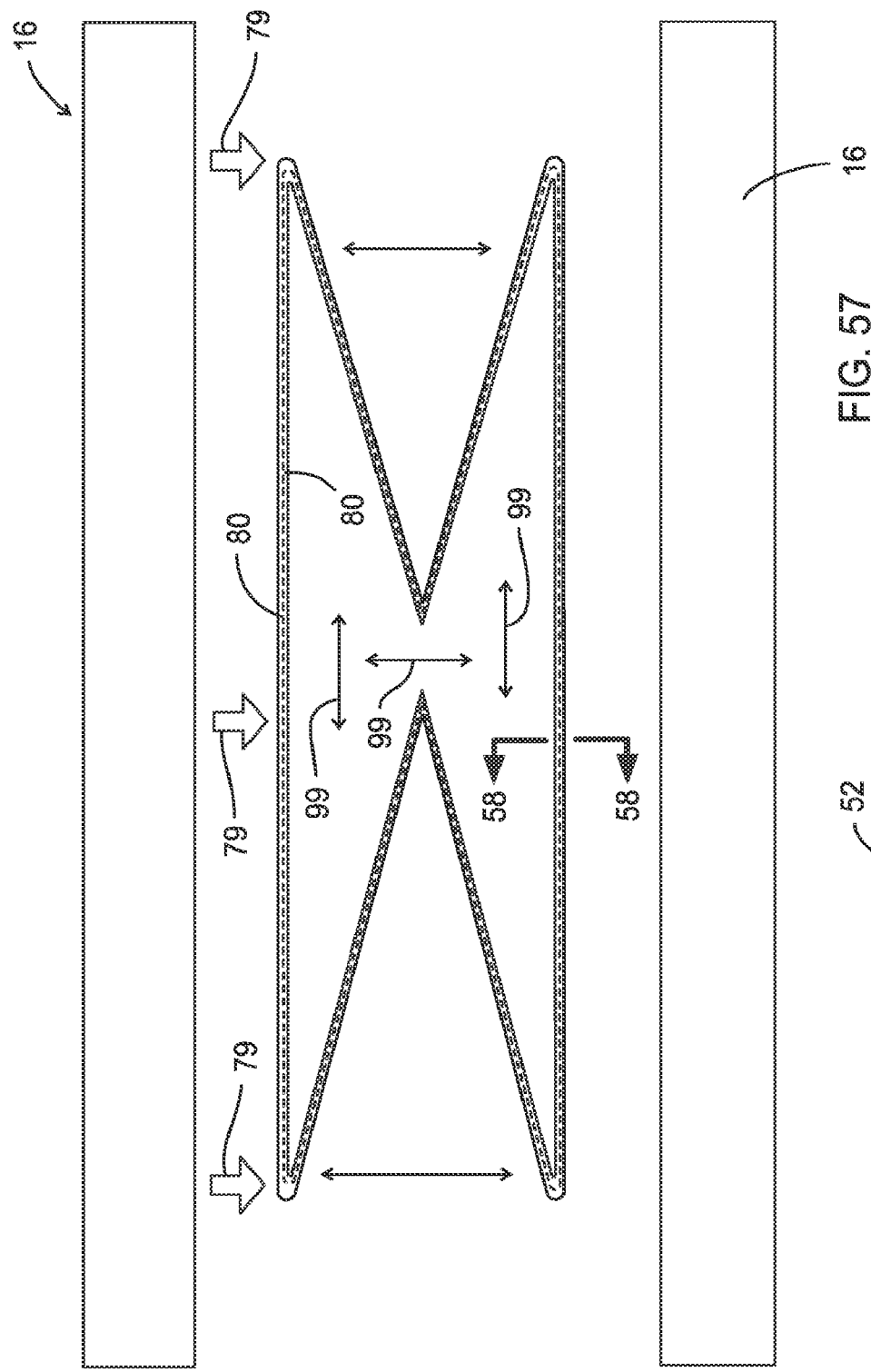
FIG. 57 illustrates a preferred embodiment of the method of the present invention of heating sealing bulk bag portions together between heat seal bars.
Figure 58:
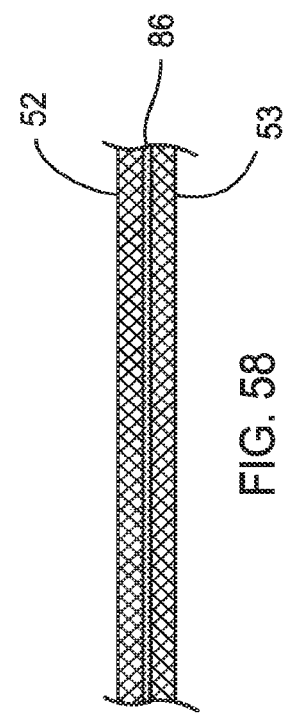
FIG. 58 is a illustrates a preferred embodiment of a heat sealed joint of a bulk bag of the present invention taken along lines 58-58 of FIG. 57.

Referring to FIGS. 57-60, preferred embodiments of the method of the present invention of heating sealing bulk bag portions together using a heat seal bar assembly of the present invention is shown. FIGS. 57-58 illustrate heat sealing a top portion 52 to a body portion 53, e.g., using heat seal bar assemblies 16 of the present invention when a body portion 53 and top portion 52 are overlapped while folded/gusseted, wherein an upper heat seal bar assembly 16 can be lowered in the direction of arrows 79 to make contact with the overlapped bag portions, melt a coating in the overlapped area and form a joint between coatings in the overlapped area. In FIG. 58, a heat sealed joint 86 between body portion 53 and top portion 52 is depicted. Arrows 99 represent areas where joints are not formed even when bag surfaces around arrows 99 are pressed together during a heat sealing process.

FIGS. 59-60 illustrate heating sealing a bottom/insert/discharge tube assembly together using, e.g., heat seal bar assemblies 49 as shown in FIGS. 64, 66, when a discharge tube 55, insert 73 and bottom portion 54 are overlapped together while folded/gusseted, wherein an upper heat seal bar assembly 49 can be lowered in the direction of arrows 87 to make contact with the overlapped bag portions, melt a coating in the overlapped area and form a joint 86 between coatings 80 in the overlapped area. FIG. 60 shows a heat sealed joint 86 formed between a discharge tube 55 and bottom 54 during the heat sealing process.

Other heat sealed joints as described herein can be formed in a similar or same manner. As shown in FIGS. 34, 38, 42, 53, preferably bag portions are folded/gusseted so that inner folds or gussets do not touch, e.g., such a space is represented by arrows 313 in FIG. 53. This helps prevent an unwanted joint between inner folded portions.

FIGS. 61-63 illustrate a preferred embodiment of a heat seal bar assembly 91 that can be used to heat seal a document pouch 56 to a body 53. Heat seal bar assembly 91 can include a body 151 with heating elements 92, 93 coupled thereto. Insulation tape 157 can be included on a heating element 92, 93. A laser light aligning assembly can also be included on body 151, with a plurality of alignment components 158 coupled to body 151 with a fastener, e.g., screws 161, washers 159.

FIG. 63 is an exploded view illustrating where calibration sensor 14 with calibration sensor lead line 15 attached thereto can be placed on heating element 92 and where transducer electrical lines 17, and transformer electrical lines 18 can be coupled to heating element 92, respectively, during calibration. During calibration pressure of applying heat seal bar assembly to plastic fabric can hold calibration sensor 14 in place. A sensor 14 can also be placed on a heating element 93 if desired. After calibration of heat seal bar assembly 91, calibration sensor 14 is removed from heat seal bar assembly 91, e.g., as shown in FIG. 61. During a heat sealing process, e.g., using heat seal machine 41, heat seal bar assembly 91 as shown in FIG. 61 can be used to heat seal a document pouch 56 to body 53 to form a joint 86 therebetween. As shown in FIG. 63, power jumpers 39 can be included to electrically couple heating elements 92, 93 together so that only one calibration sensor 14 is needed during calibration.

FIGS. 61-63 also show a fastener/coupler/attachment assembly 171 for attaching heat seal bar assembly 91 to machine 41, e.g., at air cylinders 69. Fastener/coupler/attachment assembly 171 can include, for example, attachment yoke 152, coupled to body 151 of heat seal bar assembly 91 with screw 160 and bushing 167 or with another desired fastener. Clevis fastener 164 also can be coupled to yoke 152 with screw 160 and bushing 167. Brackets 153 and 154 can be coupled to yoke 152 with a shaft 163 of a clevis fastener 164, washers 162, washers 169 and nuts 170. Brackets 153, 154 can be coupled to clevis fastener 164 with collar 166, washers 165, rod 168 and shaft 163. Other fasteners can be used, but preferably one of the brackets 153, 154 has a slotted opening that enables a rocking motion of the heat seal bar assembly 91.

FIGS. 64, 66 illustrate a preferred embodiment of a heat seal bar assembly 49 that can be used to heat seal a bottom assembly of bulk bag, e.g., a bottom 54, insert 73, discharge tube 55 together or to heat seal just a bottom 54 and discharge tube 55 together. Heat seal bar assembly 49 can include a body 131 that is preferably shaped according to a desired bag joint shape. Heat seal bar assembly 49 can also include an insulating pad 105 and a protective sheet 142 in between body 131 and heating elements 62, 63. A cover 66 can be on top of heating elements 62, 63. End plates or end caps 103 can be included. End plates 103 and heating elements 62, 63 can be coupled to body 131 with a desired fastener assembly, e.g. springs 117, nuts 116, pins 102, pins 104, washers 106, washers 107, and screws 118.

Cover 66 can be coupled to body 131 with screws 143, or other desired fasteners. Bumpers 111, 112 and clips 109 can also be coupled to body 131 with screws 143. Bumpers 111, 112 are preferably in position to provide a bumper for carrier plate 40 when in a heat seal machine 41, 46, for example. Cooling lines 38 can also be included on a heat seal bar assembly 49, which can comprise tubing 114 and be coupled to body 131 with elbow 113, screws 119, and tie holder 110, or with another desired fastener.

FIG. 66 is an exploded view illustrating where calibration sensor 14 with calibration sensor lead line 15 coupled thereto can be placed in heat seal bar assembly 49, and where transducer electrical lines 17, and transformer electrical lines 18 can be coupled to heating elements 62, 63 during calibration. After calibration of heat seal bar assembly 49, calibration sensor 14 is removed from heat seal bar assembly 49, e.g., as shown in FIG. 64. During a heat sealing process, e.g., using heat seal machine 41, heat seal bar assembly 49 as shown in FIG. 64 can be used to heat seal a bottom assembly together, e.g., to form a joint 86 between a bottom 54 and discharge tube 55 and a joint 86 between a bottom 54 and insert 73.

As shown in FIG. 66, a power jumper 39 can be included to electrically couple heating elements 62, 63 together so that only one calibration sensor 14 is needed during calibration. A fastener/coupler/attachment assembly for attaching heat seal bar assembly 49 to machine 41, e.g., at air cylinders 69, can also be included, e.g., one that is the same or similar to fastener assembly 171.

Figure 65:
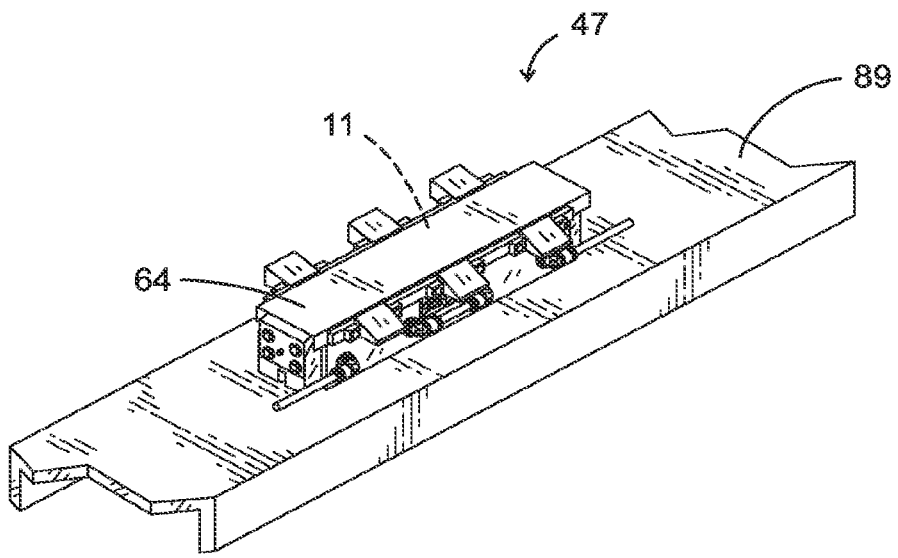
FIG. 65 is a perspective view of a fifth preferred embodiment of a heat seal bar assembly of the present invention.

FIGS. 65, 67 illustrate a preferred embodiment of a heat seal bar assembly 47 that can be used to heat seal a fill spout 51 to a top 52 of a bulk bag 50. Heat seal bar assembly 47 can include a body 101 that is shaped according to a desired bag joint shape. Heat seal bar assembly 49 can also include an insulating pad 105 and a protective sheet 120 in between body 101 and heating element 11. A cover 64 can be on top of heating element 11, which is also preferably shaped according to a desired bag joint shape. End plates 103 can be included. End plates 103 and heating element 11 can be coupled to body 101 with a desired fastener assembly, e.g. springs 117, nuts 116, pins 102, pins 104, washers 106, washers 107, and screws 118.

Cover 64 can be coupled to body 101 with screws 121, or other desired fasteners. Bumpers 111, 112 and clips 109 can also be coupled to body 101 with screws 121. Bumpers 111, 112 are preferably in position to provide a bumper for carrier plate 40 when in a heat seal machine 41, 46, for example. Cooling lines 38 can also be included on a heat seal bar assembly 47, which can comprise tubing 114 and can be coupled to body 101 with elbow 113, screws 119, and tie holder 110, or with another desired fastener.

FIG. 67 is an exploded view illustrating where calibration sensor 14 with calibration sensor lead line 15 coupled thereto can be placed in between protective sheet 120 and heating element 11. Pressure applied by heat seal bar assembly 47 to a flexible fabric during a calibration cycle can hold calibration sensor 14 in place. Transducer electrical lines 17 and transformer electrical lines 18 are coupled to heating element 11 during calibration. After calibration of heat seal bar assembly 47, calibration sensor 14 is removed from heat seal bar assembly 47, e.g., as shown in FIG. 65. During a heat sealing process, e.g., using heat seal machine 41, heat seal bar assembly 47 as shown in FIG. 65 can be used to heat seal fill spout 51 and top 52 together to form a joint 86 therebetween. A heat seal bar assembly 47 can also be used to heat seal a discharge tube 55 and bottom 53 together, e.g., in embodiments of a bag that will not include an insert 73.

A fastener/coupler/attachment assembly that is the same or similar to fastener assembly 171 that is shown in FIGS. 61-63 can also be used for attaching heat seal bar assembly 47 to machine 41, e.g., at air cylinders 69.

Figure 68:
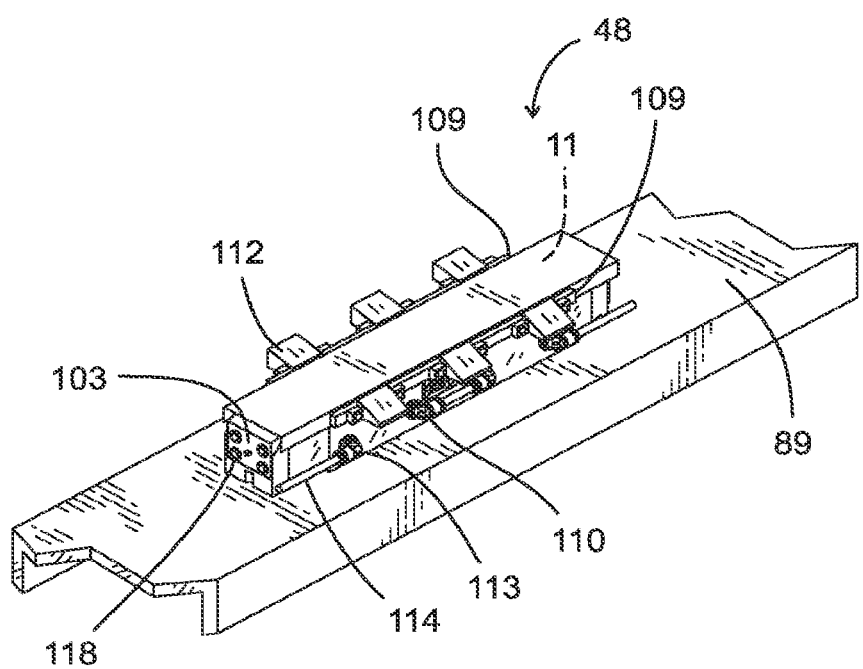
FIG. 68 is a perspective view of a sixth preferred embodiment of a heat seal bar assembly of the present invention.

FIG. 68 illustrates a preferred embodiment of a heat seal bar assembly 48 that can be used to heat seal a bottom cover 57 to a body 53 of a bulk bag 50. It should be noted that heat seal bar assembly 48 can include the same or similar features as a heat seal bar assembly 47, with heat seal bar assembly 48 in preferred embodiments being longer than a heat seal bar assembly 47. The shape of a heat seal bar assembly can be chosen based on the desired joint to be formed between bag portions. The joint to be formed between a bottom cover 57 and a body 53 is preferably longer than a joint formed between a fill spout 51 and top 52 and therefore preferably heat seal bar assembly 48 is also longer than heat seal bar assembly 47. Calibration sensor 14, calibration sensor lead line 15, transducer electrical lines 17, transformer electrical lines 18 can be placed in or coupled to heat seal bar assembly 48 during calibration in a same manner, or in a similar manner, as shown in FIG. 67. After calibration of heat seal bar assembly 48, calibration sensor 14 is removed from heat seal bar assembly 48, e.g., as shown in FIG. 68. During a heat sealing process, e.g., using heat seal machine 46, heat seal bar assembly 48 as shown in FIG. 68 can be used to heat seal bottom cover 57 and body 53 together to form a joint 86 therebetween.

A coupler/attachment assembly that is the same or similar to what is shown in FIG. 61-63 can also be used for attaching heat seal bar assembly 48 to machine 46, e.g., at air cylinders 69.

It is noted that heat seal bar assemblies 47, 48 can include the same or similar features as a heat seal bar assembly 16, with heat seal bar assembly 16 in preferred embodiments being longer than a heat seal bar assembly 47 or 48. The shape of a heat seal bar assembly can be chosen based on the desired joint to be formed between bag portions. The joint to be formed between a top 52 and body 53 and the joint to be formed between a bottom 54 and body 53 is preferably longer than a joint formed between a fill spout 51 and top 52 and longer than a joint formed between a bottom cover 57 and body 53 and therefore preferably heat seal bar assembly 16 is also longer than heat seal bar assemblies 47 and 48. Calibration sensor 14, calibration sensor lead line 15, transducer electrical lines 17, transformer electrical lines 18 can be placed in or coupled to heat seal bar assembly 16 during calibration in a same or similar manner as shown in FIG. 67. After calibration of heat seal bar assembly 16, calibration sensor 14 is removed from heat seal bar assembly 16. During a heat sealing process, e.g., using heat seal machine 41, heat seal bar assemblies 16 as shown can be used to heat seal a top 52 to body 53 and to heat seal a bottom 54 to body 53 to form respective joints 86 therebetween.

Referring to heat seal bar assembly 34, as discussed, a heating element 35 or 36 can also be the same or similar to a heating element 11 of a heat seal bar assembly 16, with dimensions selected varying based on the desired bag joint shape. Calibration sensor 14, calibration sensor lead line 15, transducer electrical lines 17, and transformer electrical lines 18 can be placed in or coupled to a heating element 35, 36 during calibration in a same or similar manner as shown in FIG. 66. After calibration of heat seal bar assembly 34, calibration sensor 14 is removed from heat seal bar assembly 34. During a heat sealing process, e.g., using heat seal machine 46, a heat seal bar assembly 34 can be used to heat seal a lift loop assembly 58 to body 53 to form a joint 86 therebetween. In preferred embodiments using a heat seal machine 46 as shown, one heat seal bar assembly 34 can join two lift loop assemblies 58 to a body 53 at the same time. Thus with the pair of heat seal bar assemblies 34 in a heat seal machine 46, four lift loop assemblies 58 can be joined to a body 53 at the same time.

Figure 69:
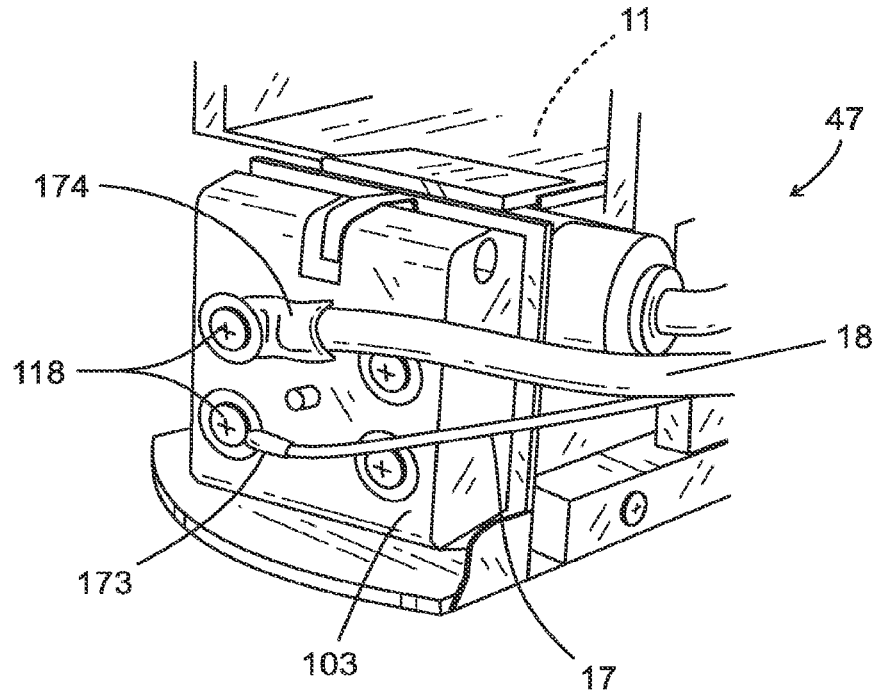
FIG. 69 is a partial perspective view of the fifth preferred embodiment of a heat seal bar assembly of the present invention.
Figure 70:
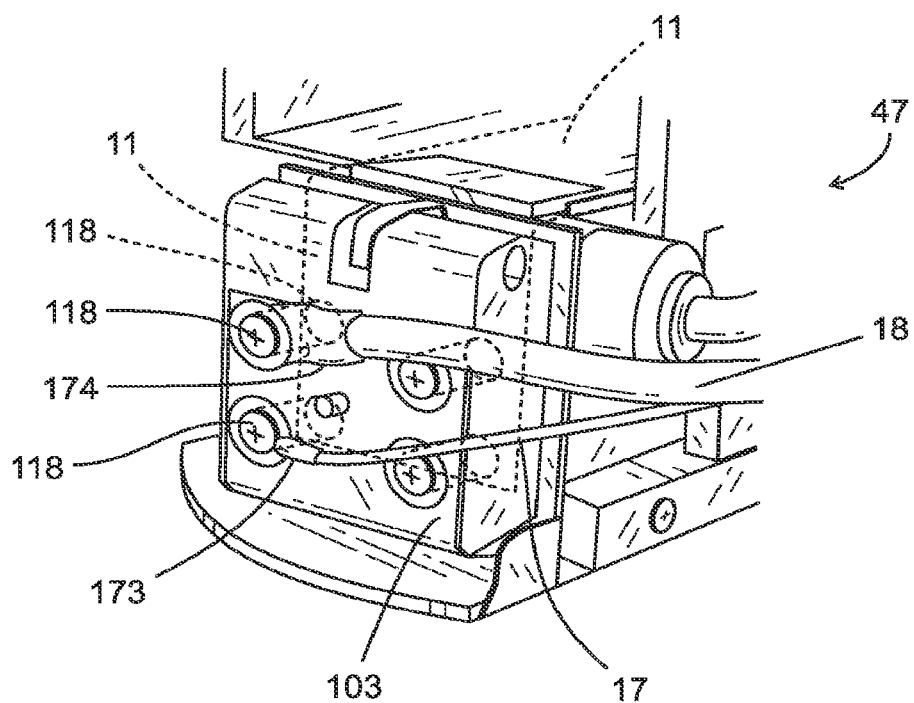
FIG. 70 is a partial perspective view of the fifth preferred embodiment of a heat seal bar assembly of the present invention.

Referring to FIGS. 69-70, in the various embodiments of heat seal assemblies described herein, e.g., in heat seal bar assemblies 16, 34, 47, 48, 49, 91, voltage transducer electrical lines 17 can be secured to heating element 11, 35, 36, 62, or 63 ends with a fastener 173, e.g., with a spade terminal connector that can be tightened under a screw 118, e.g., a #10 screw, as shown with regard to heat seal bar assembly 47. A calibration sensor 14 can be placed freely under a heating element of the different types of heat seal bar assemblies during a calibration cycle. Power electrical lines 18 can be secured with a fastener 174, e.g., a ring terminal connector tightened under a screw 118, e.g., a #10 screw. In the exploded views of FIGS. 66, 67, note that lines 17, 18 are shown as connecting at the heating element ends for clarity of illustration. As shown in FIGS. 69-70, lines 17, 18 can be secured to heating element ends with screws 118 that also couple end cap 103 to the respective assemblies. The same or a similar arrangement can be included for heat seal bar assemblies 16, 34, 48, 49 and 91. If desired, electrical lines 17, 18 can also be coupled to a heating element of the present invention in another manner.

FIG. 71 illustrates a second preferred embodiment of a control panel 20, that can fit under a table in the assembly line production area with a screen 24 that can be separate from a housing of control panel 20 that houses a controller 21 and wires, etc.

PARTS LIST

The following is a list of parts and materials suitable for use in the present invention:

| Parts Number | Description |
|---|---|
| 10 | prior art heat seal bar assembly |
| 11 | heating element |
| 12 | sensor |
| 13 | plating, e.g., copper plating |
| 14 | calibration sensor (such as type k SA1XL thermocouple sensor commercially available from Omega Engineering) |
| 15 | electrical line/lead line for sensor |
| 16 | heat seal bar assembly of a preferred embodiment of the present invention, bottom/top to body heat seal bar assembly |
| 17 | electrical line/voltage measuring wire from voltage transducer |
| 18 | electrical line/power wires from transformers |
| 19 | cover |
| 20 | control panel |
| 21 | controller/Programmable Logic Controller (PLC) |
| 22 | voltage transducer |
| 23 | switching device, e.g., Solid State Relay switch (SSR) or Silicon Controlled Rectifier (SCR) |
| 24 | screen |
| 25 | power transformer |
| 26 | current transducer |
| 27 | current transformer |
| 28 | electrical line from current transducer to current transformer |
| 29 | electrical line or wire from PLC to SSR/input voltage control |
| 30 | electrical line or wire from SSR to power transformer input voltage control line/wire |
| 31 | line or wire from PLC to voltage transducer |
| 32 | line or wire from PLC to voltage transducer |
| 33 | line or wire from PLC to current transducer |
| 34 | heat seal bar assembly of a preferred embodiment of the present invention, lift loop heat seal bar assembly |
| 35 | heaing element |
| 36 | heating element |
| 37 | cover |
| 38 | line/cooling line/water line |
| 39 | power jumper line/wire |
| 40 | carrier plate |
| 41 | heat seal machine |
| 42 | pre-heat sealed bag, including one or more overlapped bag portions prior to heat sealing the one or more bag portions together |
| 43 | bag parts or pieces carrier/carrier |
| 44 | table, completed/heat sealed bag table |
| 45 | table |
| 46 | heat seal machine |
| 47 | heat seal bar assembly of a preferred embodiment of the present invention, fill spout/top heat seal bar assembly |
| 48 | heat seal bar assembly of a preferred embodiment of the present invention bottom cover/body heat seal bar assembly |
| 49 | heat seal bar assembly of a preferred embodiment of the present invention discharge tube/bottom heat seal bar assembly |
| 50 | bulk bag |
| 51 | top spout/fill spout |
| 52 | top/top portion |
| 53 | body/body portion |
| 54 | bottom/bottom portion |
| 55 | bottom spout/discharge tube |
| 56 | document pouch |
| 57 | bottom cover |
| 58 | lift loop assembly |
| 59 | lift member/lift loop |
| 60 | patch (e.g., flexible plastic fabric piece of material) |
| 61 | space/gap |
| 62 | heating element (e.g., for heat sealing discharge |

| Parts Number | Description |
|---|---|
| 63 | tube to bottom) heating element (e.g., for heat sealing discharge tube to bottom) |
| 64 | cover, e.g., 11" heat bar cover |
| 65 | opening |
| 66 | cover |
| 67 | machine seal bar assembly (e.g., for heat sealing lift loop assembly to body) |
| 68 | opening |
| 69 | cylinder (e.g., air cylinder) |
| 70 | cross hatched portion |
| 71 | partially heat sealed bag/partially completed bag |
| 72 | tie/cord |
| 73 | bottom insert |
| 74 | arrow |
| 75 | cross hatched portion |
| 76 | frame |
| 77 | cross hatched portion (patch heat sealed joint) |
| 78 | cross hatched portion (no patch heat sealed joint) |
| 79 | arrow |
| 80 | coating |
| 81 | machine seal bar assembly (e.g., for heat sealing discharge tube to bottom) |
| 82a | machine seal bar assembly (e.g., for heat sealing body to bottom portion) |
| 82b | machine seal bar assembly (e.g., for heat sealing body to top portion) |
| 83 | machine seal bar assembly (e.g., for heat sealing document pouch to body) |
| 84 | machine seal bar assembly (e.g., for heat sealing fill spout to top) |
| 85 | machine seal bar assembly (e.g., for heat sealing bottom cover to body) |
| 86 | heat sealed joint |
| 87 | arrows |
| 88 | cover |
| 89 | base |
| 91 | heat seal bar assembly of a preferred embodiment of the present invention, document pouch heat seal bar assembly |
| 92 | heating element |
| 93 | heating element |
| 94 | arrow designating weak location or zero point |
| 96 | fold line |
| 97 | flap |
| 98 | slit |
| 99 | arrows |
| 100 | body |
| 101 | body/main body |
| 102 | pin, e.g., ⅛"dia. × ⅝"L stainless steel pin |
| 103 | end cap/end plate |
| 104 | pin, e.g., dowel pin, 3/16"dia. × ¾"L, 316 stainless steel dowel pin |
| 105 | pad, e.g., heat insulating pad, 4⅝"wide heat insulating pad |
| 106 | washer, e.g., washer for #10 screw, .203"ID, .438"OD, 18-8 stainless steel |
| 107 | washer, e.g., split lock washer for #10 screw, .022"ID, .334"OD, 18-8 stainless steel |
| 109 | clip, e.g., 10⅝" long clip |
| 110 | tie holder, e.g., fastener-mount cable tie holder with adhesive back |
| 111 | bumper, carrier plate bumper |
| 112 | bumper, carrier plate bumper |
| 113 | elbow, e.g., swiftfit swivel elbow male composite, ¼" NPT × ¼ tubing, nylon body |
| 114 | water line, e.g., tubing, e.g, ¼"OD × .17"ID polyethylene tubing |
| 116 | nut, e.g., tee nut, e.g., ultra-split resistant tee nuts inserts for hardwood for 10-24 screw, 0.360 installed length, zinc-plated steel |
| 117 | spring, e.g., steel compression spring, zinc-plated music wire, 1¼"L, 0.360"OD, 0.051" wire |
| 118 | screw, e.g., button head hex drive screw, 10-24, ⅝, 18-8 stainless steel |
| 119 | screw, e.g, button head hex drive screw, 4-40, 7/16, 18-8 stainless steel |
| 120 | protective sheet |
| 121 | screw, e.g., button head torx drive screw, 6-32, ¼, zinc plated alloy steel |
| 131 | body, double discharge seal bar body |
| 142 | protective sheet |
| 143 | screw, e.g., button head torx drive screw, 6-32, ¼, zinc plated alloy steel |
| 151 | body, e.g., cover/document pouch impulse heat sealer - modified toss document attachment plate plates |
| 152 | yoke; cover/document pouch impulse heat sealer - yoke attachment |
| 153 | bracket/seal bar slotted position bracket |
| 154 | bracket/seal bar slotted position bracket |
| 157 | tape/insulation tape (e.g. cover/document pouch impulse heat sealer Teflon fabric tape overlap insulation |
| 158 | alignment component, compact aligning line laser sub-assembly |
| 159 | washer, e.g., split lock washer for ¼" dia. screw, 18-8 stainless steel |
| 160 | screw, e.g., socket head screw, partially threaded, ¼-20, 2¾"L, 18-8 stainless steel |
| 161 | screw, e.g., button head hex drive screw, ¼-20, 1, 18-8 stainless steel |
| 162 | washer, e.g., flat washer for ¼" screw, 0.281"ID, 0.625"OD, 18-8 stainless steel |
| 163 | shaft, e.g., steel shaft, ¾", 5"L |
| 164 | clevis fastener, e.g., clevis ¾-16 thread ¾" pin |
| 165 | washer, e.g., flat washer, ¾" screw size, 0.765 ID, nylon |
| 166 | collar, e.g., one-piece clamp-on shaft collar for ¾"dia. shaft, aluminum |
| 167 | bushing, e.g., reducing bushing, ¾" male × ½" female stainless steel |
| 168 | rod, e.g., all thread rod, ¼-20, 3⅜"L, stainless steel |
| 169 | washer, e.g., split lock washer for ¼" screw, 18-8 stainless steel |
| 170 | nut, e.g., cap nut, ¼-20, nickel-plated steel |
| 171 | fastener/coupler/attachment assembly |
| 172 | body/base |
| 173 | fastener, e.g., spade terminal end connector |
| 174 | fastener, e.g., ring terminal end connecter |
| 311 | slit |
| 312 | opening |
| 313 | arrow |
| 351 | non-joint area of insert 73/non-crosshatched portion |
| 1201 | overedge coating |
| 1202 | fabric edge |
| 1203 | gusseted edge |
| 1204 | gusseted edge |
| 1205 | gusseted edge |
| 1206 | gusseted edge |
| 1207 | open end |
| 1208 | open end |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A system for temperature sensing and control, the system comprising:
   a) a control panel that includes a controller, an energy converter, and a power source;
   b) a heat seal bar including a heating element;
   c) a sensor that is in contact with the heating element of the heat seal bar during a calibration cycle and removable from the heat seal bar after the calibration cycle;

d) wherein the controller is operable to provide data on the heat seal bar based on temperature values received from the sensor while in contact with the heating element and electrical resistance values of the heating element;
e) wherein the power source is operable to provide power to the heating element during one or more heat seal cycles after the sensor is removed from the heating element;
f) wherein the energy converter is operable to process voltage and current feedback signals received from the heat seal bar, which the controller uses to calculate real-time electrical resistance of the heating element during said one or more heat seal cycles; and
g) wherein the controller calculates temperature of the heating element during said one or more heat seal cycles based on the real-time electrical resistance of the heating element in step (f) and the data.

2. The system of claim 1 wherein the energy converter is used to process the voltage and current feedback signals and converts the voltage and current feedback signals to analog output signals that are processed by the controller.

3. The system of claim 2 wherein the controller takes averages and performs smoothing of the analog output signals by flattening out said analog output signals by taking a running average of multiple sampling points to calculate a more stable feedback signal.

4. The system of claim 2 wherein the calculated temperature in step "g" is used to control an analog or digital pulse output on the controller, wherein a controller output is connected to a switching device that physically controls input power to the power source, which sends power to the heating element.

5. The system of claim 1 wherein the heating element is plated with 0.001 to 0.006 inch copper plating on each end of both sides of the heating element.

6. The system of claim 1 wherein the heating element is plated with 0.001 to 0.006 inch copper plating on each end of both sides of the heating element for a length of 2 and 7/16 inches from each end.

7. The system of claim 1 wherein an output response time of the energy converter is 50 milliseconds with a +/−2 millisecond tolerance.

8. The system of claim 1 wherein an output response time of the energy converter is 48 to 52 milliseconds with a +/−2 millisecond tolerance.

9. A system for temperature sensing and control during a heat sealing process, the system comprising:
a) a controller;
b) a converter;
c) a power source;
d) a heat seal bar including a heating element;
e) a sensor that is adapted to be positioned on the heat seal bar so that it is in contact with the heating element during a calibration cycle and adapted to be removed from the heat seal bar after the calibration cycle;
f) wherein the controller is adapted to provide calibration values during the calibration cycle based on temperature values of the heating element received from the sensor and electrical resistance values of the heating element when the sensor is positioned on the heat seal bar;
g) wherein the power source is adapted to provide power to the heating element during a heat seal cycle to heat the heating element, and wherein the sensor is not on the heat seal bar during the heat seal cycle;
h) wherein the converter is adapted to process voltage and current feedback signals received from the heat seal bar during heating in step "g", which the controller uses to calculate real-time electrical resistance of the heating element during the heat seal cycle; and
i) wherein the controller is adapted to calculate a temperature of the heating element while being heated during the heat seal cycle based on the real-time electrical resistance of the heating element and calibration values.

10. The system of claim 9 wherein the converter converts the voltage and current feedback signals to output signals that are processed by the controller.

11. The system of claim 10 wherein the controller takes averages and performs smoothing of the output signals by flattening out said output signals by taking a running average of multiple sampling points to calculate a more stable feedback signal.

12. The system of claim 10 further comprising a switching device and wherein the temperature calculated in step "i" is used to control a controller output, wherein the controller output is connected to the switching device that is adapted to control input power to the power source that sends power to the heating element.

13. The system of claim 9 wherein the heating element is plated with 0.001 to 0.006 inch copper plating on each end of both sides of the heating element.

14. The system of claim 9 wherein the heating element is plated with 0.001 to 0.006 inch copper plating on each end of both sides of the heating element for a length of 2 and 7/16 inches from each end.

15. The system of claim 9 wherein an output response time of the converter is 50 milliseconds with a +/−2 millisecond tolerance.

16. The system of claim 9 wherein an output response time of the converter is 25 to 75 milliseconds with a +/−2 millisecond tolerance.

17. A system for temperature sensing and control of a heating element, the system comprising:
a) a controller;
b) a transducer;
c) a power source;
d) a heat seal bar including the heating element;
e) a sensor that is adapted to be positioned on the heat seal bar so that it is in contact with the heating element during calibration of the heat seal bar and adapted to be removed from the heat seal bar after calibration of the heat seal bar;
f) wherein during a calibration cycle, the controller provides calibration values based on temperature readings gathered from the sensor and resistance readings that are calculated by the controller based on current voltage and current feedback signals received from the transducer; and
g) wherein during a heat seal cycle, after the sensor is removed in step "f", resistance readings are calculated by the controller based on current voltage and current feedback signals received from the transducer and the controller converts the resistance readings to temperature readings based on the calibration values to enable monitoring of temperature of the heating element during the heat seal cycle.

18. The system of claim 17 wherein an output response time of the transducer is 48-52 milliseconds with a +/−2 millisecond tolerance.

19. The system of claim 17 wherein the transducer converts the voltage and current feedback signals to output signals that are processed by the controller.

20. The system of claim 17 wherein the temperature readings calculated in step "g" are used to control a controller output, and wherein the controller output enables controlling when power is sent to heat the heating element.

\* \* \* \* \*